(12) United States Patent
Tanaka et al.

(10) Patent No.: US 7,231,144 B2
(45) Date of Patent: Jun. 12, 2007

(54) ELEMENT LAYOUT APPARATUS, ELEMENT LAYOUT PROGRAM AND ELEMENT LAYOUT METHOD

(75) Inventors: Toshio Tanaka, Shiojiri (JP); Shinji Miwa, Nirasaki (JP)

(73) Assignee: Seiko Epson Corporation, Tokyo (JP)

( * ) Notice: Subject to any disclaimer, the term of this patent is extended or adjusted under 35 U.S.C. 154(b) by 384 days.

(21) Appl. No.: 10/920,318

(22) Filed: Aug. 18, 2004

(65) Prior Publication Data

US 2005/0081147 A1 Apr. 14, 2005

(30) Foreign Application Priority Data

Aug. 22, 2003 (JP) ............................. 2003-298808
Jun. 8, 2004 (JP) ............................. 2004-170205

(51) Int. Cl.
G03B 17/00 (2006.01)
G03B 41/00 (2006.01)
G06F 17/50 (2006.01)

(52) U.S. Cl. ...................... 396/153; 396/322; 396/335; 716/6; 716/10

(58) Field of Classification Search .................... 716/6, 716/8, 10; 396/153, 322, 335
See application file for complete search history.

(56) References Cited

U.S. PATENT DOCUMENTS 6,058,252 A * 5/2000 Noll et al. ..................... 716/10
6,415,426 B1 * 7/2002 Chang et al. .................. 716/9
6,507,938 B1 * 1/2003 Roy-Neogi et al. ........... 716/10

FOREIGN PATENT DOCUMENTS

| JP | A 2002-329191 | 11/2002 |
| JP | A 2002-358310 | 12/2002 |
| JP | A 2003-143532 | 5/2003 |

* cited by examiner

*Primary Examiner*—Stacy A Whitmore
(74) *Attorney, Agent, or Firm*—Oliff & Berridge, PLC

(57) ABSTRACT

Exemplary embodiments of the invention provide an element layout apparatus, an element layout program and an element layout method which lay out a plurality of images taken by a camera, a video recorder or the like, so as to express a sense of time or ambience with the lapse of time on an album board.

20 Claims, 18 Drawing Sheets

ELEMENT LAYOUT APPARATUS, ELEMENT LAYOUT PROGRAM AND ELEMENT LAYOUT METHOD

BACKGROUND OF THE INVENTION

1. Field of Invention

The present invention relates to an element layout apparatus, an element layout program and an element layout method. More particularly, the present invention relates to an element layout apparatus, an element layout program and an element layout method which lay out a plurality of images taken by a camera, a video recorder or the like, so as to express a sense of time or ambience with the lapse of time on an album board.

2. Description of Related Art

The related art includes apparatuses, systems, etc. in each of which an electronic album is created by acquiring a plurality of images taken by a camera, a video recorder or the like, and then pasting the acquired elements on predetermined places of a display screen, a pasteboard or the like (hereinbelow, termed "album board").

Related art document JP-A-2003-143532 discloses a system to create an album in which relevant information is added to individual-based information by using information to specify the occurrence environment of the individual-based information (for example, time, and GPS (Global Positioning System) information).

Related art document JP-A-2002-358310 discloses a system to create an electronic album in which appropriate contents are acquired from images and event information relevant to the contents of the images, whereupon the acquired contents and the images are pasted.

Related art document JP-A-2002-329191 discloses a system to paste images on predetermined points of an album board on the basis of the positional information items of a GPS recorded in correspondence with the images.

SUMMARY OF THE INVENTION

When an album is created, images are often arranged in time series. However, in a case where the images to be pasted on an album board are merely arranged in the time series, it is not easy to express a sense of time or ambience with the lapse of time.

Related art document JP-A-2003-143532 or JP-A-2002-358310 can let a user recognize the temporal information of images by displaying the temporal information or by adding relevant contents with the temporal information. However, it is difficult to let the user recognize the sense of time or the ambience with the lapse of time, as in case of events having occurred consecutively or events having occurred at irregular time intervals.

Besides, as disclosed in related art document JP-A-2002-329191, when the images are arranged in accordance with the positional information, an appropriate arrangement is difficult in such a case where an identical place was passed many times (in, for example, a circuit course for a race), or where temporal expressions are to be born irrespective of places (on the images of, for example, a personal history in wedding photographs).

Exemplary embodiments of the present invention address or solve the above discussed and/or other problems. Exemplary embodiments provide an element layout apparatus, an element layout program and an element layout method which lay out a plurality of images taken by a camera, a video recorder or the like, so as to express a sense of time or ambience with the lapse of time on an album board.

[Exemplary embodiment 1] Exemplary embodiments of the present invention provide an element layout apparatus to lay out a plurality of layout elements, including:

a layout-element storage device to store therein the layout elements and temporal information items indicative of streams of time, in association with each other;

a path-information storage device to store therein path information items indicative of paths to arrange the layout elements therealong;

a temporal-information acquisition device to acquire the temporal information items associated with the layout elements, from the layout-element storage device; and an element arrangement device to calculate a time difference or also described as difference time periods between the layout elements, based on the temporal information items acquired by the temporal-information acquisition device, and to arrange the layout elements along the path of the path information items, at arrangement intervals between the layout elements that correspond to the calculated difference time periods.

With such a configuration, owing at least to the temporal-information acquisition device, the temporal information items associated with the layout elements are acquired from the layout-element storage device. Further, owing at least to the element arrangement device, the difference time periods between the layout elements are calculated on the basis of the temporal information items acquired by the temporal-information acquisition device, and the layout elements are arranged along the paths of the path information items, at the arrangement intervals between the layout elements as corresponding to the calculated difference time periods.

According to exemplary embodiments, layouts which reflect the streams of time can be realized. Photographs with movements as in case of, for example, the running match of an athletic meet, can be laid out so as to express ambience with the lapse of time on an album board. Also, when the several photographs, of a personal history since the time of birth till the present time as in case of, for example, wedding photographs are to be pasted, the lapse of time can be expressed with ease. That is, the photographs are not pasted merely in time series, but they can be laid out so as to express the stream of time.

Here, photographic image information, graphic image information and character information, for example, are included as the layout elements. Hereinbelow, the same shall apply to element layout apparatuses of exemplary embodiments 2, 6, 7 and 26, element layout programs of exemplary embodiments 27, 28, 32, 33 and 52, and element layout methods of exemplary embodiments 53, 54, 58, 59 and 78.

The "stream of time" is a sequence scale which indicates the relation of relative time points. The sequence scale may well be an interval scale or the like which has a still higher countability. Accordingly, time information, the counter information of a video recorder or the like, and photographed sequence information, for example, are included as the temporal information. The same shall apply to the element layout apparatuses of exemplary embodiments 2, 6, 7 and 26, the element layout programs of exemplary embodiments 27, 28, 32, 33 and 52, and the element layout methods of exemplary embodiments 53, 54, 58, 59 and 78.

The "layout" includes the arrangement, rotation and size change of the layout element, and the "arrangement of the layout element" signifies determining the arrangement position of the layout element. The same shall apply to the element layout apparatuses of exemplary embodiments 2, 6, 7 and 26, the element layout programs of exemplary embodiments 27, 28, 32, 33 and 52, and the element layout methods of exemplary embodiments 53, 54, 58, 59 and 78.

[Exemplary embodiment 2] Further, an element layout apparatus of exemplary embodiment 2 consists in an element layout apparatus to lay out a plurality of layout elements, including:

a layout-element storage device to store the layout elements therein;

a path-information storage device to store therein path information items indicative of paths to arrange the layout elements therealong;

a temporal-information generation device to generate temporal information items which indicate streams of time and which are to be associated with the layout elements; and an element arrangement device to calculate difference time periods between the layout elements, based on the temporal information items generated by the temporal-information generation device, and to arrange the layout elements along the paths of the path information items, at intervals also referred to as arrangement intervals, between the layout elements as correspond to the calculated difference time periods.

With such a configuration, owing at least to the temporal-information generation device, the temporal information items to be associated with the layout elements are generated. Besides, owing at least to the element arrangement device, the difference time periods between the layout elements are calculated based on the temporal information items generated by the temporal-information generation device, and the layout elements are arranged along the paths of the path information items, at the arrangement intervals between the layout elements as correspond to the calculated difference time periods.

This bring forth the advantage that layouts which reflect the streams of time can be realized. Photographs with movements as in case of, for example, the running match of an athletic meet can be laid out so as to express ambience with the lapse of time on an album board. Also, when the several photographs of a personal history since the time of birth till the present time as in case of, for example, wedding photographs are to be pasted, the lapse of time can be expressed with ease. That is, the photographs are not pasted merely in time series, but they can be laid out so as to express the stream of time.

[Exemplary embodiment 3] Further, an element layout apparatus of exemplary embodiment 3 consists in an element layout apparatus according to either of exemplary embodiments 1 and 2, characterized in:

that the path-information storage device stores therein index information items relevant to the layout elements, and the path information items in association with the index information items;

that a path-information selection device to select any of the plurality of path information items stored in the path-information storage device; and that the path-information selection device selects the index information item relevant to the layout elements, from among the plurality of index information items stored in the path-information storage device, and selects the path information item from at least one path information item associated with the selected index information item.

With such a configuration, owing at least to the path-information selection device, the index information item relevant to the layout elements is selected from among the plurality of index information items stored in the path-information storage device, and the path information item is selected from at least one path information item associated with the selected index information item.

This brings forth the advantage that the path which is comparatively suitable to express a sense of time for the layout elements, can be selected with ease.

Here, in a case, for example, where the layout elements are images obtained by photographing, event information indicating the event of photographed contents, and location information indicating a photographing location are included as the index information. Hereinbelow, the same shall apply to an element layout apparatus of exemplary embodiment 8, element layout programs of exemplary embodiments 29 and 34, and element layout methods of exemplary embodiments 55 and 60.

[Exemplary embodiment 4] Further, an element layout apparatus of exemplary embodiment 4 consists in an element layout apparatus according to any of exemplary embodiments 1 through 3, characterized in:

that the element arrangement device brings the difference time period between a starting-point element being the layout element whose time point specified by the temporal information item is the earliest, among the layout elements, and an end-point element being the layout element whose time point specified by the temporal information item is the latest, among the layout elements, into correspondence with the arrangement interval between the starting-point element and the end-point element along the path, that it calculates the arrangement interval between the starting-point element and a subject element being the layout element to-be-laid-out, based on the difference time period between the starting-point element and the subject element, and that it arranges the subject element at the arrangement interval calculated along the path.

With such a configuration, owing to at least the element arrangement device, the arrangement interval between the starting-point element and the subject element is calculated based on the difference time period of these elements, and the subject element is arranged at the calculated arrangement interval.

This brings forth the advantage that a layout which reflects the stream of time can be realized.

[Exemplary embodiment 5] Further, an element layout apparatus of exemplary embodiments 5 consists in the element layout apparatus of exemplary embodiment 4, characterized in:

that the element arrangement device includes:

a difference-time-period calculation device to calculate the difference time period between the starting-point element and the subject element;

an arrangement-interval calculation device to calculate the arrangement interval between the starting-point element and the subject element, based on the difference time period between the starting-point element and the end-point element, the arrangement interval between the starting-point element and the end-point element along the path, and the difference time period calculated by the difference-time-period calculation device;

an element-arrangement-position calculation device to calculate as an element arrangement position of the subject element, a position whose distance from a starting point along the path, the starting point being that position on the path at which the starting-point element is arranged becomes the arrangement interval calculated by the arrangement-interval calculation device; and a positional-information generation device to generate positional information of the subject element so that the element arrangement position calculated by the element-arrangement-position calculation device may become a central position of the subject element.

With such a configuration, owing at least to the difference-time-period calculation device, the difference time period between the starting-point element and the subject element is calculated. Besides, owing a least to the arrangement-interval calculation device, the arrangement interval between the starting-point element and the subject element is calculated based on the difference time period between the starting-point element and the end-point element, the arrangement interval between the starting-point element and the end-point element along the path, and the difference time period calculated by the difference-time-period calculation device. Besides, owing at least to the element-arrangement-position calculation device, when the starting point is set at that position on the path at which the starting-point element is arranged, the position at which the distance from the starting point along the path becomes the arrangement interval calculated by the arrangement-interval calculation device is calculated as the element arrangement position of the subject element. Besides, owing to the positional-information generation device, the positional information of the subject element is generated so that the element arrangement position calculated by the element-arrangement-position calculation device may become the central position of the subject element.

This brings forth the advantage that a layout which reflects the stream of time can be realized.

[Exemplary embodiment 6] Further, an element layout apparatus of exemplary embodiment 6 consists in an element layout apparatus to lay out a plurality of layout elements, including:

a layout-element storage device to store therein the layout elements and temporal information items indicative of streams of time, in association with each other;

a path-information storage device to store therein path information items which indicate paths to arrange the layout elements therealong, and a plurality of element arrangement positions being positions on the paths to arrange the layout elements thereat;

a starting-point/end-point-element selection device to select a starting-point element being the layout element which is to be arranged at a starting point, and an end-point element being the layout element which is to be arranged at an end point, from among the plurality of layout elements stored in the layout-element storage device, respectively for the starting point being the element arrangement position of earliest turn in a sequence to arrange the layout elements therein, and for the end point being the element arrangement position of latest turn in the sequence to arrange the layout elements therein, among the element arrangement positions of the path information items;

a starting-point/end-point-temporal-information acquisition device to acquire from the layout-element storage device, starting-point temporal information being the temporal information item which is associated with the starting-point element selected by the starting-point/end-point-element selection device, and end-point temporal information being the temporal information item which is associated with the end-point element selected by the starting-point/end-point-element selection device;

a temporal-information acquisition device to acquire from the layout-element storage device, the temporal information items which are associated with all the layout elements stored in the layout-element storage device; and element arrangement device to bring an arrangement interval between the starting-point element and the end-point element along the path of the path information, into correspondence with a difference time period of time points which are respectively specified by the starting-point temporal information and the end-point temporal information acquired by the starting-point/end-point-temporal-information acquisition device, to calculate arrangement temporal information which is the temporal information item corresponding to the element arrangement position between the starting point and the end point, to retrieve from within the layout-element storage device, the layout element associated with the calculated arrangement temporal information or the layout element associated with the temporal information item nearest to the calculated arrangement temporal information, based on the temporal information items acquired by the temporal-information acquisition device, and to arrange the retrieved layout element at the element arrangement position.

With such a configuration, when the starting point is set at the element arrangement position of the earliest turn in the sequence to arrange the layout elements therein, among the element arrangement positions of the path information items, and the end point is set at the element arrangement position of the latest turn in the sequence to arrange the layout elements therein, the starting-point element being the layout element which is to be arranged at the starting point, and the end-point element being the layout element which is to be arranged at the end point are selected from among the plurality of layout elements stored in the layout-element storage device, owing at least to the starting-point/end-point-element selection device. Besides, owing at least to the starting-point/end-point-temporal-information acquisition device, the starting-point temporal information being the temporal information item associated with the selected starting-point element, and the end-point temporal information being the temporal information item associated with the selected end-point element are acquired from the layout-element storage device. Besides, owing to the temporal-information acquisition device, the temporal information items associated with all the layout elements stored in the layout-element storage device are acquired from the layout-element storage device. Besides, owing at least to the element arrangement device, the arrangement interval between the starting-point element and the end-point element along the path of the path information is brought into correspondence with the difference time period of the time points respectively specified by the acquired starting-point temporal information and end-point temporal information, the arrangement temporal information being the temporal information item corresponding to the element arrangement position between-the starting point and the end point is calculated, the layout element associated with the calculated arrangement temporal information or the layout element associated with the temporal information item nearest to the calculated arrangement temporal information is retrieved from within the layout-element storage device based on the temporal information items acquired by the temporal-information acquisition device, and the retrieved layout element is arranged at the element arrangement position.

This brings forth the advantage that a layout which reflects the stream of time can be realized. Photographs with movements as in case of, for example, the running match of an athletic meet can be laid out so as to express ambience with the lapse of time on an album board. Also, when the several photographs of a personal history since the time of birth till the present time as in case of, for example, wedding photographs are to be pasted, the lapse of time can be expressed with ease. That is, the photographs are not pasted merely in time series, but they can be laid out so as to express the stream of time.

[Exemplary embodiment 7] Further, an element layout apparatus of exemplary embodiment 7 consists in an element layout apparatus to lay out a plurality of layout elements, including:

a layout-element storage device to store the layout elements therein;

a path-information storage device to store therein path information items which indicate paths to arrange the layout elements therealong, and a plurality of element arrangement positions being positions on the paths to arrange the layout elements thereat;

a starting-point/end-point-element selection device to select a starting-point element being the layout element to be arranged at a starting point, and an end-point element being the layout element to be arranged at an end point, from among the plurality of layout elements stored in the layout-element storage device, respectively for the starting point being the element arrangement position of earliest turn in a sequence to arrange the layout elements therein, and for the end point being the element arrangement position of latest turn in the sequence to arrange the layout elements therein, among the element arrangement positions of the path information items;

a starting-point/end-point-temporal-information generation device to generate starting-point temporal information being a temporal information item which indicates a stream of time and which is to be associated with the starting-point element selected by the starting-point/end-point-element selection device, and end-point temporal information being a temporal information item which is to be associated with the end-point element selected by the starting-point/end-point-element selection device;

a temporal-information generation device to generate temporal information items which are to be associated with all the layout elements stored in the layout-element storage device; and an element arrangement device to bring an arrangement interval between the starting-point element and the end-point element along the path of the path information, into correspondence with a difference time period of time points which are respectively specified by the starting-point temporal information and the end-point temporal information generated by the starting-point/end-point-temporal-information generation device, to calculate arrangement temporal information which is the temporal information item corresponding to the element arrangement position between the starting point and the end point, to retrieve from within the layout-element storage device, the layout element associated with the calculated arrangement temporal information or the layout element associated with the temporal information item nearest to the calculated arrangement temporal information, based on the temporal information items generated by the temporal-information generation device, and to arrange the retrieved layout element at the element arrangement position.

With such a configuration, when the starting point is set at the element arrangement position of the earliest turn in the sequence to arrange the layout elements therein, among the element arrangement positions of the path information items, and the end point is set at the element arrangement position of the latest turn in the sequence to arrange the layout elements therein, the starting-point element being the layout element which is to be arranged at the starting point, and the end-point element being the layout element which is to be arranged at the end point are selected from among the plurality of layout elements stored in the layout-element storage device, owing to the starting-point/end-point-element selection device. Besides, owing at least to the starting-point/end-point-temporal-information generation device, the starting-point temporal information being the temporal information item which is to be associated with the selected starting-point element, and the end-point temporal information being the temporal information item which is to be associated with the selected end-point element are generated. Besides, owing at least to the temporal-information generation device, the temporal information items which are to be associated with all the layout elements stored in the layout-element storage device are generated. Besides, owing at least to the element arrangement device, the arrangement interval between the starting-point element and the end-point element along the path of the path information is brought into correspondence with the difference time period of the time points respectively specified by the generated starting-point temporal information and end-point temporal information, the arrangement temporal information being the temporal information item corresponding to the element arrangement position between the starting point and the end point is calculated, the layout element associated with the calculated arrangement temporal information or the layout element associated with the temporal information item nearest to the calculated arrangement temporal information is retrieved from within the layout-element storage device based on the temporal information items generated by the temporal-information generation device, and the retrieved layout element is arranged at the element arrangement position.

This brings forth the advantage that a layout which reflects the stream of time can be realized. Photographs with movements as in case of, for example, the running match of an athletic meet can be laid out so as to express ambience with the lapse of time on an album board. Also, when the several photographs of a personal history since the time of birth till the present time as in case of, for example, wedding photographs are to be pasted, the lapse of time can be expressed with ease. That is, the photographs are not pasted merely in time series, but they can be laid out so as to express the stream of time.

[Exemplary embodiment 8] Further, an element layout apparatus of exemplary embodiment 8 consists in the element layout apparatus according to either of exemplary embodiments 6 and 7, characterized in:

that the path-information storage device stores therein index information items relevant to the layout elements, and the path information items in association with the index information items;

that path-information selection device to select from among the plurality of path information items stored in the path-information storage device, the path information which indicates the path to arrange the layout elements to-be-laid-out therealong, and the plurality of element arrangement positions to arrange the layout elements thereat; and that the path-information selection device selects the index information item relevant to the layout elements to-be-laid-out, from among the plurality of index information items stored in the path-information storage device, and selects the path information item from at least one path information item associated with the selected index information item.

With such a configuration, owing at least to the path-information selection device, the index information item relevant to the layout elements to-be-laid-out is selected from among the plurality of index information items stored in the path-information storage device, and the path information item is selected from at least one path information item associated with the selected index information item.

This brings forth the advantage that the path which is comparatively suitable to express a sense of time for the layout elements can be selected with ease.

[Exemplary embodiment 9] Further, an element layout apparatus of exemplary embodiment 9 consists in the element layout apparatus according to any of exemplary embodiments 6 through 8, characterized in:

that the element arrangement device includes:
  an arrangement-interval calculation device to calculate an arrangement interval between the starting point and the element arrangement position along the path, based on the starting point and the element arrangement position;
  a difference-time-period calculation device to calculate a difference time period between the starting-point temporal information and the arrangement temporal information associated with the element arrangement position, based on an arrangement interval between the starting-point element and the end-point element, a difference time period between the starting-point element and the end-point element, and the arrangement interval calculated by the arrangement-interval calculation device;
  an arrangement-temporal-information calculation to calculate the arrangement temporal information associated with the element arrangement position, based on the difference time period calculated by the difference-time-period calculation device, and the starting-point temporal information;
  a layout-element retrieval device to retrieve the layout element associated with the calculated arrangement temporal information or the layout element associated with the temporal information item nearest to the calculated arrangement temporal information, from among the plurality of layout elements stored in the layout-element storage device, based on the temporal information items; and
  a positional-information generation device to generate positional information of the layout element so that the element arrangement position may become a central position of the layout element.

With such a configuration, owing at least to the arrangement-interval calculation device, the arrangement interval between the starting point and the element arrangement position along the path is calculated based on the starting point and the element arrangement position. Besides, owing to at least the difference-time-period calculation device, the difference time period between the starting-point temporal information and the arrangement temporal information associated with the element arrangement position is calculated based on the arrangement interval between the starting-point element and the end-point element, the difference time period between the starting-point element and the end-point element, and the arrangement interval calculated by the arrangement-interval calculation device. Besides, owing at least to the arrangement-temporal-information calculation device, the arrangement temporal information associated with the element arrangement position is calculated based on the difference time period calculated by the difference-time-period calculation device, and the starting-point temporal information. Besides, owing at least to the layout-element retrieval device, the layout element associated with the calculated arrangement temporal information or the layout element associated with the temporal information item nearest to the calculated arrangement temporal information is retrieved from among the plurality of layout elements stored in the layout-element storage device, based on the temporal information items. Besides, owing at least to the positional-information generation device, the positional information of the layout element is generated so that the element arrangement position may become the central position of the layout element.

This brings forth the advantage that a layout which reflects the stream of time can be realized.

[Exemplary embodiment 10] Further, an element layout apparatus of exemplary embodiment 10 consists in the element layout apparatus according to any of exemplary embodiments 1 through 9, characterized by including:
  an overlap-region decision device to decide whether or not an overlap region in which overlap-correction decision regions of adjacent ones of the layout elements overlap each other exists;
    as to the overlap-correction decision regions being those regions of the layout elements which are set to decide the overlap between the layout elements, and a downstream element being the layout element whose time point specified by the temporal information item is later, and an upstream element being the layout element whose time point specified by the temporal information item is earlier, between the two adjacent layout elements except the starting-point element and the end-point element; and
  an overlap correction device to correct at least one layout information item of the element arrangement position of the downstream element, a size of the downstream element, a skew angle of the downstream element, a shape of the downstream element, the element arrangement position of the upstream element, a size of the upstream element, a skew angle of the upstream element, and a shape of the upstream element so as to decrease the overlap region, when the overlap-region decision device has decided the existence of the overlap region.

With such a configuration, letting the overlap-correction decision regions be those regions of the layout elements which are set to decide the overlap between the layout elements, and letting the downstream element be the layout element of the later temporal information item and the upstream element be the layout element of the earlier temporal information item, except the starting-point element and the end-point element, between the two adjacent layout elements, whether or not the overlap region in which the overlap-correction decision regions of the adjacent layout elements overlap each other exists is decided owing to the overlap-region decision device. Besides, when the overlap region exists, at least one layout information item of the element arrangement position of the downstream element, size of the downstream element, skew angle of the downstream element, shape of the downstream element, element arrangement position of the upstream element, size of the upstream element, skew angle of the upstream element, and shape of the upstream element is corrected so as to decrease the overlap region.

Thus, when the overlap-correction decision regions of the layout elements overlap each other, it is possible to decrease those partial regions of the elements which a user cannot recognize on account of the overlap region. Accordingly, there is attained the advantage that the layout of the layout elements can be corrected so as to reduce or prevent the layout elements from being pasted on an album board with the overlap, or to reduce or prevent even the overlap from destroying the images of the layout elements.

[Exemplary embodiment 11] Further, an element layout apparatus of exemplary embodiment 11 consists in the element layout apparatus of exemplary embodiment 10, characterized in:

that the overlap-correction decision region includes an element region which is a region of the layout element, and a predetermined marginal region which is provided around the element region.

With such a configuration, owing at least to the overlap-region decision device, whether or not the overlap region in which the element regions being the regions of the layout elements or the predetermined marginal regions provided around the element regions overlap each other exists is decided.

This brings forth the advantage that the layout of the layout elements can be corrected so as to reduce or prevent the layout elements from being pasted on an album board with the overlap.

[Exemplary embodiment 12] Further, an element layout apparatus of exemplary embodiment 12 consists in the element layout apparatus of exemplary embodiment 10, characterized in:

that the overlap-correction decision region includes an indispensable element region which is a partial region of the layout element as is necessary for the layout, and a predetermined marginal region which is provided around the indispensable element region.

With such a configuration, owing at least to the overlap-region decision device, whether or not the overlap region in which the indispensable element regions being the partial regions of the layout elements as are necessary for the layout, or the predetermined marginal regions provided around the indispensable element regions overlap each other exists is decided.

This brings forth the advantage that the layout of the layout elements can be corrected so as to reduce or prevent the overlap from destroying the images of the layout elements, even when the layout elements to be pasted on an album board overlap each other.

[Exemplary embodiment 13] Further, an element layout apparatus of exemplary embodiment 13 consists in the element layout apparatus of any of exemplary embodiments 10 through 12, characterized in:

that the overlap correction device corrects the element arrangement position of the layout element so that a central position of the layout element before the correction may exist within the element region of the layout element after the correction; and that the element arrangement position of the downstream element is corrected so that a position at which the downstream element is arranged when the downstream element is moved along the path until the overlap region is cancelled may be set as the element arrangement position of the downstream element after the correction.

With such a configuration, owing at least to the overlap correction device, the element arrangement position of the downstream element is corrected by-moving the downstream element along the path until the overlap region is cancelled or similarly, has disappeared. Herein, the correction is made so that the central position of the downstream element before the correction may exist within the element region of the downstream element after the correction.

Thus, the position of the layout element after the correction is located along the path, so that a correction which comparatively precisely reflects the intention of a design expressed by the path can be made. Accordingly, there is attained the advantage that the correction can be utilized for a correction process in which importance is attached to a design.

[Exemplary embodiment 14] Further, an element layout apparatus of exemplary embodiment 14 consists in the element layout apparatus of any of exemplary embodiments 10 through 12, characterized in:

that the overlap correction device corrects the element arrangement position of the layout element so that a central position of the layout element before the correction may exist within the element region of the layout element after the correction; and that the element arrangement position of the downstream element is corrected so that a position at which the downstream element is arranged when the downstream element is moved in at least one of a horizontal direction and a vertical direction until the overlap region is cancelled may be set as the element arrangement position of the downstream element after the correction.

With such a configuration, owing at least to the overlap correction device, the element arrangement position of the downstream element is corrected by moving the downstream element in at least one of the horizontal direction and the vertical direction until the overlap region is cancelled. Herein, the correction is made so that the central position of the downstream element before the correction may exist within the element region of the downstream element after the correction.

Thus, a computing load for the correction is light, so that the correction can be made in a short time. Accordingly, there is attained the advantage that the correction can be utilized for a correction process which needs to be executed at high speed.

[Exemplary embodiment 15] Further, an element layout apparatus of exemplary embodiment 15 consists in the element layout apparatus of any of exemplary embodiments 10 through 12, characterized in:

that the overlap correction device sets as a size of the downstream element after the correction, the size of the downstream element as is reduced with an aspect ratio of the downstream element maintained and without altering the element arrangement position of the downstream element, until the overlap region is cancelled.

With such a configuration, owing at least to the overlap correction device, the size of the downstream element is altered by reducing the size of the downstream element with the aspect ratio thereof maintained and without altering the element arrangement position thereof, until the overlap region is cancelled.

Thus, the time information of the layout element is expressed by the position of the layout element which is to be arranged on the path, so that a correction which expresses the time information of the layout element comparatively precisely can be made. Accordingly, there is attained the advantage that the correction can be utilized for a correction process in which the time information of the layout element is to be expressed comparatively precisely.

[Exemplary embodiment 16] Further, an element layout apparatus of exemplary embodiment 16 consists in the element layout apparatus of any of exemplary embodiments 10 through 12, characterized in:

that the overlap correction device corrects the element arrangement position of the downstream element so that a position at which the downstream element is arranged when the downstream element is moved in a direction being perpendicular to the path and lengthening the path, until the overlap region is cancelled may be set as the element arrangement position of the downstream element after the correction.

With such a configuration, owing at least to the overlap correction device, the element arrangement position of the downstream element is corrected by moving the downstream element in the direction being perpendicular to the path and lengthening the path, until the overlap region is cancelled.

This brings forth the advantages that the layout element can be arranged without being reduced, and that the irregular arrangement of images based on the transformation of the path can appeal to a user.

[Exemplary embodiment 17] Further, an element layout apparatus of exemplary embodiment 17 consists in the element layout apparatus of any of exemplary embodiments 10 through 12, characterized in:

that the overlap correction device sets as the skew angle of the layout element after the correction, the skew angle of the layout element as results when at least one of the downstream element and the upstream element is rotated around a central position of the corresponding layout element by altering neither of the element arrangement position of the downstream element and the element arrangement position of the upstream element, until the overlap region is cancelled.

With such a configuration, owing at least to the overlap correction device, the skew angle of at least one of the downstream element and the upstream element is altered by rotating the corresponding layout element around the central position thereof without altering either of the element arrangement positions of the downstream element and the upstream element, until the overlap region is cancelled.

This brings forth the advantages that the layout element can be arranged without being reduced, and that the irregular arrangement of images can appeal to a user.

[Exemplary embodiment 18] Further, an element layout apparatus of exemplary embodiment 18 consists in the element layout apparatus of any of exemplary embodiments 10 through 12, characterized in:

that the overlap correction device corrects the element arrangement position of the layout element by expanding the path at substantially equal magnifications vertically and laterally, and setting the same relative position on the path after the correction as the element arrangement position of the layout element arranged on the path before the correction, as the element arrangement position of the layout element after the correction.

With such a configuration, owing at least to the overlap correction device, the path is expanded at the substantially equal magnifications vertically and laterally, and the element arrangement position of the layout element is corrected so that the element arrangement position of the layout element arranged on the path before the correction may become relatively the same as the element arrangement position of the layout element on the path after the correction.

Thus, the time information of the layout element is expressed by the position of the layout element which is to be arranged on the path, so that a correction which expresses the time information of the layout element comparatively precisely can be made. Accordingly, there is attained the advantage that the correction can be utilized for a correction process in which the time information of the layout element is to be expressed comparatively precisely.

[Exemplary embodiment 19] Further, an element layout apparatus of exemplary embodiment 19 consists in the element layout apparatus of any of exemplary embodiments 1 through 18, characterized by including:

an empty-space decision device to decide whether or not an empty space interval is greater than a predetermined correction decision interval;
as to the empty space interval which is a distance between the adjacent layout elements along the path, except element regions being regions of the layout elements, or which is an arrangement interval between the adjacent layout elements, and a downstream element being the layout element whose time point specified by the temporal information item is later, and an upstream element being the layout element whose time point specified by the temporal information item is earlier, between the two adjacent layout elements; and an empty-space correction device to correct at least one information item of the element arrangement position of the downstream element, a size of the downstream element, a skew angle of the downstream element, a shape of the downstream element, the element arrangement position of the upstream element, a size of the upstream element, a skew angle of the upstream element, and a shape of the upstream element so as to decrease the empty space interval, when the empty-space decision device has decided that the empty space interval is greater than the predetermined correction decision interval.

With such a configuration, letting the empty space interval be the distance which is the interval between the adjacent layout elements along the path, except the element regions being the regions of the layout elements, or be the arrangement interval between the adjacent layout elements, and letting the downstream element be the layout element of later temporal information item, and the upstream element be the layout element of earlier temporal information item, between the two adjacent layout elements and except a starting-point element and an end-point element, whether or not the empty space interval is greater than the predetermined correction decision interval is decided owing at least to the empty-space decision device. Besides, owing at least to the empty-space correction device, when the empty space interval is greater than the predetermined correction decision interval, at least one information item of the element arrangement position of the downstream element, size of the downstream element, skew angle of the downstream element, shape of the downstream element, element arrangement position of the upstream element, size of the upstream element, skew angle of the upstream element, and shape of the upstream element is corrected so as to decrease the empty space interval.

Thus, when the layout elements are arranged at the great empty space interval, the layout can be corrected so as to decrease the empty space interval. Accordingly, there is attained the advantage that the layout elements which a user was difficult to see on account of the arrangement at the great empty space interval between the layout elements can have their arrangement corrected without spoiling a sense of time or ambience with the lapse of time.

[Exemplary embodiment 20] Further, an element layout apparatus of exemplary embodiment 20 consists in the element layout apparatus of exemplary embodiment 19, characterized in:

that, as to a boundary region being a region which is constructed of the element region of the layout element and a predetermined marginal region provided around the element region, the empty-space correction device sets as the size of the layout element after the correction, the size of the layout element as results when the size of at least one layout element of the downstream element and the upstream element is expanded with an aspect ratio of the corresponding layout element maintained and without altering the element arrangement position thereof, until the decision region of the at least layout element of the downstream element and the upstream element overlaps with the boundary region of the layout element adjacent to the corresponding layout element, or until the empty space interval becomes equal to, at most, the predetermined correction decision interval.

With such a configuration, owing at least to the empty space correction device, the size of at least one layout element of the downstream element and the upstream element is altered by expanding the size of the corresponding layout element with the aspect ratio of the corresponding layout element maintained and without altering the element arrangement position thereof, until the decision region of at least layout element of the downstream element and the upstream element overlaps with the boundary region of the layout element adjacent to the corresponding layout element, or until the empty space interval becomes equal to, at most, the predetermined correction decision interval.

Thus, the position of the layout element after the correction is located along the path, so that a correction which comparatively precisely reflects the intention of a design expressed by the path can be made. Accordingly, there is attained the advantage that the correction can be utilized for a correction process in which importance is attached to a design.

[Exemplary embodiment 21] Further, an element layout apparatus of exemplary embodiment 21 consists in the element layout apparatus of exemplary embodiment 19, characterized in:

that the empty-space correction device corrects the element arrangement position of the layout element so that a central position of the layout element before the correction may exist within the element region of the layout element after the correction; and that the element arrangement position of at least one layout element of the downstream element and the upstream element, except the starting-point element and the end-point element, is corrected so that a position at which the corresponding layout element is arranged when the corresponding layout element is moved along the path until the empty space interval becomes equal to, at most, the predetermined correction decision interval may be set as the element arrangement position of the corresponding layout element after the correction.

With such a configuration, owing at least to the empty space correction device, the element arrangement position of at least one layout element of the downstream element and the upstream element, except the starting-point element and the end-point element, is corrected by moving the corresponding layout element along the path until the empty space interval becomes equal to, at most, the predetermined correction decision interval. Herein, the correction is made so that the central position of the layout element before the correction may exist within the element region of the layout element after the correction.

Thus, the position of the layout element after the correction is located along the path, so that a correction which comparatively precisely reflects the intention of a design expressed by the path can be made. Accordingly, there is attained the advantage that the correction can be utilized for a correction process in which importance is attached to a design.

[Exemplary embodiment 22] Further, an element layout apparatus of exemplary embodiment 22 consists in the element layout apparatus of exemplary embodiment 19, characterized in:

that the empty-space correction device corrects the path from the upstream element to an adjacent element before the correction, to a path which connects the upstream element and the adjacent element by a straight line, the adjacent element being the layout element which is adjacent to the downstream element except the end-point element among the downstream elements and which is different from the upstream element, whereupon it corrects the element arrangement position of the downstream element so that a ratio between an arrangement interval of the upstream element and the downstream element and an arrangement interval of the downstream element and the adjacent element as viewed on the path after the correction may become equal to a ratio between an arrangement interval of the upstream element and the downstream element and an arrangement interval of the downstream element and the adjacent element as viewed on the path before the correction.

With such a configuration, owing at least to the empty-space correction device, the path from the upstream element to the adjacent element before the correction is corrected to the path which connects the upstream element and the adjacent element by the straight line. Besides, the element arrangement position of the downstream element is corrected so that the ratio between the arrangement interval of the upstream element and the downstream element and the arrangement interval of the downstream element and the adjacent element as viewed on the path after the correction may become equal to the ratio between the arrangement interval of the upstream element and the downstream element and the arrangement interval of the downstream element and the adjacent element as viewed on the path before the correction.

This brings forth the advantages that the layout element can be arranged without being reduced, and that the irregular arrangement of images can appeal to a user.

[Exemplary embodiment 23] Further, an element layout apparatus of exemplary embodiment 23 consists in the element layout apparatus of exemplary embodiment 19, characterized in:

that the empty-space correction device corrects the element arrangement position of the layout element by reducing the path at substantially equal magnifications vertically and laterally, and setting the same relative position on the path after the correction as the element arrangement position of the layout element arranged on the path before the correction, as the element arrangement position of the layout element after the correction.

With such a configuration, owing at least to the empty-space correction device, the path is reduced at the substantially equal magnifications vertically and laterally, and the element arrangement position of the layout element is corrected so that the element arrangement position of the layout element arranged on the path before the correction may become relatively the same as the element arrangement position of the layout element on the path after the correction.

Thus, the time information of the layout element is expressed by the position of the layout element which is to be arranged on the path, so that a correction which expresses the time information of the layout element comparatively precisely can be made. Accordingly, there is attained the advantage that the correction can be utilized for a correction process in which the time information of the layout element is to be expressed comparatively precisely.

[Exemplary embodiment 24] Further, an element layout apparatus of exemplary embodiment 24 consists in the element layout apparatus of exemplary embodiment 19, characterized in:

that the empty-space correction device arranges a predetermined layout element on the path, between the layout elements so that the empty space interval may become equal to, at most, the predetermined correction decision interval.

With such a configuration, owing at least to the empty-space correction device, the predetermined layout element based on the path is arranged between the layout elements so that the empty space interval may become equal to, at most, the predetermined correction decision interval.

This brings forth the advantages that the layout element can be arranged without being reduced, and that the irregular arrangement of images can appeal to a user.

[Exemplary embodiment 25] Further, an element layout apparatus of exemplary embodiment 25 consists in the element layout apparatus of any of exemplary embodiments 1 through 24, characterized by comprising:

an edit device to edit at least one information item of an element arrangement position of the layout element, a size of the layout element, a skew angle of the layout element, and a shape of the layout element on the basis of information inputted through an input device.

With such a configuration, owing at least to the edit device, at least one information item of the element arrangement position of the layout element, size of the layout element, skew angle of the layout element, and shape of the layout element is edited on the basis of the information inputted through the input device.

This brings forth the advantage that the editing can be performed so as to comparatively fit to the sense of a user himself/herself, a temporal interval or ambience with the lapse of time as is inherent in the layout elements pasted on an album board.

[Exemplary embodiment 26] Further, an element layout apparatus of exemplary embodiment 26 consists in an element layout apparatus for laying out a plurality of layout elements, characterized by including:

a layout-element-selection-screen display device to display a selection screen which displays the plurality of layout elements, and which prompts a user to select a plurality of layout elements from among the displayed layout elements;

a path-information-selection-screen display device to display a selection screen which displays a plurality of path information items indicative of paths for arranging the layout elements therealong, and which prompts the user to select a path information item from among the displayed path information items; and a layout-result display device to display a layout result in which the selected layout elements are arranged along the path of the selected path information item at an arrangement interval that corresponds to a temporal interval specified by temporal information items relevant to the selected layout elements.

With such a configuration, the selection screen which displays the plurality of layout elements and which prompts the user to select the plurality of layout elements from among the displayed layout elements is displayed owing to the layout-element-selection-screen display device, and the selection screen which displays the plurality of path information items and which prompts the user to select the path information item from among the displayed path information items is displayed owing to the path-information-selection-screen display device. Besides, when the layout elements and the path information item have been selected, the layout result in which the selected layout elements are arranged along the path of the selected path information item at the arrangement interval that corresponds to the temporal interval specified by the temporal information items relevant to the selected layout elements is displayed owing to the layout-result display device.

This brings forth the advantage that a layout which reflects the stream of time can be realized.

Here, included as the temporal information items relevant to the layout elements are, for example, temporal information items associated with the selected layout elements, and temporal information items generated for the selected layout elements. Hereinbelow, the same shall apply to an element layout program of exemplary embodiment 52, and an element layout method of exemplary embodiment 78.

[Exemplary embodiment 27] Meanwhile, an element layout program of exemplary embodiment 27 consists in an element layout program to lay out a plurality of layout elements, including:

an element selection program for selecting the layout elements based on inputs given by a user, from within layout-element storage device to store therein the layout elements and temporal information items indicating a stream of time, in association with each other;

a path-information selection program for selecting a path information item based on an input given by the user, from within path-information storage device to store therein path information items indicative of paths to arrange the layout elements therealong;

a temporal-information acquisition program for acquiring the temporal information items associated with the layout elements selected at the element selection step, from within the layout-element storage device; and an element arrangement program for calculating a difference time period between the layout elements, based on the temporal information items acquired at the temporal-information acquisition, and arranging the layout elements selected at the element selection, along the path of the path information item selected at the path-information selection and at an arrangement interval between the layout elements as corresponds to the calculated difference time period.

With such a configuration, when the program has been read by the computer, and the computer has executed the processing in conformity with the read program, an operation and an advantage equivalent to those of the element layout apparatus of exemplary embodiment 1 are attained.

[Exemplary embodiment 28] Further, an element layout program of exemplary embodiment 28 consists in an element layout program to lay out a plurality of layout elements, including:

an element selection program for selecting the layout elements based on inputs given by a user, from within layout-element storage device to store the layout elements therein;

a path-information selection program for selecting a path information item based on an input given by the user, from within path-information storage device to store therein path information items indicative of paths to arrange the layout elements therealong;

a temporal-information generation program for generating temporal information items indicative of a stream of time as are to be associated with the layout elements selected at the element selection step; and an element arrangement program for calculating a difference time period between the layout elements, based on the temporal information items generated at the temporal-information generation, and arranging the layout elements selected at the element selection, along the path of the path information item selected at the path-information selection and at an arrangement interval between the layout elements as corresponds to the calculated difference time period.

With such a configuration, when the program has been read by the computer, and the computer has executed the processing in conformity with the read program, an operation and an advantage equivalent to those of the element layout apparatus of exemplary embodiment 2 are attained.

[Exemplary embodiment 29] Further, an element layout program of exemplary embodiment 29 consists in the element layout program of either of exemplary embodiments 27 and 28, characterized in:

that the path-information storage device stores therein index information items relevant to the layout elements, and the path information items in association with the index information items;

that a program is included to execute a path-information selection of selecting any of the plurality of path information items stored in the path-information storage device; and that the path-information selection selects the index information item relevant to the layout elements, from among the plurality of index information items stored in the path-information storage device, and selects the path information item from at least one path information item associated with the selected index information item.

With such a configuration, when the program has been read by the computer, and the computer has executed the processing in conformity with the read program, an operation and an advantage equivalent to those of the element layout apparatus of exemplary embodiment 3 are attained.

[Exemplary embodiment 30] Further, an element layout program of exemplary embodiment 30 consists in the element layout program of any of exemplary embodiments 27 through 29, characterized in:

that the element arrangement brings the difference time period between a starting-point element being the layout element whose time point specified by the temporal information item is the earliest, among the layout elements, and an end-point element being the layout element whose time point specified by the temporal information item is the latest, among the layout elements, into correspondence with the arrangement interval between the starting-point element and the end-point element along the path, that it calculates the arrangement interval between the starting-point element and a subject element being the layout element to-be-laid-out, based on the difference time period between the starting-point element and the subject element, and that it arranges the subject element at the arrangement interval calculated along the path.

With such a configuration, when the program has been read by the computer, and the computer has executed the processing in conformity with the read program, an operation and an advantage equivalent to those of the element layout apparatus of exemplary embodiment 4 are attained.

[Exemplary embodiment 31] Further, an element layout program of exemplary embodiment 31 consists in the element layout element of exemplary embodiment 30, characterized in:

that the element arrangement includes a program to execute:

a difference-time-period calculation program for calculating the difference time period between the starting-point element and the subject element;

an arrangement-interval calculation program for calculating the arrangement interval between the starting-point element and the subject element, based on the difference time period between the starting-point element-and the end-point element, the arrangement interval between the starting-point element and the end-point element along the path, and the difference time period calculated at the difference-time-period calculation step;

an element-arrangement-position calculation program for calculating as an element arrangement position of the subject element, a position whose distance from a starting point along the path, the starting point being that position on the path at which the starting-point element is arranged, becomes the arrangement interval calculated at the arrangement-interval calculation; and a positional-information generation program for generating positional information of the subject element so that the element arrangement position calculated at the element-arrangement-position calculation may become a central position of the subject element.

With such a configuration, when the program has been read by the computer, and the computer has executed the processing in conformity with the read program, an operation and an advantage equivalent to those of the element layout apparatus of exemplary embodiment 5 are attained.

[Exemplary embodiment 32] Further, an element layout program of exemplary embodiment 32 consists in an element layout program to lay out a plurality of layout elements, including:

a path-information selection program for selecting a path information item based on an input given by a user, from within path-information storage device to store therein path information items which indicate paths to arrange the layout elements therealong, and a plurality of element arrangement positions being positions on the paths to arrange the plurality of layout elements thereat;

a starting-point/end-point-element selection program for selecting a starting-point element being the layout element which is to be arranged at a starting point, and an end-point element being the layout element which is to be arranged at an end point, from within layout-element storage device to store therein the layout elements and temporal information items indicative of streams of time, in association with each other, respectively for the starting point being the element arrangement position of earliest turn in a sequence to arrange the layout elements therein, and for the end point being the element arrangement position of latest turn in the sequence to arrange the layout elements therein, among the element arrangement positions of the path information items;

a starting-point/end-point-temporal-information acquisition program for acquiring from the layout-element storage device, starting-point temporal information being the temporal information item which is associated with the starting-point element selected at the starting-point/end-point-element selection, and end-point temporal information being the temporal information item which is associated with the end-point element selected at the starting-point-end-point-element selection;

a temporal-information acquisition program for acquiring from the layout-element storage device, the temporal information items which are associated with all the layout elements stored in the layout-element storage device; and an element arrangement program for bringing an arrangement interval between the starting-point element and the end-point element along the path of the path information selected at the path-information selection, into correspondence with a difference time period of time points which are respectively specified by the starting-point temporal information and the end-point temporal information acquired at the starting-point/end-point-temporal-information acquisition, calculating arrangement temporal information which is the temporal information item corresponding to the element arrangement position between the starting point and the end point, retrieving from within the layout-element storage device, the layout element associated with the calculated arrangement temporal information or the layout element associated with the temporal information item nearest to the calculated arrangement temporal information, based on the temporal information items acquired at the temporal-information acquisition, and arranging the retrieved layout element at the element arrangement position.

With such a configuration, when the program has been read by the computer, and the computer has executed the processing in conformity with the read program, an operation and advantages equivalent to those of the element layout apparatus of exemplary embodiment 6 are attained.

[Exemplary embodiment 33] Further, an element layout program of exemplary embodiment 33 consists in an element layout program to lay out a plurality of layout elements, including:

a path-information selection program for selecting a path information item based on an input given by a user, from within path-information storage device to store therein path information items which indicate paths to arrange the layout elements therealong, and a plurality of element arrangement positions being positions on the paths to arrange the plurality of layout elements thereat;

a starting-point/end-point-element selection program for selecting a starting-point element being the layout element which is to be arranged at a starting point, and an end-point element being the layout element which is to be arranged at an end point, from within layout-element storage device to store the layout elements therein, respectively for the starting point being the element arrangement position of earliest turn in a sequence to arrange the layout elements therein, and for the end point being the element arrangement position of latest turn in the sequence to arrange the layout elements therein, among the element arrangement positions of the path information items;

a starting-point/end-point-temporal-information generation program for generating starting-point temporal information and end-point temporal information being temporal information items indicative of a stream of time as are to be respectively associated with the starting-point element and the end-point element selected at the starting-point/end-point-element selection;

a temporal-information generation program for generating temporal information items which are to be associated with all the layout elements stored in the layout-element storage device; and an element arrangement program for bringing an arrangement interval between the starting-point element and the end-point element along the path of the path information selected at the path-information selection step, into correspondence with a difference time period of time points which are respectively specified by the starting-point temporal information and the end-point temporal information generated at the starting-point/end-point-temporal-information generation, calculating arrangement temporal information which is a temporal information item corresponding to the element arrangement position between the starting point and the end point, retrieving from within the layout-element storage device, the layout element associated with the calculated arrangement temporal information or the layout element associated with a temporal information item nearest to the calculated arrangement temporal information, based on the temporal information items generated at the temporal-information generation, and arranging the retrieved layout element at the element arrangement position.

With such a configuration, when the program has been read by the computer, and the computer has executed the processing in conformity with the read program, an operation and advantages equivalent to those of the element layout apparatus of exemplary embodiment 7 are attained.

[Exemplary embodiment 34] Further, an element layout program of exemplary embodiment 34 consists in the element layout program of either of exemplary embodiments 32 and 33, characterized in:

that the path-information storage device stores therein index information items relevant to the layout elements, and the path information items in association with the index information items;

that a program causes the computer to execute a path-information selection to select from among the plurality of path information items stored in the path-information storage device, the path information which indicates the path to arrange the layout elements to-be-laid-out therealong, and the plurality of element arrangement positions to arrange the layout elements thereat; and that the path-information selection selects the index information item relevant to the layout elements to-be-Laid-out, from among the plurality of index information items stored in the path-information storage device, and selects the path information item from at least one path information item associated with the selected index information item.

With such a configuration, when the program has been read by the computer, and the computer has executed the processing in conformity with the read program, an operation and an advantage equivalent to those of the element layout apparatus of exemplary embodiment 8 are attained.

[Exemplary embodiment 35] Further, an element layout program of exemplary embodiment 35 consists in the element layout program of any of exemplary embodiments 32 through 34, including:

an arrangement-interval calculation program for calculating an arrangement interval between the starting point and the element arrangement position along the path, based on the starting point and the element arrangement position;

a difference-time-period calculation program for calculating a difference time period between the starting-point temporal information and the arrangement temporal information associated with the element arrangement position, based on an arrangement interval between the starting-point element and the end-point element, a difference time period between the starting-point element and the end-point element, and the arrangement interval calculated at the arrangement-interval calculation;

an arrangement-temporal-information calculation program for calculating the arrangement temporal information associated with the element arrangement position, based on the difference time period calculated at the difference-time-period calculation, and the starting-point temporal information;

a layout-element retrieval program for retrieving the layout element associated with the calculated arrangement temporal information or the layout element associated with the temporal information item nearest to the calculated arrangement temporal information, from among the plurality of layout elements stored in the layout-element storage device, based on the temporal information items; and a positional-information generation program for generating positional information of the layout element so that the element arrangement position may become a central position of the layout element.

With such a configuration, when the program has been read by the computer, and the computer has executed the processing in conformity with the read program, an operation and an advantage equivalent to those of the element layout apparatus of exemplary embodiment 9 are attained.

[Exemplary embodiment 36] Further, an element layout program of exemplary embodiment 36 consists in the element layout program of any of exemplary embodiments 27 through 35, including:

an overlap-region decision program for deciding whether or not an overlap region in which overlap-correction decision regions of adjacent ones of the layout elements overlap each other exists;
as to the overlap-correction decision regions being those regions of the layout elements which are set to decide the overlap between the layout elements, and a downstream element being the layout element whose time point specified by the temporal information item is later, and an upstream element being the layout element whose time point specified by the temporal information item is earlier, between the two adjacent layout elements except the starting-point element and the end-point element; and
an overlap correction program for correcting at least one information item of the element arrangement position of the downstream element, a size of the downstream element, a skew angle of the downstream element, a shape of the downstream element, the element arrangement position of the upstream element, a size of the upstream element, a skew angle of the upstream element, and a shape of the upstream element so as to decrease the overlap region, when the existence of the overlap region has been decided at the overlap-region decision step.

With such a configuration, when the program has been read by the computer, and the computer has executed the processing in conformity with the read program, an operation and an advantage equivalent to those of the element layout apparatus of exemplary embodiment 10 are attained.

[Exemplary-embodiment 37] Further, an element layout program of exemplary embodiment 37 consists in the element layout program of exemplary embodiment 36, characterized in:

that the overlap-correction decision region includes an element region which is a region of the layout element, and a predetermined marginal region which is provided around the element region.

With such a configuration, when the program has been read by the computer, and the computer has executed the processing in conformity with the read program, an operation and an advantage equivalent to those of the element layout apparatus of exemplary embodiment 11 are attained.

[Exemplary embodiment 38] Further, an element layout program of exemplary embodiment 38 consists in the element layout program of exemplary embodiment 36, characterized in:

that the overlap-correction decision region includes an indispensable element region which is a partial region of the layout element as is necessary for the layout, and a predetermined marginal region which is provided around the indispensable element region.

With such a configuration, when the program has been read by the computer, and the computer has executed the processing in conformity with the read program, an operation and an advantage equivalent to those of the element layout apparatus of exemplary embodiment 12 are attained.

[Exemplary embodiment 39] Further, an element layout program of exemplary embodiment 39 consists in the element layout program of any of exemplary embodiments 36 through 38, characterized in:

that the overlap correction corrects the element arrangement position of the layout element so that a central position of the layout element before the correction may exist within the element region of the layout element after the correction; and that the element arrangement position of the downstream element is corrected so that a position at which the downstream element is arranged when the downstream element is moved along the path until the overlap region is cancelled may be set as the element arrangement position of the downstream element after the correction.

With such a configuration, when the program has been read by the computer, and the computer has executed the processing in conformity with the read program, an operation and an advantage equivalent to those of the element layout apparatus of exemplary embodiment 13 are attained.

[Exemplary embodiment 40] Further, an element layout program of exemplary embodiment 40 consists in the element layout program of any of exemplary embodiments 36 through 38, characterized in:

that the overlap correction device corrects the element arrangement position of the layout element so that a central position of the layout element before the correction may exist within the element region of the layout element after the correction; and that the element arrangement position of the downstream element is corrected so that a position at which the downstream element is arranged when the downstream element is moved in at least one of a substantially horizontal direction and a substantially vertical direction until the overlap region is cancelled may be set as the element arrangement position of the downstream element after the correction.

With such a configuration, when the program has been read by the computer, and the computer has executed the processing in conformity with the read program, an operation and an advantage equivalent to those of the element layout apparatus of exemplary embodiment 14 are attained.

[Exemplary embodiment 41] Further, an element layout program of exemplary embodiment 41 consists in the element layout program of any of exemplary embodiments 36 through 38, characterized in:

that the overlap correction sets as a size of the downstream element after the correction, the size of the downstream element as is reduced with an aspect ratio of the downstream element maintained and without altering the element arrangement position of the downstream element, until the overlap region is cancelled.

With such a configuration, when the program has been read by the computer, and the computer has executed the processing in conformity with the read program, an operation and an advantage equivalent to those of the element layout apparatus of exemplary embodiment 15 are attained.

[Exemplary embodiment 42] Further, an element layout program of exemplary embodiment 42 consists in the element layout program of any of exemplary embodiments 36 through 38, characterized in:

that the overlap correction corrects the element arrangement position of the downstream element so that a position at which the downstream element is arranged when the downstream element is moved in a direction being perpendicular to the path and lengthening the path, until the overlap region is cancelled may be set as the element arrangement position of the downstream element after the correction.

With such a configuration, when the program has been read by the computer, and the computer has executed the processing in conformity with the read program, an operation and advantages equivalent to those of the element layout apparatus of exemplary embodiment 16 are attained.

[Exemplary embodiment 43] Further, an element layout program of exemplary embodiment 43 consists in the element layout program of any of exemplary embodiments 36 through 38, characterized in:

that the overlap correction sets as the skew angle of the layout element after the correction, the skew angle of the layout element as results when at least one of the downstream element and the upstream element is rotated around a central position of the corresponding layout element by altering neither of the element arrangement position of the downstream element and the element arrangement position of the upstream element, until the overlap region is cancelled.

With such a configuration, when the program has been read by the computer, and the computer has executed the processing in conformity with the read program, an operation and advantages equivalent to those of the element layout apparatus of exemplary embodiment 17 are attained.

[Exemplary embodiment 44] Further, an element layout program of exemplary embodiment 44 consists in the element layout program of any of exemplary embodiment 36 through 38, characterized in:

that the overlap correction corrects the element arrangement position of the layout element by expanding the path at equal magnifications substantially vertically and laterally, and setting the same relative position on the path after the correction as the element arrangement position of the layout element arranged on the path before the correction, as the element arrangement position of the layout element after the correction.

With such a configuration, when the program has been read by the computer, and the computer has executed the processing in conformity with the read program, an operation and an advantage equivalent to those of the element layout apparatus of exemplary embodiment 18 are attained.

[Exemplary embodiment 45] Further, an element layout program of exemplary embodiment 45 consists in the element layout program of any of exemplary embodiments 27 through 44, including:

an empty-space decision program for deciding whether or not an empty space interval is greater than a predetermined correction decision interval;

as to the empty space interval which is a distance between the adjacent layout elements along the path, except element regions being regions of the layout elements, or which is an arrangement interval between the adjacent layout elements, and a downstream element being the layout element whose time point specified by the temporal information item is later, and an upstream element being the layout element whose time point specified by the temporal information item is earlier, between the two adjacent layout elements; and an empty-space correction program for correcting at least one information item of the element arrangement position of the downstream element, a size of the downstream element, a skew angle of the downstream element, a shape of the downstream element, the element arrangement position of the upstream element, a size of the upstream element, a skew angle of the upstream element, and a shape of the upstream element so as to decrease the empty space interval, when it has been decided at the empty-space decision that the empty space interval is greater than the predetermined correction decision interval.

With such a configuration, when the program has been read by the computer, and the computer has executed the processing in conformity with the read program, an operation and an advantage equivalent to those of the element layout apparatus of exemplary embodiment 19 are attained.

[Exemplary embodiment 46] Further, an element layout program of exemplary embodiment 46 consists in the element layout program of exemplary embodiment 45, characterized in:

that, as to a boundary region being a region which is constructed of the element region of the layout element and a predetermined marginal region provided around the element region, the empty-space correction sets as the size of the layout element after the correction, the size of the layout element as results when the size of at least one layout element of the downstream element and the upstream element is expanded with an aspect ratio of the corresponding layout element maintained and without altering the element arrangement position thereof, until the decision region of at least layout element of the downstream element and the upstream element overlaps with the boundary region of the layout element adjacent to the corresponding layout element, or until the empty space interval becomes equal to, at most, the predetermined correction decision interval.

With such a configuration, when the program has been read by the computer, and the computer has executed the processing in conformity with the read program, an operation and an advantage equivalent to those of the element layout apparatus of exemplary embodiment 20 are attained.

[Exemplary embodiment 47] Further, an element layout program of exemplary embodiment 47 consists in the element layout program of exemplary embodiment 45, characterized in:

that the empty-space correction corrects the element arrangement position of the layout element so that a central position of the layout element before the correction may exist within the element region of the layout element after the correction; and that the element arrangement position of at least one layout element of the downstream element and the upstream element, except the starting-point element and the end-point element, is corrected so that a position at which the corresponding layout element is arranged when the corresponding layout element is moved along the path until the empty space interval becomes equal to, at most, the predetermined correction decision interval may be set as the element arrangement position of the corresponding layout element after the correction.

With such a configuration, when the program has been read by the computer, and the computer has executed the processing in conformity with the read program, an operation and an advantage equivalent to those of the element layout apparatus of exemplary embodiment 21 are attained.

[Exemplary embodiment 48] Further, an element layout program of exemplary embodiment 48 consists in the element layout program of exemplary embodiment 45, characterized in:

that the empty-space correction corrects the path from the upstream element to an adjacent element before the correction, to a path which connects the upstream element and the adjacent element by a straight line, the adjacent element being the layout element which is adjacent to the downstream element except the end-point element among the downstream elements and which is different from the upstream element, whereupon it corrects the element arrangement position of the downstream element so that a-ratio between an arrangement interval of the upstream element and the downstream element and an arrangement interval of the downstream element and the adjacent element as viewed on the path after the correction may become equal to a ratio between an arrangement interval of the upstream element and the downstream element and an arrangement interval of the downstream element and the adjacent element as viewed on the path before the correction.

With such a configuration, when the program has been read by the computer, and the computer has executed the processing in conformity with the read program, an operation and advantages equivalent to those of the element layout apparatus of exemplary embodiment 22 are attained.

[Exemplary embodiment 49] Further, an element layout program of exemplary embodiment 49 consists in the element layout program of exemplary embodiment 45, characterized in:

that the empty-space correction corrects the element arrangement position of the layout element by reducing the path at substantially equal magnifications vertically and laterally, and setting the same relative position on the path after the correction as the element arrangement position of the layout element arranged on the path before the correction, as the element arrangement position of the layout element after the correction.

With such a configuration, when the program has been read by the computer, and the computer has executed the processing in conformity with the read program, an operation and an advantage equivalent to those of the element layout apparatus of exemplary embodiment 23 are attained.

[Exemplary embodiment 50] Further, an element layout program of exemplary embodiment 50 consists in the element layout program of exemplary embodiment 45, characterized in:

that the empty-space correction arranges a predetermined layout element based on the path, between the layout elements so that the empty space interval may become equal to, at most, the predetermined correction decision interval.

With such a configuration, when the program has been read by the computer, and the computer has executed the processing in conformity with the read program, an operation and advantages equivalent to those of the element layout apparatus of exemplary embodiment 24 are attained.

[Exemplary embodiment 51] Further, an element layout program of exemplary embodiment 51 consists in the element layout program of any of exemplary embodiments 27 through 50, characterized by including a program including:

editing at least one information item of an element arrangement position of the layout element, a size of the layout element, a skew angle of the layout element, and a shape of the layout element based on information inputted through an input device.

With such a configuration, when the program has been read by the computer, and the computer has executed the processing in conformity with the read program, an operation and an advantage equivalent to those of the element layout apparatus of exemplary embodiment 25 are attained.

[Exemplary embodiment 52] Further, an element layout program of Exemplary embodiment 52 consists in an element layout program to lay out a plurality of layout elements, including:

a layout-element-selection-screen display program for displaying a selection screen which displays the plurality of layout elements, and which prompts a user to select a plurality of layout elements from among the displayed layout elements;

a path-information-selection-screen display program for displaying a selection screen which displays a plurality of path information items indicative of paths to arrange the layout elements therealong, and which prompts the user to select a path information item from among the displayed path information items; and a layout-result display program for displaying a layout result in which the selected layout elements are arranged along the path of the selected path information item at an arrangement interval that corresponds to a temporal interval specified by temporal information items relevant to the selected layout elements.

With such a configuration, when the program has been read by the computer, and the computer has executed the processing in conformity with the read program, an operation and an advantage equivalent to those of the element layout apparatus of exemplary embodiment 26 are attained.

[Exemplary embodiment 53] Meanwhile, an element layout method of exemplary embodiment 53 include an element layout method to lay out a plurality of layout elements, characterized by including:

allowing an arithmetic device to select the layout elements based on inputs given by a user, from within layout-element storage device to store therein the layout elements and temporal information items indicating a stream of time, in association with each other;

allowing the arithmetic device to select a path information item based on an input given by the user, from within a path-information storage device to store therein path information items indicative of paths to arrange the layout elements therealong;

allowing the arithmetic device to acquire the temporal information items associated with the layout elements selected at the element selection, from within the layout-element storage device; and allowing the arithmetic device to calculate a difference time period between the layout elements, based on the temporal information items acquired at the temporal-information acquisition, and to arrange the layout elements selected at the element selection, along the path of the path information item selected at the path-information selection and at an arrangement interval between the layout elements as corresponds to the calculated difference time period.

This brings forth an advantage equivalent to that of the element layout apparatus of exemplary embodiment 1.

[Exemplary embodiment 54] Further, an element layout method of exemplary embodiment 54 consists in an element layout method to lay out a plurality of layout elements, including:

allowing an arithmetic device to select the layout elements based on inputs given by a user, from within a layout-element storage device to store the layout elements therein;

allowing the arithmetic device to select a path information item based on an input given by the user, from within path-information storage device to store therein path information items indicative of paths to arrange the layout elements therealong;

allowing the arithmetic device to generate temporal information items indicative of a stream of time as are to be associated with the layout elements selected at the element selection; and allowing the arithmetic device to calculate a difference time period between the layout elements, based on the temporal information items generated at the temporal-information generation, and to arrange the layout elements selected at the element selection, along the path of the path information item selected at the path-information selection and at an arrangement interval between the layout elements as corresponds to the calculated difference time period.

This brings forth advantages equivalent to those of the element layout apparatus of exemplary embodiment 2.

[Exemplary embodiment 55] Further, an element layout method of exemplary embodiment 55 consists in the element layout method of either of exemplary embodiments 53 and 54, characterized in:

that the path-information storage device stores therein index information items relevant to the layout elements, and the path information items in association with the index information items;

that a path-information selection allowing the arithmetic device to select any of the plurality of path information items stored in the path-information storage device; and that the path-information selection selects the index information item relevant to the layout elements, from among the plurality of index information items stored in the path-information storage device, and selects the path information item from at least one path information item associated with the selected index information item.

This brings forth an advantage equivalent to that of the element layout apparatus of exemplary embodiment 3.

[Exemplary embodiment 56] Further, an element layout method of exemplary embodiment 56 consists in the element layout method of any of exemplary embodiments 53 through 55, characterized in:

that the element arrangement brings the difference time period between a starting-point element being the layout element whose time point specified by the temporal information item is the earliest, among the layout elements, and an end-point element being the layout element whose time point specified by the temporal information item is the latest, among the layout elements, into correspondence with the arrangement interval between the starting-point element and the end-point element along the path, that it calculates the arrangement interval between the starting-point element and a subject element being the layout element to-be-laid-out, based on the difference time period between the starting-point element and the subject element, and that it arranges the subject element at the arrangement interval calculated along the path.

This brings forth an advantage equivalent to that of the element layout apparatus of exemplary embodiment 4.

[Exemplary embodiment 57] Further, an element layout method of exemplary embodiment 57 consists in the element layout method of exemplary embodiment 56, characterized in:

that the element arrangement includes:

calculating the difference time period between the starting-point element and the subject element;

calculating the arrangement interval between the starting-point element and the subject element, based on the difference time period between the starting-point element and the end-point element, the arrangement interval between the starting-point element and the end-point element along the path, and the difference time period calculated at the difference-time-period calculation;

calculating as an element arrangement position of the subject element, a position whose distance from a starting point along the path, the starting point being that position on the path at which the starting-point element is arranged, becomes the arrangement interval calculated at the arrangement-interval calculation step; and generating positional information of the subject element so that the element arrangement position calculated at the element-arrangement-position calculation may become a central position of the subject element.

This brings forth an advantage equivalent to that of the element layout apparatus of exemplary embodiment 5.

[Exemplary embodiment 58] Further, an element layout method of exemplary embodiment 58 consists in an element layout method to lay out a plurality of layout elements, including:

allowing an arithmetic device to select a path information item based on an input given by a user, from within path-information storage device to store therein path information items which indicate paths to arrange the layout elements therealong, and a plurality of element arrangement positions being positions on the paths to arrange the plurality of layout elements thereat;

allowing the arithmetic device to select a starting-point element being the layout element which is to be arranged at a starting point, and an end-point element being the layout element which is to be arranged at an end point, from within layout-element storage device to store therein the layout elements and temporal information items indicative of streams of time, in association with each other, respectively for the starting point being the element arrangement position of earliest turn in a sequence to arrange the layout elements therein, and for the end point being the element arrangement position of latest turn in the sequence to arrange the layout elements therein, among the element arrangement positions of the path information items;

allowing the arithmetic device to acquire from the layout-element storage device, starting-point temporal information being the temporal information item which is associated with the starting-point element selected at the starting-point/end-point-element selection, and end-point temporal information being the temporal information item which is associated with the end-point element selected at the starting-point/end-point-element selection;

allowing the arithmetic device to acquire from the layout-element storage device, the temporal information items which are associated with all the layout elements stored in the layout-element storage device; and allowing the arithmetic device to bring an arrangement interval between the starting-point element and the end-point element along the path of the path information selected at the path-information selection; into correspondence with a difference time period of time points which are respectively specified by the starting-point temporal information and the end-point temporal information acquired at the starting-point/end-point-temporal-information acquisition, to calculate arrangement temporal information which is the temporal information item corresponding to the element arrangement position between the starting point and the end point, to retrieve from within the layout-element storage device, the layout element associated with the calculated arrangement temporal information or the layout element associated with the temporal information item nearest to the calculated arrangement temporal information, based on the temporal information items acquired at the temporal-information acquisition, and to arrange the retrieved layout element at the element arrangement position.

This brings forth advantages equivalent to those of the element layout apparatus of exemplary embodiment 6.

[Exemplary embodiment 59] Further, an element layout method of exemplary embodiment 59 consists in an element layout method to lay out a plurality of layout elements, including:

allowing an arithmetic device to select a path information item based on an input given by a user, from within path-information storage device to store therein path information items which indicate paths to arrange the layout elements therealong, and a plurality of element arrangement positions being positions on the paths to arrange the plurality of layout elements thereat;

allowing the arithmetic device to select a starting-point element being the layout element which is to be arranged at a starting point, and an end-point element being the layout element which is to be arranged at an end point, from within layout-element storage device to store the layout elements therein, respectively for the starting point being the element arrangement position of earliest turn in a sequence to arrange the layout elements therein, and for the end point being the element arrangement position of latest turn in the sequence to arrange the layout elements therein, among the element arrangement positions of the path information items;

allowing the arithmetic device to generate starting-point temporal information and end-point temporal information being temporal information items indicative of a stream of time as are to be respectively associated with the starting-point element and the end-point element selected at the starting-point/end-point-element selection;

allowing the arithmetic device to generate temporal information items which are to be associated with all the layout elements stored in the layout-element storage device; and allowing the arithmetic device to bring an arrangement interval between the starting-point element and the end-point element along the path of the path information selected at the path-information selection, into correspondence with a difference time period of time points which are respectively specified by the starting-point temporal information and the end-point temporal information generated at the starting-point/end-point-temporal-information generation, to calculate arrangement temporal information which is a temporal information item corresponding to the element arrangement position between the starting point and the end point, to retrieve from within the layout-element storage device, the layout element associated with the calculated arrangement temporal information or the layout element associated with a temporal information item nearest to the calculated arrangement temporal information, based on the temporal information items generated at the temporal-information generation, and to arrange the retrieved layout element at the element arrangement position.

This brings forth advantages equivalent to those of the element layout apparatus of exemplary embodiment 7.

[Exemplary embodiment 60] Further, an element layout method of exemplary embodiment 60 consists in the element layout method of either of exemplary embodiments 58 and 59, characterized in:

that the path-information storage device stores therein index information items relevant to the layout elements, and the path information items in association with the index information items;

that a path-information selection allowing the arithmetic device to select from among the plurality of path information items stored in the path-information storage device, the path information which indicates the path to arrange the layout elements to-be-laid-out therealong, and the plurality of element arrangement positions to arrange the layout elements thereat; and that the path-information selection selects the index information item relevant to the layout elements to-be-laid-out, from among the plurality of index information items stored in the path-information storage device, and selects the path information item from at least one path information item associated with the selected index information item.

This brings forth an advantage equivalent to that of the element layout apparatus of exemplary embodiment 8.

[Exemplary embodiment 61] Further, an element layout method of exemplary embodiment 61 consists in the element layout method of any of exemplary embodiments 58 through 60, characterized in:

that the element arrangement includes:
  calculating an arrangement interval between the starting point and the element arrangement position along the path, based on the starting point and the element arrangement position;
  calculating a difference time period between the starting-point temporal information and the arrangement temporal information associated with the element arrangement position, based on an arrangement interval between the starting-point element and the end-point element, a difference time period between the starting-point element and the end-point element, and the arrangement interval calculated at the arrangement-interval calculation;
  calculating the arrangement temporal information associated with the element arrangement position, based on the difference time period calculated at the difference-time-period calculation, and the starting-point temporal information;
  retrieving the layout element associated with the calculated arrangement temporal information or the layout element associated with the temporal information item nearest to the calculated arrangement temporal information, from among the plurality of layout elements stored in the layout-element storage device, based on the temporal information items; and
  generating positional information of the layout element so that the element arrangement position may become a central position of the layout element.

This brings forth an advantage equivalent to that of the element layout apparatus of exemplary embodiment 9.

[Exemplary embodiment 62] Further, an element layout method of exemplary embodiment 62 consists in the element layout method of any of exemplary embodiments 53 through 61, including:
  allowing the arithmetic device to decide whether or not an overlap region in which overlap-correction decision regions of adjacent ones of the layout elements overlap each other exists;

as to the overlap-correction decision regions being those regions of the layout elements which are set to decide the overlap between the layout elements, and a downstream element being the layout element whose time point specified by the temporal information item is later, and an upstream element being the layout element whose time point specified by the temporal information item is earlier, between the two adjacent layout elements except the starting-point element and the end-point element; and allowing the arithmetic device to correct at least one information item of the element arrangement position of the downstream element, a size of the downstream element, a skew angle of the downstream element, a shape of the downstream element, the element arrangement position of the upstream element, a size of the upstream element, a skew angle of the upstream element, and a shape of the upstream element so as to decrease the overlap region, when it has been decided at the overlap-region decision, that the overlap region exists.

This brings forth an advantage equivalent to that of the element layout apparatus of exemplary embodiment 10.

[Exemplary embodiment 63] Further, an element layout method of exemplary embodiment 63 consists in the element layout method of exemplary embodiment 62, characterized in:

that the overlap-correction decision region includes an element region which is a region of the layout element, and a predetermined marginal region which is provided around the element region.

This brings forth an advantage equivalent to that of the element layout apparatus of exemplary embodiment 11.

[Exemplary embodiment 64] Further, an element layout method of exemplary embodiment 64 consists in the element layout method of exemplary embodiment 62, characterized in:

that the overlap-correction decision region includes an indispensable element region which is a partial region of the layout element as is necessary for the layout, and a predetermined marginal region which is provided around the indispensable element region.

This brings forth an advantage equivalent to that of the element layout apparatus of exemplary embodiment 12.

[Exemplary embodiment 65] Further, an element layout method of exemplary embodiment 65 consists in the element layout method of any of exemplary embodiments 62 through 64, characterized in:

that the overlap correction corrects the element arrangement position of the layout element so that a central position of the layout element before the correction may exist within the element region of the layout element after the correction; and that the element arrangement position of the downstream element is corrected so that a position at which the downstream element is arranged when the downstream element is moved along the path until the ovarian region is cancelled may be set as the element arrangement position of the downstream element after the correction.

This brings forth an advantage equivalent to that of the element layout apparatus of exemplary embodiment 13.

[Exemplary embodiment 66] Further, an element layout method of exemplary embodiment 66 consists in the element layout method of any of exemplary embodiments 62 through 64, characterized in:

that the overlap correction corrects the element arrangement position of the layout element so that a central position of the layout element before the correction may exist within the element region of the layout element after the correction; and that the element arrangement position of the downstream element is corrected so that a position at which the downstream element is arranged when the downstream element is moved in at least one of a substantially horizontal direction and a substantially vertical direction until the overlap region is cancelled may be set as the element arrangement position of the downstream element after the correction.

This brings forth an advantage equivalent to that of the element layout apparatus of exemplary embodiment 14.

[Exemplary embodiment 67] Further, an element layout method of exemplary embodiment 67 consists in the element layout method of any of exemplary embodiments 62 through 64, characterized in:

that the overlap correction sets as a size of the downstream element after the correction, the size of the downstream element as is reduced with an aspect ratio of the downstream element maintained and without altering the element arrangement position of the downstream element, until the overlap region is cancelled.

This brings forth an advantage equivalent to that of the element layout apparatus of exemplary embodiment 15.

[Exemplary embodiment 68] Further, an element layout method of exemplary embodiment 68 consists in the element layout method of any of exemplary embodiment 62 through 64, characterized in:

that the overlap correction corrects the element arrangement position of the downstream element so that a position at which the downstream element is arranged when the downstream element is moved in a direction being perpendicular to the path and lengthening the path, until the overlap region is cancelled may be set as the element arrangement position of the downstream element after the correction.

This brings forth advantages equivalent to those of the element layout apparatus of exemplary embodiment 16.

[Exemplary embodiment 69] Further, an element layout method of exemplary embodiment 69 consists in the element layout method of any of exemplary embodiments 62 through 64, characterized in:

that the overlap correction sets as the skew angle of the layout element after the correction, the skew angle of the layout element as results when at least one of the downstream element and the upstream element is rotated around a central position of the corresponding layout element by altering neither of the element arrangement position of the downstream element and the element arrangement position of the upstream element, until the overlap region is cancelled.

This brings forth advantages equivalent to those of the element layout apparatus of exemplary embodiment 17.

[Exemplary embodiment 70] Further, an element layout method of exemplary embodiment 70 consists in the element layout method of any of exemplary embodiments 62 through 64, characterized in:

that the overlap correction corrects the element arrangement position of the layout element by expanding the path at equal magnifications vertically and laterally, and setting the same relative position on the path after the correction as the element arrangement position of the layout element arranged on the path before the correction, as the element arrangement position of the layout element after the correction.

This brings forth an advantage equivalent to that of the element layout apparatus of exemplary embodiment 18.

[Exemplary embodiment 71] Further, an element layout method of exemplary embodiment 71 consists in the element layout method of any of exemplary embodiments 53 through 70, including:

allowing the arithmetic device to decide whether or not an empty space interval is greater than a predetermined correction decision interval;
as to the empty space interval which is a distance between the adjacent layout elements along the path, except element regions being regions of the layout elements, or which is an arrangement interval between the adjacent layout elements, and a downstream element being the layout element whose time point specified by the temporal information item is later, and an upstream element being the layout element whose time point specified by the temporal information item is earlier, between the two adjacent layout elements; and
allowing the arithmetic device to correct at least one information item of the element arrangement position of the downstream element, a size of the downstream element, a skew angle of the downstream element, a shape of the downstream element, the element arrangement position of the upstream element, a size of the upstream element, a skew angle of the upstream element, and a shape of the upstream element so as to decrease the empty space interval, when it has been decided at the empty-space decision that the empty space interval is greater than the predetermined correction decision interval.

This brings forth an advantage equivalent to that of the element layout apparatus of exemplary embodiment 19.

[Exemplary embodiment 72] Further, an element layout method of exemplary embodiment 72 consists in the element layout method of exemplary embodiment 71, characterized in:

that, as to a boundary region being a region which is constructed of the element region of the layout element and a predetermined marginal region provided around the element region, the empty-space correction sets as the size of the layout element after the correction, the size of the layout element as results when the size of at least one layout element of the downstream element and the upstream element is expanded with an aspect ratio of the corresponding layout element maintained and without altering the element arrangement position thereof, until the decision region of at least layout element of the downstream element and the upstream element overlaps with the boundary region of the layout element adjacent to the corresponding layout element, or until the empty space interval becomes equal to, at most, the predetermined correction decision interval.

This brings forth an advantage equivalent to that of the element layout apparatus of exemplary embodiment 20.

[Exemplary embodiment 73] Further, an element layout method of exemplary embodiment 73 consists in the element layout method of exemplary embodiment 71, characterized in:

that the empty-space correction corrects the element arrangement position of the layout element so that a central position of the layout element before the correction may exist within the element region of the layout element after the correction; and that the element arrangement position of at least one layout element of the downstream element and the upstream element except the starting-point element and the end-point element, is corrected so that a position at which the corresponding layout element is arranged when the corresponding layout element is moved along the path until the empty space interval becomes equal to, at most, the predetermined correction decision interval may be set as the element arrangement position of the corresponding layout element after the correction.

This brings forth an advantage equivalent to that of the element layout apparatus of exemplary embodiment 21.

[Exemplary embodiment 74] Further, an element layout method of exemplary embodiment 74 consists in the element layout method of exemplary embodiment 71, characterized in:

that the empty-space correction corrects the path from the upstream element to an adjacent element before the correction, to a path which connects the upstream element and the adjacent element by a straight line, the adjacent element being the layout element which is adjacent to the downstream element except the end-point element among the downstream elements and which is different from the upstream element, whereupon it corrects the element arrangement position of the downstream element so that a ratio between an arrangement interval of the upstream element and the downstream element and an arrangement interval of the downstream element and the adjacent element as viewed on the path after the correction may become equal to a ratio between an arrangement interval of the upstream element and the downstream element and an arrangement interval of the downstream element and the adjacent element as viewed on the path before the correction.

This brings forth advantages equivalent to those of the element layout apparatus of exemplary embodiment 22.

[Exemplary embodiment 75] Further, an element layout method of exemplary embodiment 75 consists in the element layout method of exemplary embodiment 71, characterized in:

that the empty-space correction corrects the element arrangement position of the layout element by reducing the path at equal magnifications vertically and laterally, and setting the same relative position on the path after the correction as the element arrangement position of the layout element arranged on the path before the correction, as the element arrangement position of the layout element after the correction.

This brings forth an advantage equivalent to that of the element layout apparatus of exemplary embodiment 23.

[Exemplary embodiment 76] Further, an element layout method of exemplary embodiment 76 consists in the element layout method of exemplary embodiment 71, characterized in:

that the empty-space correction arranges a predetermined layout element based on the path, between the layout elements so that the empty space interval may become equal to, at most, the predetermined correction decision interval.

This brings forth advantages equivalent to those of the element layout apparatus of exemplary embodiment 24.

[Exemplary embodiment 77] Further, an element layout method of exemplary embodiment 77 consists in the element layout method of any of exemplary embodiment 53 through 76, including:

allowing the arithmetic device to edit at least one information item of an element arrangement position of the layout element, a size of the layout element, a skew angle of the layout element, and a shape of the layout element based on information inputted through an input device.

This brings forth an advantage equivalent to that of the element layout apparatus of exemplary embodiment 25.

[Exemplary embodiment 78] Further, an element layout method of exemplary embodiment 78 consists in an element layout method to lay out a plurality of layout elements, including:

allowing an arithmetic device to display a selection screen which displays the plurality of layout elements, and which prompts a user to select a plurality of layout elements from among the displayed layout elements;

allowing the arithmetic device to display a selection screen which displays a plurality of path information items indicative of paths to arrange the layout elements thereal ong, and which prompts the user to select a path information item from among the displayed path information items; and allowing the arithmetic device to display a layout result in which the selected layout elements are arranged along the path of the selected path information item at an arrangement interval that corresponds to a temporal interval specified by temporal information items relevant to the selected layout elements.

This brings forth an advantage equivalent to that of the element layout apparatus of exemplary embodiment 26.

DETAILED DESCRIPTION OF PREFERRED EMBODIMENTS

Exemplary embodiments of this invention will be described with reference to the drawings.

The first exemplary embodiment will be described with reference to FIGS. 1 through 19.

An element layout process in which layout elements are pasted on an album board in accordance with exemplary embodiments of the present invention will be described with reference to FIGS. 1 and 2. Photographic images and video-recorder images will be exemplified as the layout elements in the description.

Figure 1:
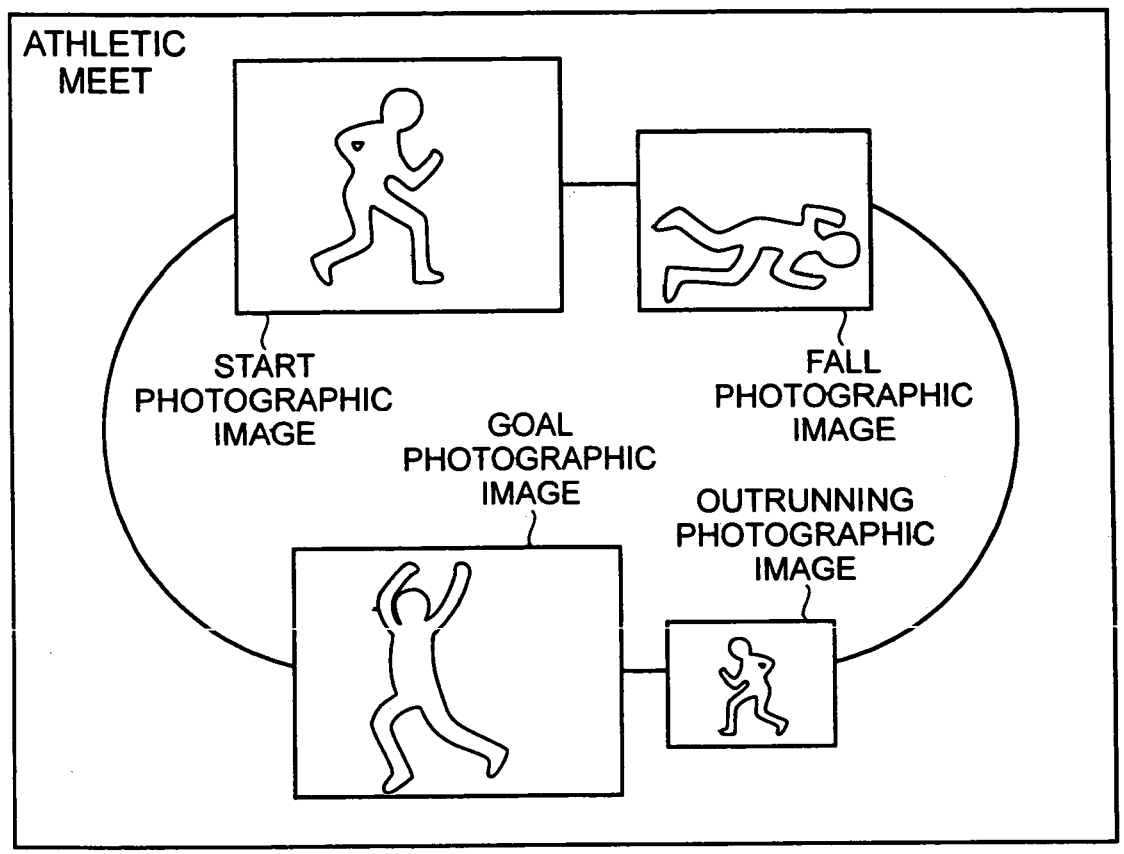
FIG. 1 is a schematic showing an album board on which photographic images are laid out by an element layout apparatus.

FIG. 1 is a schematic showing an album board on which photographic images are laid out by an element layout apparatus.

FIG. 2 is a schematic to explain an advantage which is based on positions where the photographic images are arranged.

As shown in FIG. 1, the four photographic images of a track event in an athletic meet are arranged on a path simulative of a track by the element layout apparatus of the invention. Due to the layout of the photographic images, ambience with the lapse of time is expressed. Here, the four photographic images are a start photographic image, a fall photographic image, an outrunning photographic image and a goal photographic image.

Figure 2C:
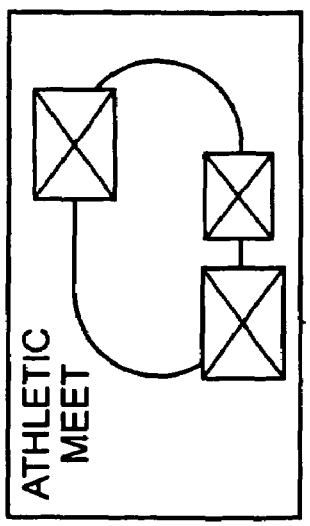
FIGS. 2A–C are schematics explaining an advantage which is based on positions where the photographic images are arranged.
Figure 2B:
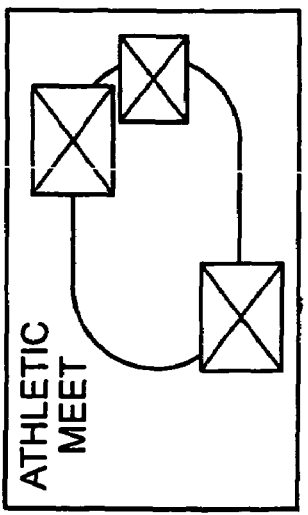
Figure 2A:
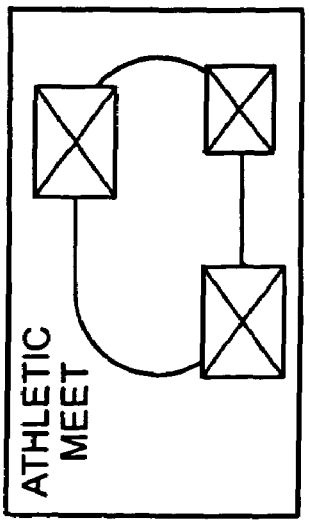

By way of example, when a runner fell flat to the ground shortly after the start, the ambience with the lapse of time can be conveyed to a user by arranging the start photographic image, fall photographic image and goal photographic image with a short interval held between the start photographic image and the fall photographic image. Accordingly, the fall can be expressed shortly after the start, as shown in FIG. 2(b), more than by arranging the three photographic images at equal intervals as shown in FIG. 2(a). Besides, when the runner outran another immediately before the goal, the ambience with the lapse of time can be conveyed to the user by arranging the start photographic image, outrunning photographic image and goal photographic image with a short interval held between the outrunning photographic image and the goal photographic image. Accordingly, the outrunning can be expressed immediately before the goal, as shown in FIG. 2(c), more than by arranging the three photographic images at the equal intervals as shown in FIG. 2(a).

Next, the configuration of the element layout apparatus will be described.

Figure 3:
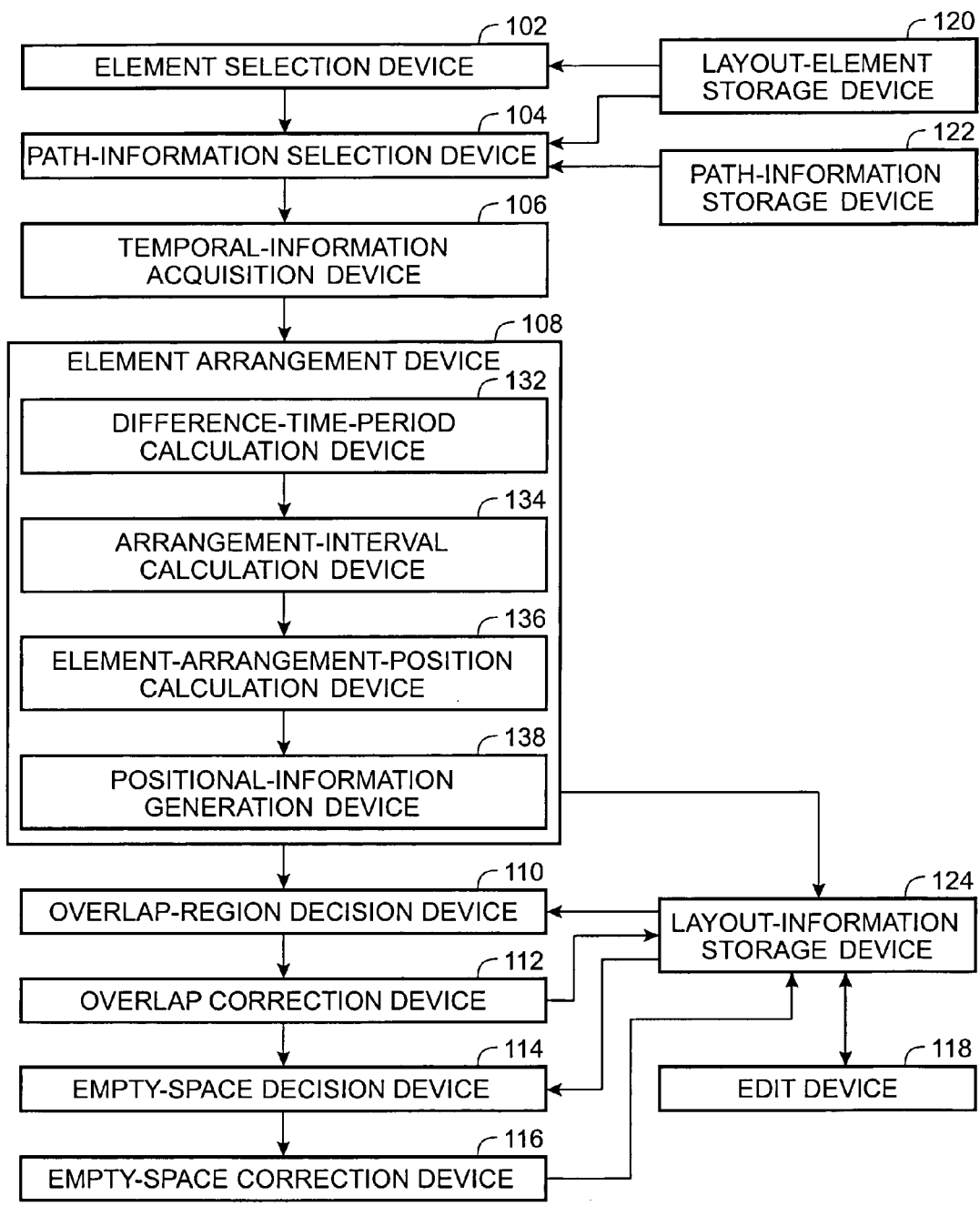
FIG. 3 is a schematic block diagram of the element layout apparatus 100 in a first exemplary embodiment.

FIG. 3 is a schematic functional block diagram of the element layout apparatus 100 of the first exemplary embodiment.

As shown in FIG. 3, the element layout apparatus 100 includes element selection device 102, path-information selection device 104, temporal-information acquisition device 106, element arrangement device 108, overlap-region decision device 110, overlap correction device 112, empty-space decision device 114, empty-space correction device 116, edit device 118, layout-element storage device 120, path-information storage device 122 and layout-information storage device 124.

The element selection device 102 lets the user select through an input device, photographic images desired to be pasted on an album board, from within the layout-element storage device 120 storing a plurality of photographic images therein. In a case, for example, where the user desires to paste on the album board, photographic images taken at the track event of an athletic meet, he/she can select the impressive photographic images of the track event from among a plurality of photographic images taken in the athletic meet.

The path-information selection device 104 lets the user select through the input device, path information to arrange the photographic images selected by the element selection device 102, from within the path-information storage device 122 storing therein a plurality of path information items for respective events (for example, the athletic meet, a wedding ceremony and a birthday). In the case, for example, where the user desires to paste on the album board the photographic images taken at the track event of the athletic meet, the path-information selection device 104 lets the user select the athletic meet from among the plurality of events. Further, it lets the user select path information indicating a path simulative of a track, from among a plurality of path information items prepared on the basis of the event information of the athletic meet.

The temporal-information acquisition device 106 acquires from the layout-element storage device 120, temporal information items which are associated with the photographic images selected by the element selection device 102. Time information indicative of a time point at which each photographic image was taken, will be exemplified as the temporal information in the description below.

The element arrangement device 108 calculates the difference time period between the photographic images, on the basis of the time information items acquired by the temporal-information acquisition device 106, the photographic images are arranged along the path selected by the path-information selection device 104, at the arrangement interval between the photographic images that correspond to the calculated difference time period, and the positional information items of the photographic images are stored in the layout-information storage device 124. More specifically, among the photographic images selected by the element selection device 102, one of the earliest time point as specified by the time information is set as a starting-point photographic image. One of the latest time point as specified by the time information, is set as an end-point photographic image, and one to be laid out is set as a subject photographic image. Then, a time period from the time information of the starting-point photographic image to that of the end-point photographic image is brought into correspondence with the arrangement interval between the starting-point photographic image and the end-point photographic image along the path. The arrangement interval between the starting-point photographic image and the subject photographic image along the path is calculated on the basis of a time period from the time information of the starting-point photographic image to that of the subject photographic image, and the subject photographic image is arranged at the calculated arrangement interval. The positional information of the subject photographic image is stored in the layout-information storage device 124.

In, for example, FIG. 1, the starting-point photographic image is the start photographic image, and the end-point photographic image is the goal photographic image. A time period from the time information of the start photographic image to that of the goal photographic image is brought into correspondence with the arrangement interval between the start photographic image and the goal photographic image. The arrangement interval between the start photographic image and fall photographic image is calculated on the basis of a time period from the time information of the start photographic image to that of the fall photographic image, and the fall photographic image is arranged at the calculated arrangement interval.

Besides, the element arrangement device 108 further includes difference-time-period calculation device 132, arrangement-interval calculation device 134, element-arrangement-position calculation device 136 and positional-information generation device 138.

The difference-time-period calculation device 132 calculates the time period from the time information of the starting-point photographic image to that of the subject photographic image as the difference time period.

The arrangement-interval calculation device 134 calculates the arrangement interval between the starting-point photographic image and the subject photographic image, on the basis of the time period from the time information of the starting-point photographic image to that of the end-point photographic image, the arrangement interval between the starting-point photographic image and the end-point photographic image along the path, and a time period from the time information of the starting-point photographic image and that of the subject photographic image as calculated by the difference-time-period calculation device 132. By way of example, it is assumed in FIG. 1 that the time information of the start photographic image is 9 o'clock 45 minutes 13 seconds, that the time information of the fall photographic image is 9 o'clock 45 minutes 18 seconds, that the time information of the outrunning photographic image is 9 o'clock 45 minutes 53 seconds, and that the time information of the goal photographic image be 9 o'clock 46 minutes 03 seconds. Then, the time period from the time information of the start photographic image to that of the goal photographic image is 50 seconds, whereas a time period from the time information of the start photographic image to that of the fall photographic image is 5 seconds. Therefore, an arrangement interval from the start photographic image to the fall photographic image becomes 5/50 of the arrangement interval from the starting point to the end point along the path.

Assuming the starting point to be a position at which the starting-point photographic image is arranged, the element-arrangement-position calculation device 136 calculates as the element arrangement position of the subject photographic image, a position whose distance from the starting point along the path becomes equal to the arrangement interval calculated by the arrangement-interval calculation device 134.

The positional-information generation device 138 generates the positional information of the subject photographic image so that the element arrangement position of the subject photographic image calculated by the element-arrangement-position calculation device 136 may become the central position of this subject photographic image, and it stores the generated positional information in the layout-information storage device 124.

Assuming that an overlap-correction decision region is the region of a photographic image set for deciding the overlap between photographic images, and that a downstream photographic image is the photographic image of later time information between the adjacent photographic images, except the starting-point photographic image and the end-point photographic image, while an upstream photographic image is the photographic image of earlier time information, then the overlap-region decision device 110 decides the existence or nonexistence of an overlap region where the overlap-correction decision region of the downstream photographic image and that of the upstream photographic image overlap each other.

FIG. 4 is a schematic showing the overlap-correction decision region.

Figure 4A:
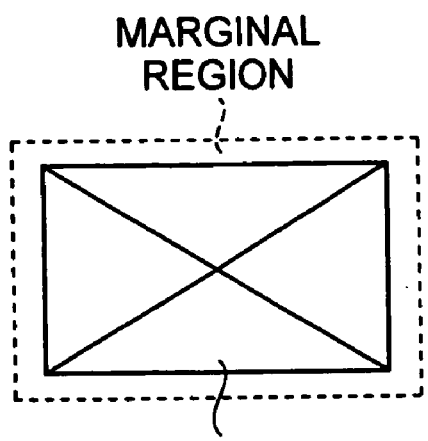
FIGS. 4A–B are schematics showing an overlap-correction decision region.
Figure 4B:
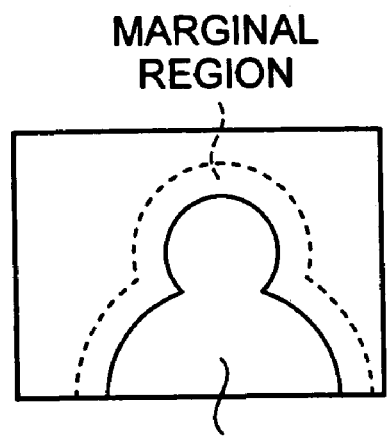

As shown in FIG. 4A by way of example, the overlap-correction decision region includes a photographic image region which is the essential region of a photographic image, and a predetermined marginal region which is set around the photographic image region. Alternatively, as shown in FIG. 4B by way of example, the overlap-correction decision region includes an indispensable photographic image region which is a partial region of a photographic image as is necessary for layout, and a predetermined marginal region which is set around the indispensable photographic image region. In the ensuing description, the overlap-correction decision region shall include the photographic image region being the essential region of the photographic image, and the predetermined marginal region set around the photographic image region.

When the existence of the overlap region has been decided by the overlap-region decision device 110, the overlap correction device 112 corrects at least one information item among the element arrangement position of the downstream photographic image, the size thereof, the skew angle thereof and the shape thereof, and the element arrangement position of the upstream photographic image, the size thereof, the skew angle thereof and the shape thereof, so as to decrease the overlap region by utilizing at least one of a plurality of overlap correction processes. The details of the overlap correction processes will be explained later.

Assuming that an empty space interval is the distance between the adjacent photographic images along the path as excludes the photographic image regions being the essential regions of these photographic images, or the arrangement interval between the adjacent photographic images, and that the downstream photographic image is the photographic image of later time information between the adjacent photographic images, except the starting-point photographic image and the end-point photographic image, while the upstream photographic image is the photographic image of earlier time information, then the empty-space decision device 114 decides whether or not the empty space interval is greater than a predetermined correction decision interval. That is, the decision device 114 decides whether or not the album board on which the photographic images are to be pasted has an excessively large empty space part to spoil the appearance. In the ensuing description, the distance between the adjacent photographic images along the path as excludes the photographic image regions being the essential regions of these photographic images will be exemplified as the empty space interval.

Figure 5:
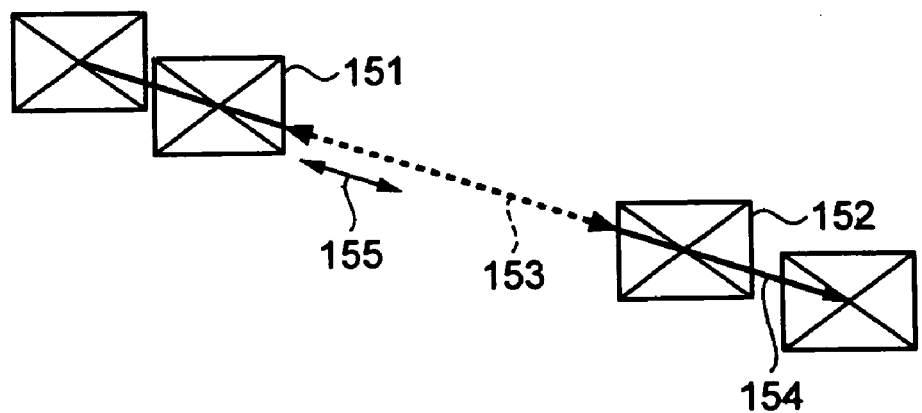
FIG. 5 is a schematic to explain the decision of an empty space interval.

FIG. 5 is a schematic showing the decision of the empty space interval.

As shown in FIG. 5, the empty space interval between photographic images 151 and 152 is that distance on a path 154 which is indicated by a double-headed arrow 153 of broken line. Besides, a correction decision interval is indicated by a double-headed arrow 155. The empty-space decision device 114 decides whether or not the empty space interval is greater than the predetermined correction decision interval, that is, whether or not the length of the broken-line double-headed arrow 153 is greater than that of the double-headed arrow 155.

When it has been decided by the empty-space decision device 114 that the empty space interval is greater than the predetermined correction decision interval, the empty-space correction device 116 corrects at least one information item among the element arrangement position of the downstream photographic image, the size thereof, the skew angle thereof and the shape thereof, and the element arrangement position of the upstream photographic image, the size thereof, the skew angle thereof and the shape thereof, so as to decrease the empty space interval by utilizing at least one of a plurality of empty-space correction processes. The details of the empty-space correction processes will be explained later.

The edit device 118 edits at least one information item among the element arrangement position of the photographic image under layout, the size thereof, the skew angle thereof and the shape thereof, on the basis of information inputted by the user through the input device.

Figure 6:
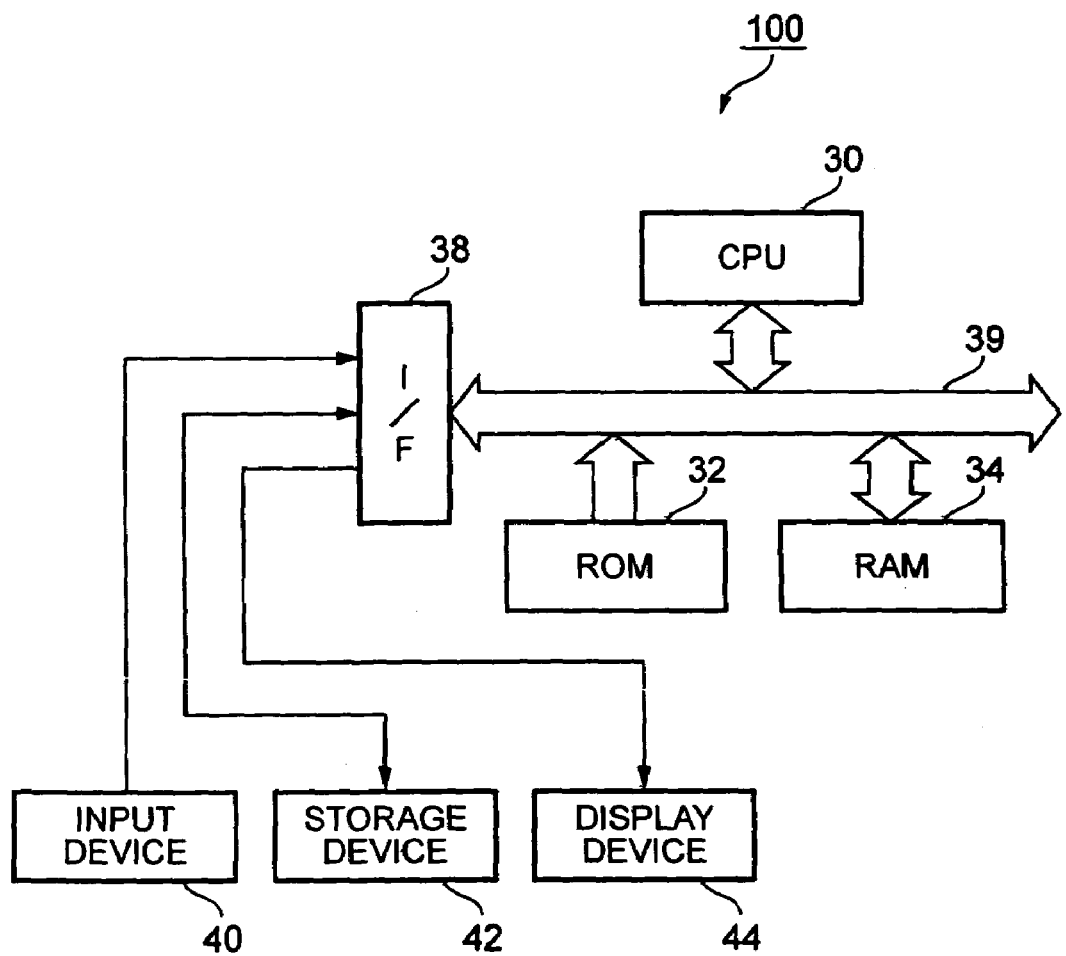
FIG. 6 is a schematic showing the hardware configuration of the element layout apparatus 100.

FIG. 6 is a schematic diagram showing the hardware configuration of the element layout apparatus 100.

As shown in FIG. 6, the element layout apparatus 100 includes a CPU 30 which controls calculations and the whole apparatus on the basis of a control program, a ROM 32 in which the control program of the CPU 30, etc. are stored in predetermined areas beforehand, a RAM 34 which serves to store therein information items read out of the ROM 32, etc. and calculated results required in the calculating course of the CPU 30, and an interface 38 through which information items are inputted from and outputted to external devices. Besides, the CPU 30, ROM 32, RAM 34 and interface 38 are connected to one another and so as to be capable of exchanging information, by a bus 39 which is constructed of signal lines to transfer the information.

Connected to the interface 38 are an input device 40 which includes a keyboard, a mouse and/or the like capable of inputting data as human interfaces, a storage device 42 which stores data, tables, etc. as files therein, and a display device 44 which displays a screen on the basis of an image signal.

Incidentally, the element selection device 102 and the path-information selection device 104 are incarnated by programs which are run by the input device 40, display device 44 and CPU 30. Besides, the temporal-information acquisition device 106, element arrangement device 108, overlap-region decision device 110, overlap correction device 112, empty-space decision device 114, empty-space correction device 116 and edit device 118 are incarnated by programs which are run by the CPU 30. Further, the layout-element storage device 120, path-information storage device 122 and layout-information storage device 124 are incarnated by the storage device 42.

Next, the details of the overlap correction processes will be described with reference to FIGS. 7 through 12.

Six exemplary methods will be described as the overlap correction processes below.

The first overlap-correction-process method is a method in which the central position of the downstream photographic image is moved toward the end point along the path until the overlap region is cancelled.

Figure 7:
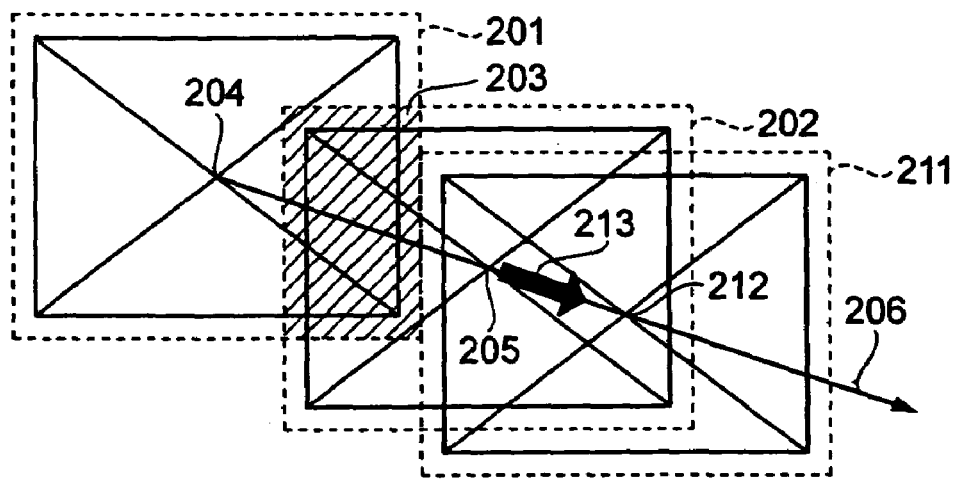
FIG. 7 is a schematic to explain a first exemplary overlap-correction-process method.

FIG. 7 is a schematic showing the first exemplary overlap-correction-process method.

As shown in FIG. 7, when an overlap region 203 exists due to the overlap between the overlap-correction decision region 201 of the upstream photographic image and that 202 of the downstream photographic image, the central position 205 of the downstream photographic image is moved in an end-point direction 213 (that is, in a direction coming away from the central position 204 of the upstream photographic image) along a path 206 until the overlap region 203 is cancelled. Thus, the overlap-correction decision region 202 of the downstream photographic image is moved to the overlap-correction decision region 211 thereof after the correction, and the central position 205 of the downstream photographic image is moved to the central position 212 thereof after the correction.

The second exemplary overlap-correction-process method is a method in which the central position of the downstream photographic image is moved in at least one of a horizontal direction and a vertical direction until the overlap region is cancelled.

Figure 8:
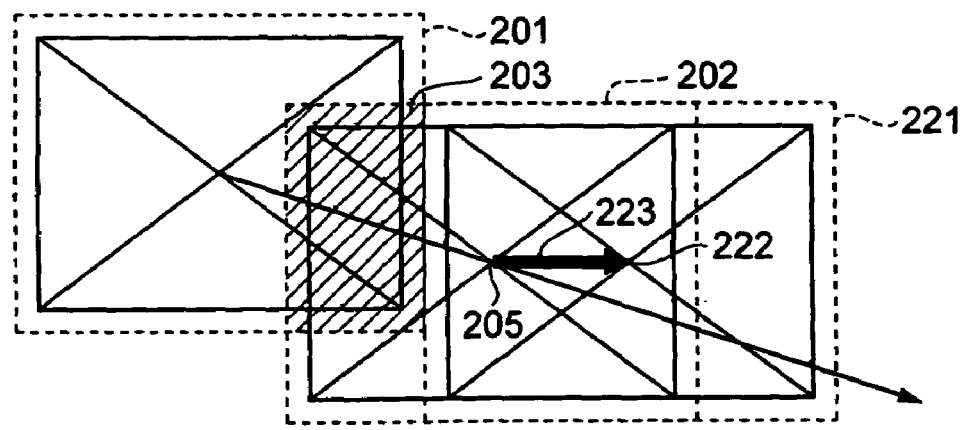
FIG. 8 is a schematic to explain a second exemplary overlap-correction-process method.

FIG. 8 is a schematic showing the second exemplary overlap-correction-process method.

As shown in FIG. 8, when an overlap region 203 exists due to the overlap between the overlap-correction decision region 201 of the upstream photographic image and that 202 of the downstream photographic image, the central position 205 of the downstream photographic image is moved in the horizontal direction 223 until the overlap region 203 is cancelled. Thus, the overlap-correction decision region 202 of the downstream photographic image is moved to the overlap-correction decision region 221 thereof after the correction, and the central position 205 of the downstream photographic image is moved to the central position 222 thereof after the correction.

The third exemplary overlap-correction-process method is a method in which the size of the downstream photographic image is reduced with the aspect ratio thereof maintained, until the overlap region is cancelled.

Figure 9:
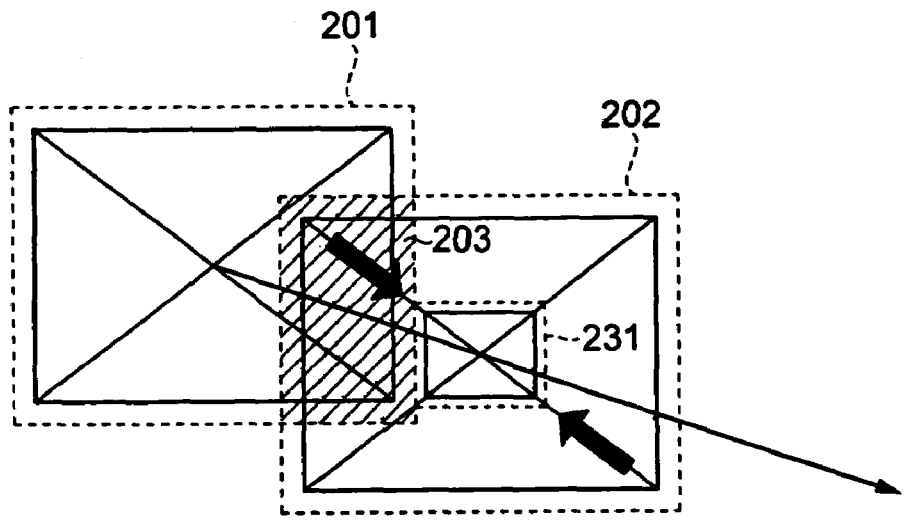
FIG. 9 is a schematic to explain a third exemplary overlap-correction-process method.

FIG. 9 is a schematic showing the third exemplary overlap-correction-process method.

As shown in FIG. 9, when an overlap region 203 exists due to the overlap between the overlap-correction decision region 201 of the upstream photographic image and that 202 of the downstream photographic image, the size of the downstream photographic image is reduced with the aspect ratio thereof maintained. Thus, the overlap-correction decision region 202 of the downstream photographic image is reduced to the overlap-correction decision region 231 thereof after the correction.

The fourth exemplary overlap-correction-process method is a method in which the central position of the downstream photographic image is moved in a direction which is perpendicular to the path and in which the path is lengthened, until the overlap region is cancelled.

Figure 10:
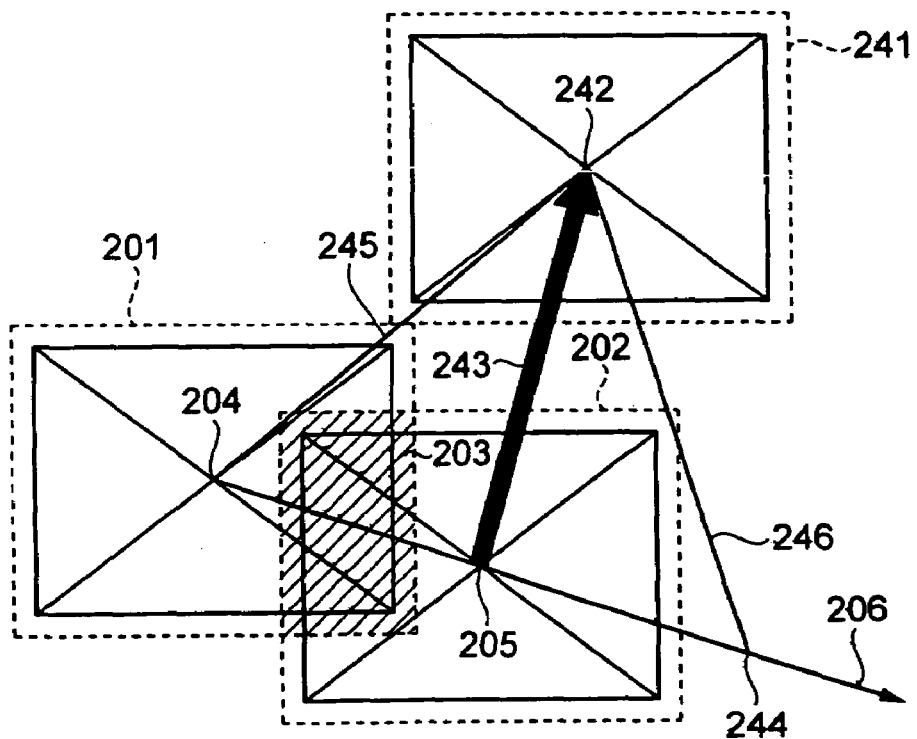
FIG. 10 is a schematic to explain a fourth exemplary overlap-correction-process method.

FIG. 10 is a schematic showing the fourth exemplary overlap-correction-process method.

As shown in FIG. 10, when an overlap region 203 exists due to the overlap between the overlap-correction decision region 201 of the upstream photographic image and that 202 of the downstream photographic image, the central position 205 of the downstream photographic image is moved in a direction 243 perpendicular to a path 206 and lengthening the path 206, until the overlap region 203 is cancelled. Thus, the overlap-correction decision region 202 of the downstream photographic image is moved to the overlap-correction decision region 241 thereof after the correction, and the central position 205 of the downstream photographic image is moved to the central position 242 thereof after the correction. On this occasion, supposing that point 244 on the path 206 with which the central position 204 of the upstream photographic image is in point symmetry relative to the central position 205 of the downstream photographic image before the correction, a path after the correction that extends from the central position 204 of the upstream photographic image to the point 244, consists of a segment 245 which connects the central position 204 of the upstream photographic image with the central position 242 of the downstream photographic image after the correction, by a straight line, and a segment 246 which connects the point 244 with the central position 242 of the downstream photographic image after the correction, by a straight line, so as to pass the central position 242 of the downstream photographic image after the correction.

The fifth exemplary overlap-correction-process method is a method in which at least one of the downstream photographic image and the upstream photographic image is rotated around the central position of the corresponding photographic image until the overlap region is cancelled.

Figure 11:
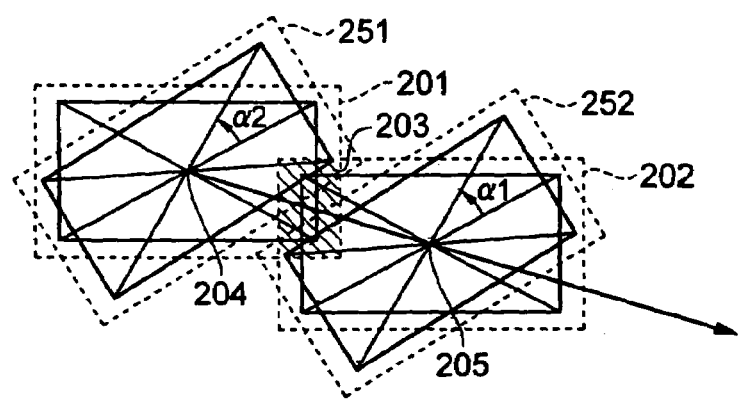
FIG. 11 is a schematic to explain a fifth exemplary overlap-correction-process method.

FIG. 11 is a schematic showing the fifth overlap-correction-process method.

As shown in FIG. 11, when an overlap region 203 exists due to the overlap between the overlap-correction decision region 201 of the upstream photographic image and that 202 of the downstream photographic image, at least one of the downstream photographic image and the upstream photographic image is rotated $\alpha 1$ or $\alpha 2$ around the central position of the corresponding photographic image until the overlap region 203 is cancelled. That is, in case of the downstream photographic image, this downstream photographic image is rotated around its central position 205, and in case of the upstream photographic image, this upstream photographic image is rotated around its central position 204. On this occasion, the overlap-correction decision region of the upstream photographic image after the correction becomes a region 251, and the overlap-correction decision region of the downstream photographic image after the correction, becomes a region 252.

In the overlap correction processes explained above, a range in which the downstream photographic image is movable shall be a range in which the central position of the downstream photographic image before the correction exists in the photographic image region of the downstream photographic image after the correction.

Figure 12:
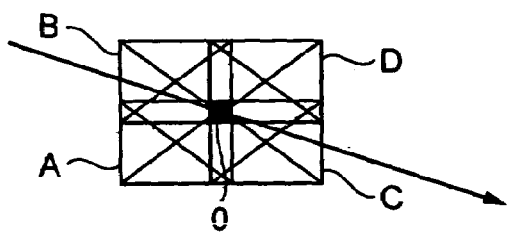
FIG. 12 is a schematic to explain a range in which a downstream photographic image is movable.

FIG. 12 is a schematic showing the range in which the downstream photographic image is movable.

As shown in FIG. 12, the range in which the downstream photographic image can be moved by the correction is the range in which, letting O denote the central position of the downstream photographic image before the correction, the central position O exists in the photographic image region of the downstream photographic image after the correction. More specifically, 1) a region A indicates that photographic image region of the downstream photographic image after the correction in which the central position O lies at the upper end part of the right end side of the photographic image region; 2) a region B indicates that photographic image region of the downstream photographic image after the correction in which the central position O lies at the lower end part of the right end side of the photographic image region; 3) a region C indicates that photographic image region of the downstream photographic image after the correction in which the central position O lies at the upper end part of the left end side of the photographic image region; and 4) a region D indicates that photographic image region of the downstream photographic image after the correction in which the central position O lies at the lower end part of the left end side of the photographic image region. In this case, the range in which the photographic image region of the downstream photographic image is moved in each of the overlap correction processes explained above lies within a region which is defined by the regions A, B, C and D, after the correction.

The sixth exemplary overlap-correction-process method is a method in which the path is expanded at equal magnifications vertically and laterally, and in which, regarding the element arrangement position of the photographic image arranged on the path before the correction, the same relative position along the path after the correction is set as the element arrangement position of the photographic image after the correction.

Next, the details of the empty-space correction processes will be described with reference to FIGS. 13 through 15.

Five exemplary methods will be described as the empty-space correction processes below.

The first exemplary empty-space-correction-process method is a method in which, when a boundary region denotes a region which is formed of the photographic image region of each photographic image and the predetermined marginal region set around the photographic image region, the size of at least one of the downstream photographic image and the upstream photographic image is expanded with the aspect ratio thereof maintained, until the boundary regions of the adjacent photographic images overlap each other, or until the empty space interval becomes equal to, at most, the predetermined correction decision interval.

Figure 13:
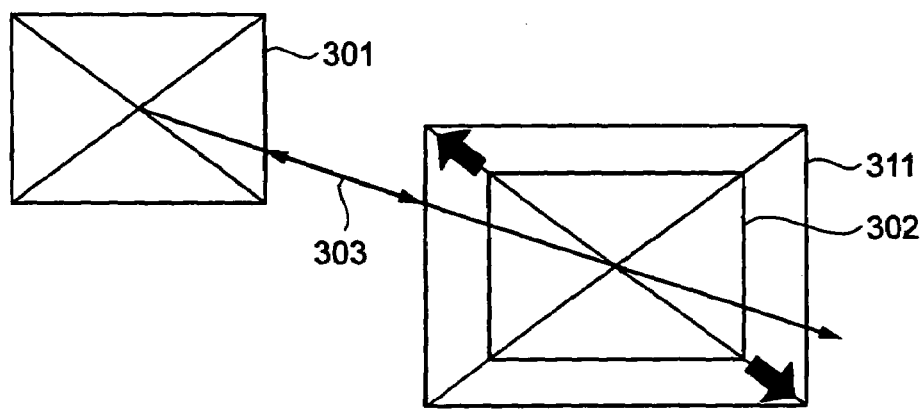
FIG. 13 is a schematic to explain a first exemplary empty-space-correction-process method.

FIG. 13 is a schematic showing the first empty-space-correction-process method.

As shown in FIG. 13, when the empty space interval between an upstream photographic image 301 and a downstream photographic image 302 is greater than a correction decision interval 303, a photographic image to which the downstream photographic image 302 is expanded with its aspect ratio maintained, that is, at equal magnifications vertically and laterally, until the empty space interval becomes equal to the correction decision interval 303, is obtained as a downstream photographic image 311 after the correction. Here, a range in which the downstream photographic image 311 can be expanded is set at a range in which the boundary region of the downstream photographic image 311 after the correction does not overlap with the boundary region of any photographic image differing from the upstream photographic image 301 adjacent to this downstream photographic image 311. Besides, such operations as expanding only the downstream photographic image or expanding both the upstream and downstream photographic images at equal magnifications, are set beforehand.

The second exemplary empty-space-correction-process method is a method in which at least one of the downstream photographic image and the upstream photographic image is moved along the path until the empty space interval becomes equal to, at most, the predetermined correction decision interval.

FIG. 14 is a schematic showing the second empty-space-correction-process method.

Figure 14A:
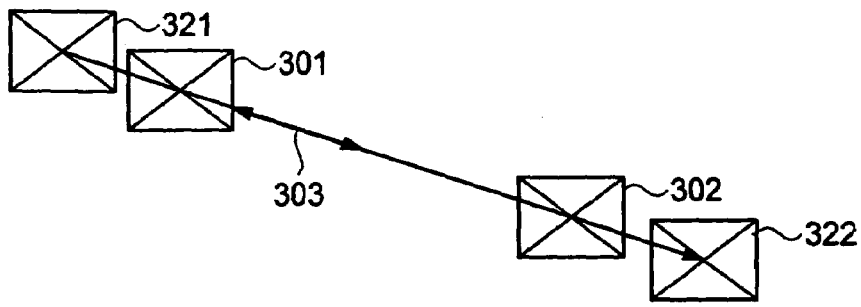
FIGS. 14A–D are schematics to explain a second exemplary empty-space-correction-process method.

It is assumed that, as shown in FIG. 14(a), an upstream photographic image 301 and a downstream photographic image 302 are the adjacent photographic images whose empty space interval is greater than a correction decision interval 303. It is also assumed that a photographic image 321 is one which is adjacent to the upstream photographic image 301 and which is different from the downstream photographic image 302, and that a photographic image 322 is one which is adjacent to the downstream photographic image 302 and which is different from the upstream photographic image 301.

Figure 14B:
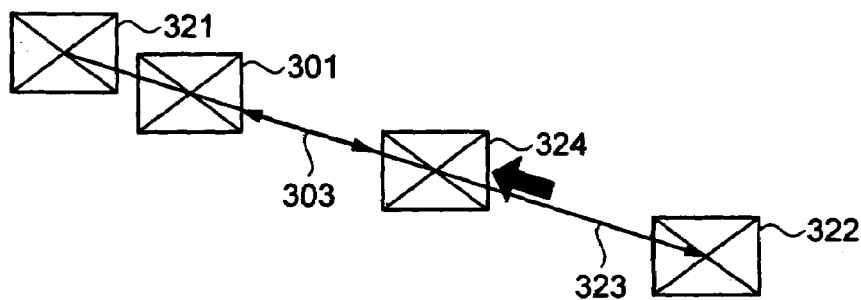
Figure 14C:
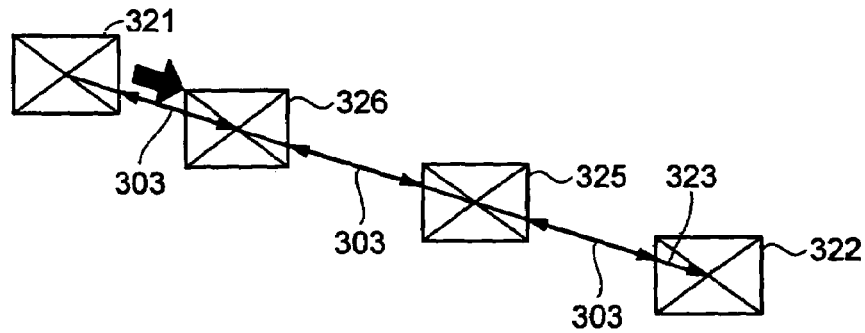

In the correction, first of all, as shown in FIG. 14(b), the downstream photographic image 302 is moved along a path 323 until the empty space interval of this downstream photographic image relative to the upstream photographic image 301 becomes equal to the correction decision interval 303. The downstream photographic image after the movement, is depicted by a downstream photographic image 324. Subsequently, when the empty space interval between the downstream photographic image 324 and the photographic image 322 has become greater than the correction decision interval 303 on account of the above movement, the upstream photographic image 301 and the downstream photographic image 324 are moved along the path 323 with their empty space interval held as shown in FIG. 14(c), until the empty space interval between the downstream photographic image 324 and the photographic image 322 becomes equal to the correction decision interval 303, within a movement range in which the empty space interval between the photographic image 321 and the upstream photographic image 301 becomes equal to, at most, the correction decision interval 303. The downstream photographic image after the movement is depicted by a downstream photographic image 325, while the upstream photographic image after the movement is depicted by an upstream photographic image 326.

Figure 14D:
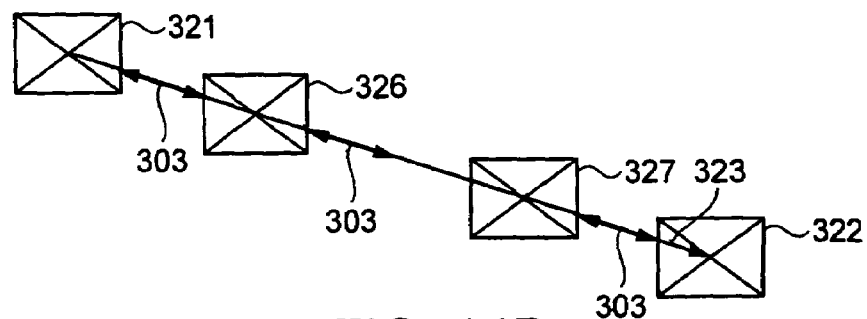

Subsequently, when the empty space interval between the downstream photographic image 325 and the photographic image 322 is still greater than the correction decision interval 303 in spite of the above movement, the downstream photographic image 325 is moved along the path 323 until the empty space interval between the downstream photographic image 325 and the photographic image 322 becomes equal to the correction decision interval 303, as shown in FIG. 14(d). The downstream photographic image after the movement is depicted by a downstream photographic image 327. As such, the empty space interval between the upstream photographic image 326 and the downstream photographic image 327 becomes greater than the correction decision interval 303, but the empty space intervals can be decreased with the original design left behind, by moving the photographic images along the path 323.

The third exemplary empty-space-correction-process method is a method in which, when a photographic image differing from the upstream photographic image adjacent to the downstream photographic image is termed an "adjacent photographic image", a path from the upstream photographic image to the adjacent photographic image is partly modified so as to shorten, whereby the empty space interval between the upstream photographic image and the downstream photographic image is made equal to, at most, the correction decision interval.

FIG. 15 is a schematic showing the third empty-space-correction-process method.

Figure 15A:
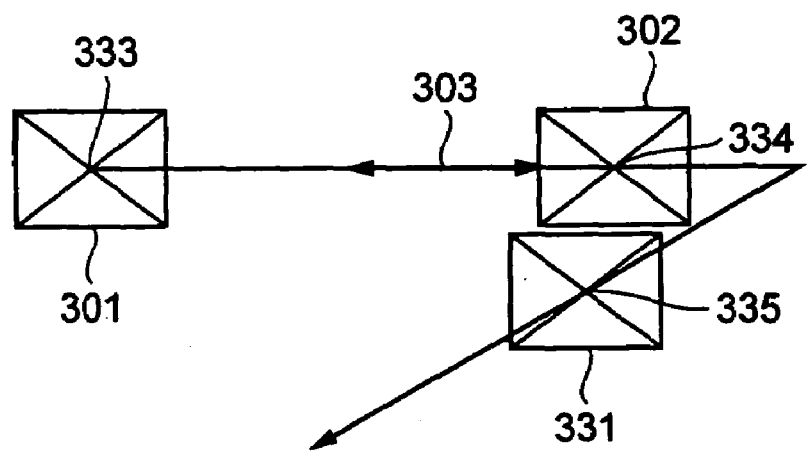
FIGS. 15A–B are schematics to explain a third exemplary empty-space-correction-process method.

As shown in FIG. 15(a), the adjacent photographic images whose empty space interval is greater than a correction decision interval 303, are assumed to be an upstream photographic image 301 and a downstream photographic image 302. Besides, the photographic image which differs from the upstream photographic image 301 and which is adjacent to the downstream photographic image 302, is assumed to be an adjacent photographic image 331. Also, the respective central positions of the upstream photographic image 301, downstream photographic image 302 and adjacent photographic image 331 are assumed to be central positions 333, 334 and 335.

Figure 15B:
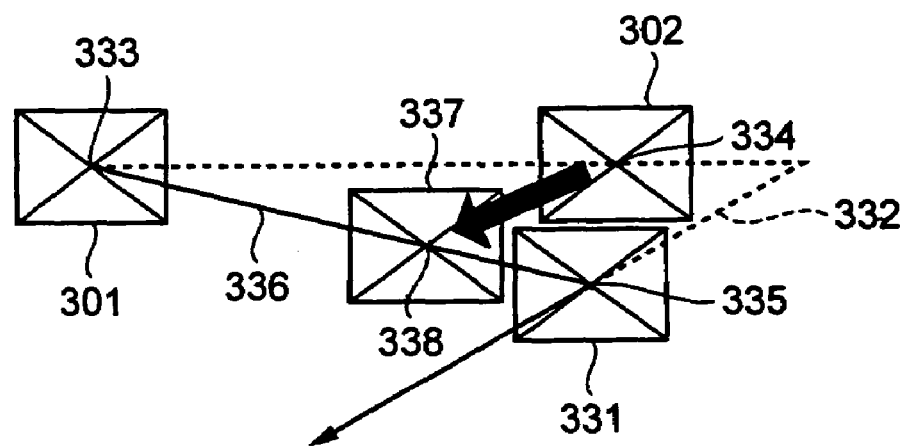

In the correction, a path is first corrected as shown in FIG. 15(b). More specifically, the path 332 from the upstream photographic image 301 to the adjacent photographic image 331 is corrected to a path 336 which connects the central position 333 of the upstream photographic image 301 with that 335 of the adjacent photographic image 331 by a straight line. Subsequently, assuming a downstream photographic image 337 is the downstream photographic image after the correction along the path 336, and a central position 338 is the central position thereof, the downstream photographic image 337 is arranged so that the ratio between the arrangement interval of the upstream photographic image 301 and the downstream photographic image 337 and the arrangement interval of the downstream photographic image 337 and the adjacent photographic image 331 as taken along the path 336 after the correction, may become equal to the ratio between the arrangement interval of the upstream photographic image 301 and the downstream photographic image 302 and the arrangement interval of the downstream photographic image 302 and the adjacent photographic image 331 as taken along the path 332 before the correction. That is, the central position 338 is arranged on the path 336 so that the ratio between the distance of the central positions 333 and 338 and the distance of the central positions 338 and 335 may become equal to the ratio between the distance of the central positions 333 and 334 and the distance of the central positions 334 and 335.

The fourth exemplary empty-space-correction-process method is a method in which the path is reduced at equal magnifications vertically and laterally, and in which, regarding the element arrangement position of the photographic image arranged on the path before the correction, the same relative position along the path after the correction is set as the element arrangement position of the photographic image after the correction.

The fifth exemplary empty-space-correction-process method is a method in which, when the empty space interval of the adjacent photographic images is greater than the correction decision interval, a predetermined element (for example, an illustration image) is arranged between the adjacent photographic images along the path, whereby the empty space interval between each photographic image and the arranged element is made equal to, at most, the correction decision interval.

Next, the element layout process based on the element layout apparatus 100 will be described with reference to FIG. 16.

Figure 16:
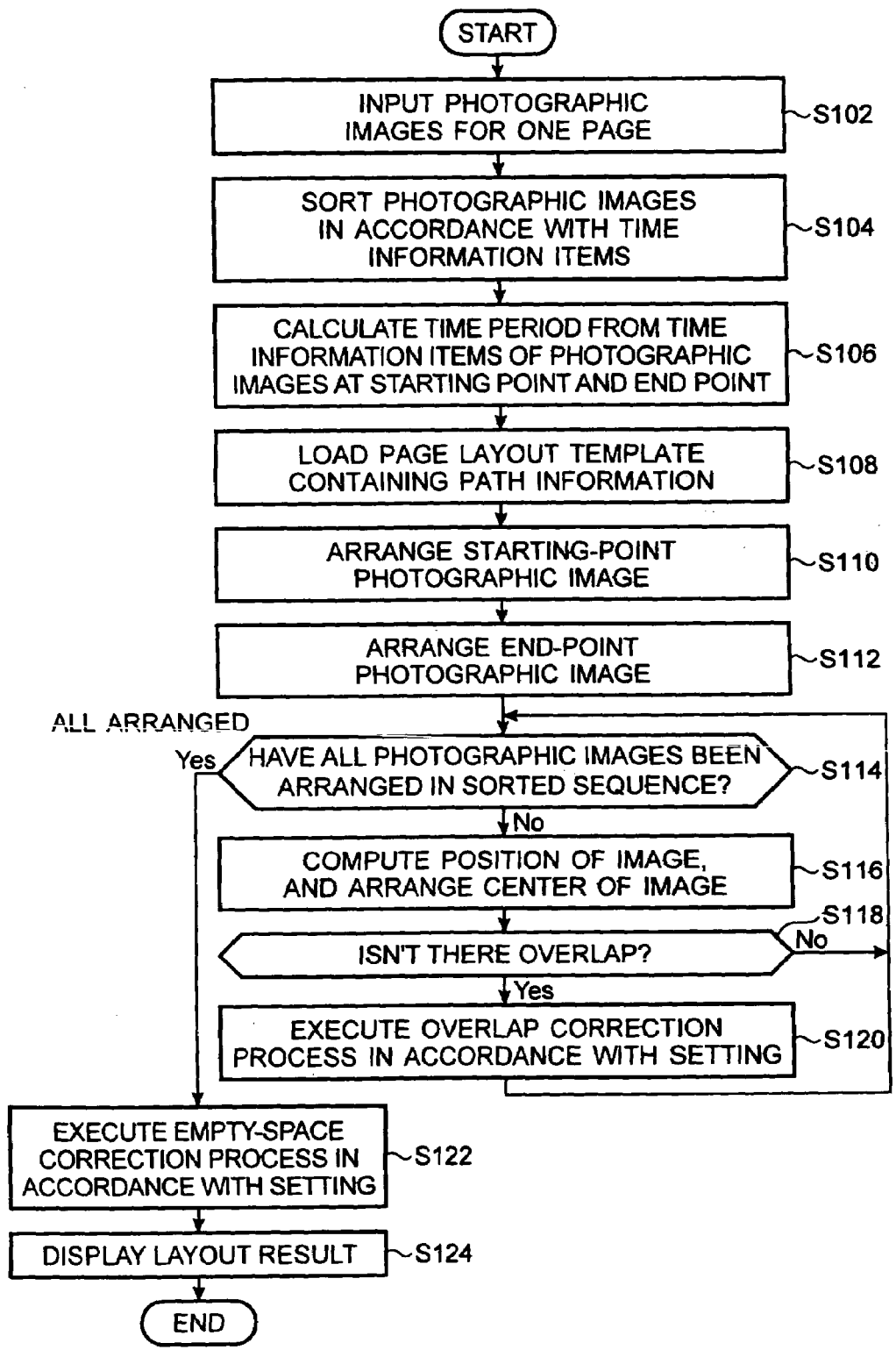
FIG. 16 is a flow chart showing an example of an element layout process which is executed in accordance with a control program stored in a ROM 32 beforehand.

FIG. 16 is a flow chart showing an example of the element layout process which is executed in accordance with the control program stored in the ROM 32 beforehand.

After photographic images to be laid out, and path information to lay out the selected photographic images have been selected by the user, the photographic images for one page and time information items associated with these photographic images are first inputted from the layout-element storage device 120 (S102). Subsequently, the photographic images are sorted on the basis of the inputted time information items (S104), and a time period from the earliest time information to the latest time information among the inputted time information items is calculated (S106).

Subsequently, a layout template which contains the selected path information is loaded from the path-information storage device 122 (S108), the starting-point photographic image which is the photographic image of the earliest time specified by the time information is arranged along the path (S110), and the end-point photographic image which is the photographic image of the latest time specified by the time information is arranged along the path (S112).

When a photographic image to be arranged is set as a subject photographic image from among the inputted photographic images, it is decided whether or not all the photographic images have been arranged as the subject photographic images in a sequence sorted on the basis of the time information items (S114). Here, the starting-point photographic image and the end-point photographic image are excluded as the subject photographic images.

When all the photographic images have not yet been arranged as the subject photographic images (S114; No), any subject photographic image is set in the sequence sorted on the basis of the time information items, the element arrangement position of the subject photographic image is calculated along the path, the positional information of the subject photographic image is generated so that the calculated element arrangement position of the subject photographic image may become the central position of the subject photographic image, and the generated positional information is stored in the layout-information storage device 124 (S116).

Here, in calculating the element arrangement position of the subject photographic image, a time period from the time information of the starting-point photographic image to that of the subject photographic image is first calculated on the basis of the time information of the subject photographic image. Subsequently, the arrangement interval between the starting-point photographic image and the subject photographic image is calculated on the basis of the time period from the time information of the starting-point photographic image to that of the end-point photographic image, the arrangement interval between the starting-point photographic image and the end-point photographic image along the path, and the calculated time period from the time information of the starting-point photographic image to that of the subject photographic image. Lastly, when a starting point is set at the position at which the starting-point photographic image is arranged, a position at which a distance from the starting point along the path becomes equal to the calculated arrangement interval is obtained as the element arrangement position of the subject photographic image.

Subsequently, it is decided whether or not the overlap region exists in which the overlap-correction decision region of the photographic image already arranged and that of the subject photographic image overlap each other (S118). In the nonexistence of the overlap region (S118; No), the routine returns to the step S114, which decides whether or not the next subject photographic image exists. On the other hand, in the existence of the overlap region (S118; Yes), the overlap correction process is executed on the basis of information to execute the set overlap correction process, so as to correct at least one information item among the element arrangement position, size, skew angle and shape of at least one of the two photographic images having the overlap (S120), and the routine returns to the step S114, which decides whether or not the next subject photographic image exists. Here, the "information for executing the set overlap correction process" signifies information to designate whether or not the overlap correction process is to be executed, information to designate which method is to be used to execute the overlap correction process, and so forth.

In a case where all the photographic images have been set and arranged as the subject photographic images (S114; Yes), the empty-space correction process is executed for the empty space interval between the photographic images as is greater than the predetermined correction decision interval, on the basis of information to execute the set empty-space correction process, so as to correct at least one information item among the element arrangement position, size, skew angle and shape of at least one of the two photographic images whose empty space interval is greater than the predetermined correction decision interval (S122). Here, the "information for executing the set empty-space correction process" signifies information to designate whether or not the empty-space correction process is to be executed, information to designate which method is to be used to execute the empty-space correction process, and so forth.

Subsequently, a layout result which has been obtained by the overlap correction process and the empty-space correction process is displayed on the display device 44 (S124), whereupon the element layout process is ended.

Next, the operation of the first exemplary embodiment will be described.

First, the user selects photographic images to-be-laid-out, and path information to arrange the selected photographic images.

Figure 17:
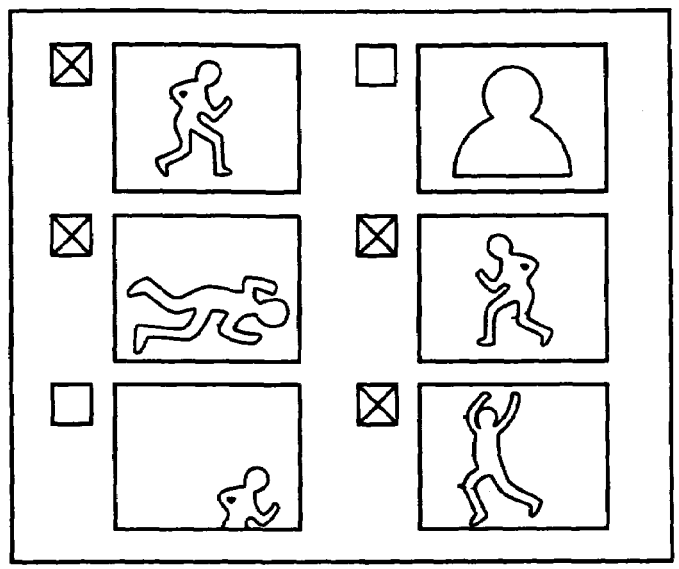
FIG. 17 is a schematic showing a selection screen for photographic images.

FIG. 17 is a schematic showing a selection screen for the photographic images.

Figure 18:
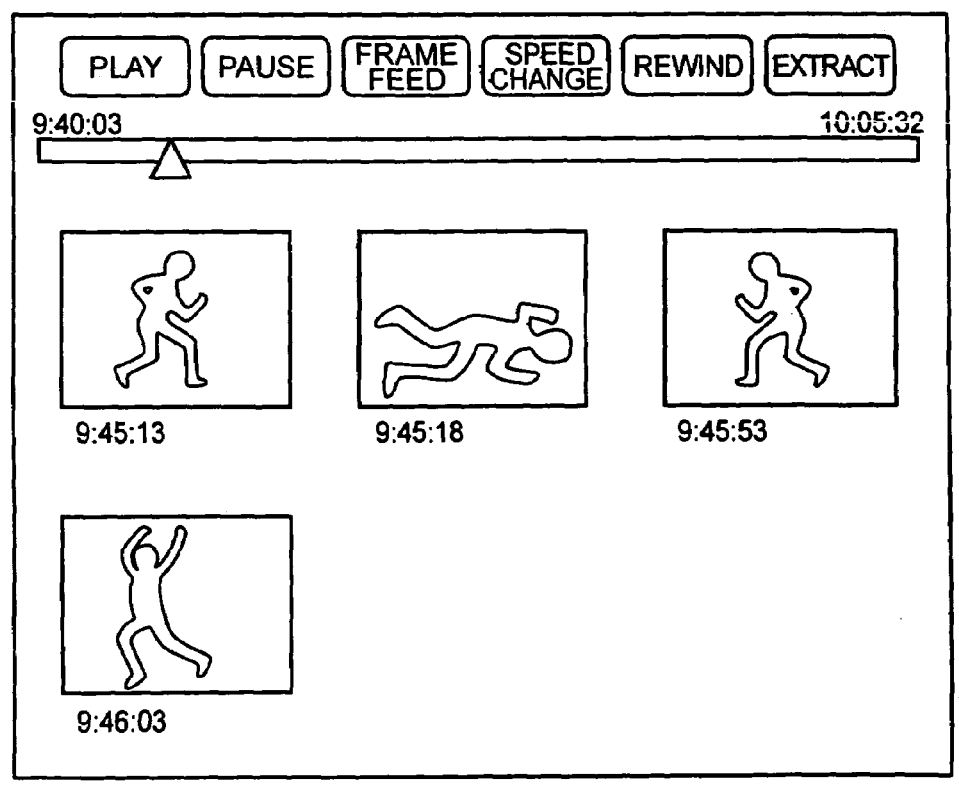
FIG. 18 is a schematic showing a screen for selecting images to-be-laid-out from among video-recorder images.

FIG. 18 is a schematic showing a screen to select the images to-be-laid-out from among video-recorder images.

Figure 19:
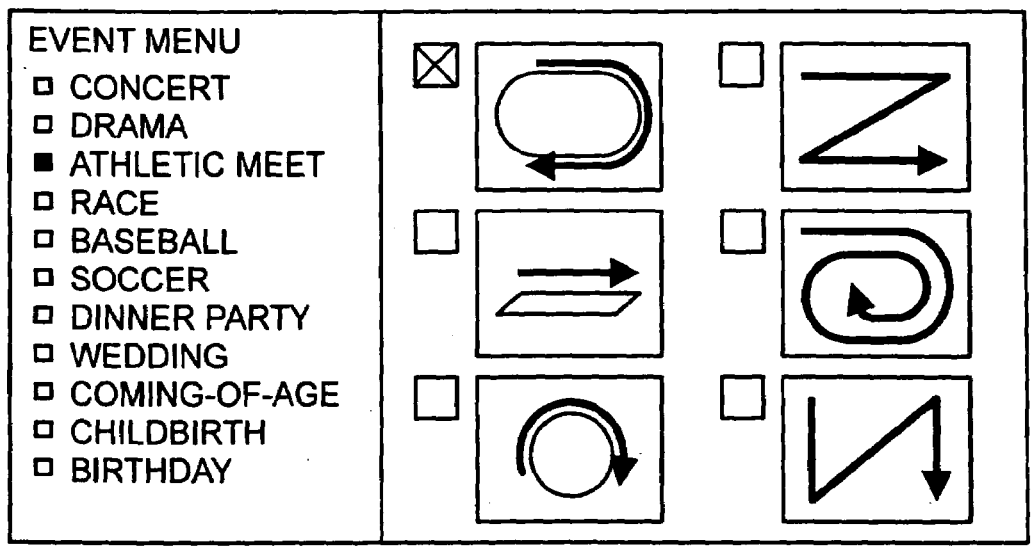
FIG. 19 is a schematic showing the selection images of path information.

FIG. 19 is a schematic showing the selection images of the path information.

As shown in FIG. 17, photographic images are arrayed from left above to left below and then from right above to right below, in time series on the basis of time information items indicating time points at which the photographic images were taken. The user selects the photographic images to-be-laid-out by designating check boxes. Selected here are the four photographic images of a left upper one, a left middle one, a right middle one and a right lower one, that is, the start photographic image, fall photographic image, outrunning photographic image and goal photographic image.

Besides, as shown in FIG. 18, the user can extract the images to-be-laid-out from among the video-recorder images by subjecting a video recorder to play, pause, frame feed, fast forward, slow-motion play and rewind operations. The extracted images are arrayed on the lower side, and are displayed with the time information items affixed thereto.

Besides, as shown in FIG. 19, an event menu is displayed on the left side of a screen. The user selects an event relevant to the selected photographic images, from within the event menu by designating a check box. Here, the athletic meet is selected. When the user has selected the event, a plurality of path information items relevant to the selected event are displayed. The user selects the path information to lay out the selected photographic images, by designating a check box. Here, the path information simulative of the track is selected.

Subsequently, the selected photographic images and the time information items associated with the photographic images are acquired, the element arrangement positions at which the photographic images are to be arranged along the path of the selected path information, on the basis of the time information items, and the central positions of the selected photographic images are arranged at the calculated positions. Regarding the four selected photographic images, it is assumed by way of example that the time information of the start photographic image is 9 o'clock 45 minutes 13 seconds (9:45:13), that the time information of the fall photographic image is 9 o'clock 45 minutes 18 seconds (9:45:18), that the time information of the outrunning photographic image is 9 o'clock 45 minutes 53 seconds (9:45:53), and that the time information of the goal photographic image is 9 o'clock 46 minutes 03 seconds (9:46:03). Then, first of all, the start photographic image is arranged at the starting point on the path, while the goal photographic image is arranged at the end point on the path. Whereas the time period from the time information of the start photographic image to that of the goal photographic image is 50 seconds, the time period from the time information of the start photographic image to that of the fall photographic image is 5 seconds. Therefore, the fall photographic image is arranged at the position of 5/50 of the interval from the starting point to the end point along the path. The outrunning photographic image is similarly arranged at the position of 40/50 of the interval from the starting point to the end point.

Subsequently, the overlap correction process is performed. This overlap correction process is executed in each of a case where the instruction of execution has been given by the user, a case where the instruction of execution is set in the layout template containing the path information, a case where the instruction of correction has been given through the edit device 118 by the user, and so forth.

Besides, in executing the overlap correction process, which of the plurality of overlap-correction-process methods is to be utilized, or which methods are to be combined, is determined on the basis of setting information inputted by the user, setting information contained in the layout template, or the like. By way of example, first of all, the element arrangement position of the photographic image is corrected by the first exemplary overlap-correction-process method. On this occasion, when the overlap region is not cancelled even by moving the element arrangement position at most 10 mm, the size of the photographic image is subsequently reduced by the third exemplary overlap-correction-process method, whereby the overlap region is corrected so as to be cancelled. As an alternative example, the exemplary overlap-correction-process methods are endowed with priority levels (in the order of, for example, the third overlap-correction-process method, the fifth one, the fourth one, the second one and the first one) so as not to change the element arrangement position.

Lastly, the empty-space correction process is performed. This empty-space correction process is executed in each of a case where the instruction of execution has been given by the user, a case where the instruction of execution is set in the layout template containing the path information, a case where the instruction of correction has been given through the edit device 118 by the user, and so forth.

Besides, in executing the empty-space correction process, which of the plurality of exemplary empty-space-correction-process methods is to be utilized, or which methods are to be combined, is determined on the basis of setting information inputted by the user, setting information contained in the layout template, or the like.

Figure 20:
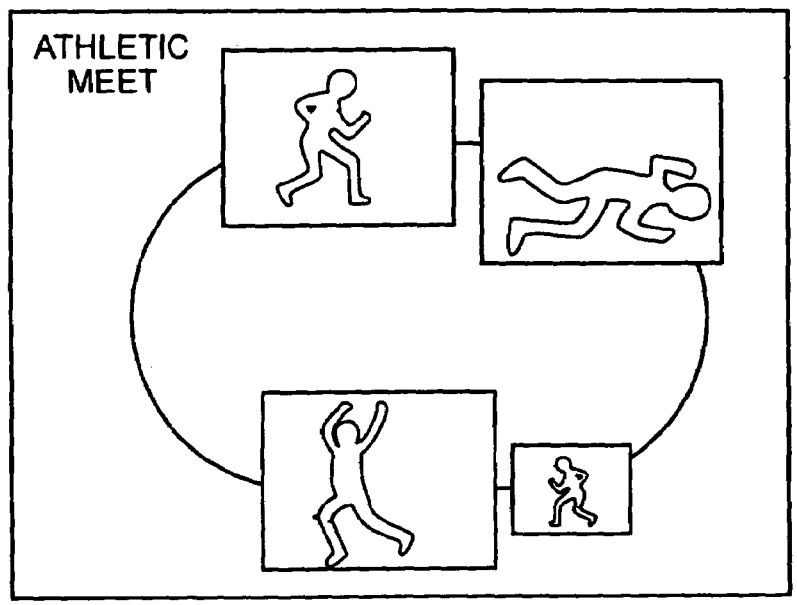
FIG. 20 is a schematic showing the final layout after having been made by the overlap correction process and the empty-space correction process.

FIG. 20 is a schematic showing the final layout after having been made by the overlap correction process and the empty-space correction process.

As shown in FIG. 20, it is understood that the size of the fall photographic image has been expanded, and that the layout which affords ambience with the lapse of time and a high impact has been realized.

In this way, according to the first exemplary embodiment, the layout which reflects the stream of time can be realized in such a way that the element layout apparatus 100 includes the element selection device 102, path-information selection device 104, temporal-information acquisition device 106, element arrangement device 108, overlap-region decision device 110, overlap correction device 112, empty-space decision device 114, empty-space correction device 116, edit device 118, layout-element storage device 120, path-information storage device 122 and layout-information storage device 124, and that the element arrangement device 108 further includes the difference-time-period calculation device 132, arrangement-interval calculation device 134, element-arrangement-position calculation device 136 and positional-information generation device 138. Photographic images with movements as in case of, for example, the running match of an athletic meet can be laid out so as to express ambience with the lapse of time on an album board. Also, when the several photographic images of a personal history since the time of birth till the present time as in case of, for example, wedding photographic images are to be pasted, the lapse of time can be expressed with ease. That is, the photographic images are not pasted merely in time series, but they can be laid out so as to express the stream of time.

In the first exemplary embodiment, the element selection device 102 corresponds to layout-element-selection-screen display device in exemplary embodiment 26, the path-information selection device 104 corresponds to path-information-selection-screen display device in exemplary embodiment 26, the step S104 corresponds to temporal-information acquisition device in exemplary embodiment 1, and the step S106 corresponds to difference-time-period calculation device in exemplary embodiment 5. Besides, the steps S110–S116 correspond to arrangement-interval calculation device in exemplary embodiment 5, element-arrangement-position calculation device in exemplary embodiment 5, or positional-information generation device in exemplary embodiment 5, the step S118 corresponds to overlap-region decision device in exemplary embodiment 10, and the step S120 corresponds to overlap correction device in each of exemplary embodiments 10 and 13 through 18.

Besides, in the first exemplary embodiment, the step S122 corresponds to empty-space decision device in exemplary embodiment 19 or empty-space decision device in exemplary embodiments 19 through 24. The step S124 corresponds to layout-result display device in exemplary embodiment 26, and the CPU 30 corresponds to arithmetic device in exemplary embodiments 53, 55, 62, 71, 77 or 78. Besides, the event information corresponds to index information in exemplary embodiments 3, 29 or 55, the starting-point photographic image corresponds to a starting-point element in exemplary embodiments 4, 5, 10, 21, 30, 31, 36, 47, 56, 57, 62 or 73, and the end-point photographic image corresponds to an end-point element in exemplary embodiments 4, 5, 10, 21, 22, 30, 31, 36, 47, 48, 56, 57, 62, 73 or 74.

In the first exemplary embodiment, the downstream photographic image corresponds to a downstream element in each of exemplary embodiments 10, 13 through 17, 19 through 22, 36, 39 through 43, 45 through 48, 62, 65 through 69, and 71 through 74, while the upstream photographic image corresponds to an upstream element in each of exemplary embodiments 10, 17, 19 through 22, 36, 43, 45 through 48, 62, 69, and 71 through 74. Also, the indispensable photographic image region corresponds to an indispensable element region in exemplary embodiments 12, 38 or 64, while the adjacent photographic image corresponds to an adjacent element in exemplary embodiments 22, 48 or 74.

Next, the second exemplary embodiment will be described.

Different from the first exemplary embodiment is that the temporal information items associated with the photographic images are not stored in the layout-element storage device. In the second exemplary embodiment, therefore, temporal information items which are to be associated with the photographic images stored in the layout-element storage device are generated, and the layout of the photographic images is carried out by utilizing the generated temporal information items.

Figure 21:
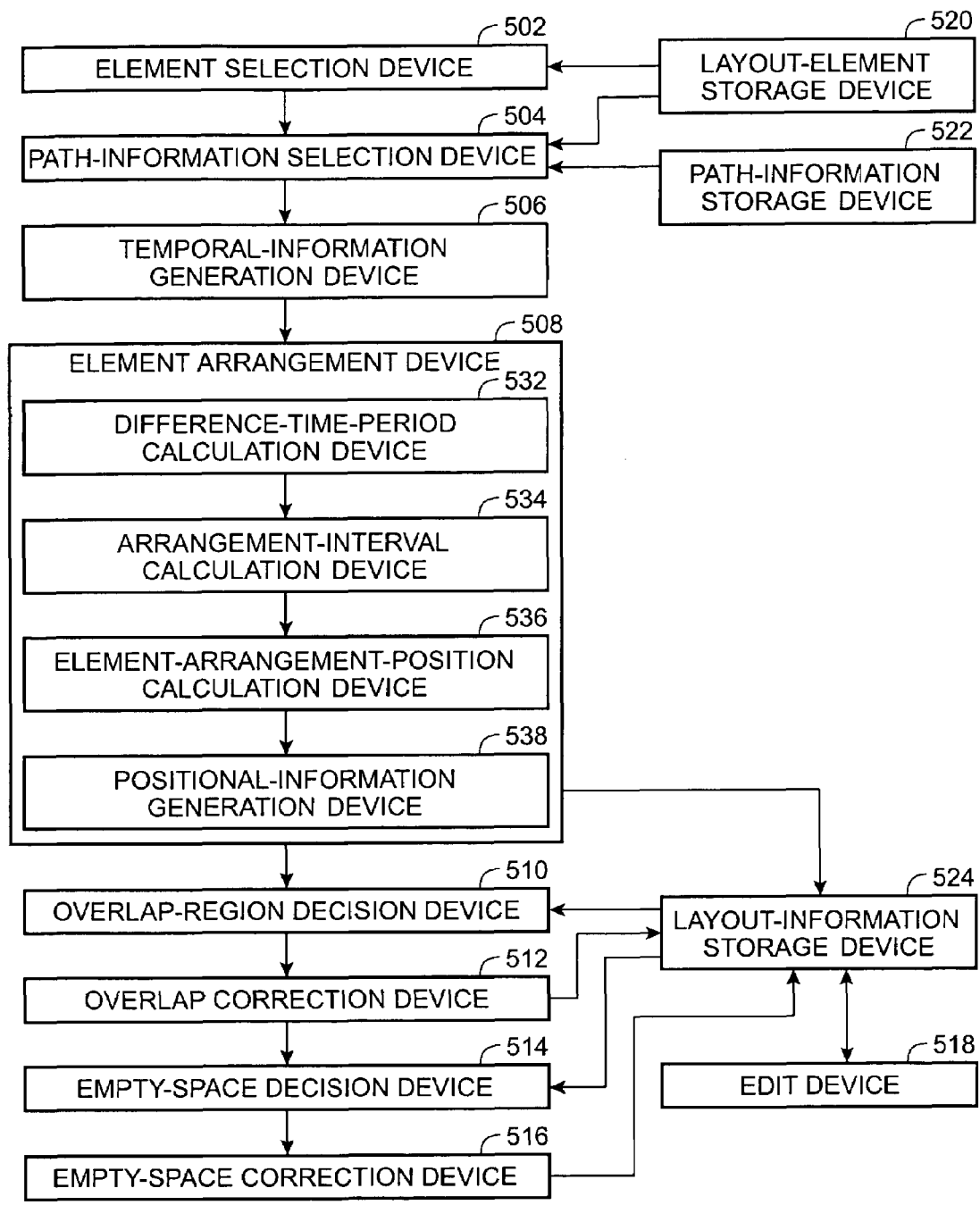
FIG. 21 is a schematic functional block diagram of an element layout apparatus 100 in a second exemplary embodiment.

FIG. 21 is an example of the functional block diagram of an element layout apparatus 100 in the second exemplary embodiment.

As shown in FIG. 21, the element layout apparatus 100 includes element selection device 502, path-information selection device 504, temporal-information generation device 506, element arrangement device 508, overlap-region decision device 510, overlap correction device 512, empty-space decision device 514, empty-space correction device 516, edit device 518, layout-element storage device 520, path-information storage device 522 and layout-information storage device 524, and the element arrangement device 508 further includes difference-time-period calculation device 532, arrangement-interval calculation device 534, element-arrangement-position calculation device 536 and positional-information generation device 538.

The element selection device 502, path-information selection device 504, element arrangement device 508, overlap-region decision device 510, overlap correction device 512, empty-space decision device 514, empty-space correction device 516, edit device 518, difference-time-period calculation device 532, arrangement-interval calculation device 534, element-arrangement-position calculation device 536 and positional-information generation device 538 shall be omitted from description because they have the same or similar functions as those of the element selection device 102, path-information selection device 104, element arrangement device 108, overlap-region decision device 110, overlap correction device 112, empty-space decision device 114, empty-space correction device 116, edit device 118, difference-time-period calculation device 132, arrangement-interval calculation device 134, element-arrangement-position calculation device 136 and positional-information generation device 138 in the first exemplary embodiment, respectively.

The temporal-information generation device 506 generates temporal information items which are to be associated with photographic images selected by the element selection device 502. By way of example, the temporal information items to be associated with the photographic images are generated on the basis of time information items indicative of time points at which the photographic images were stored in the layout-element storage device 520, and the generated temporal information items are stored in association with the photographic images in the layout-element storage device 520. As an alternative example, times at which photographs were taken are estimated using the color information items of the photographic images, and the estimated times are utilized as the temporal information items.

In this way, according to the second exemplary embodiment, a layout which reflects the stream of time can be realized in such a way that the element layout apparatus 100 includes the element selection device 502, path-information selection device 504, temporal-information generation device 506, element arrangement device 508, overlap-region decision device 510, overlap connection device 512, empty-space decision device 514, empty-space correction device 516, edit device 518, layout-element storage device 520, path-information storage device 522 and layout-information storage device 524, and that the element arrangement device 508 further includes the difference-time-period calculation device 532, arrangement-interval calculation device 534, element-arrangement-position calculation device 536 and positional-information generation device 538. Photographic images with movements as in case of, for example, the running match of an athletic meet can be laid out so as to express ambience with the lapse of time on an album board. Also, when the several photographic images of a personal history since the time of birth till the present time as in case of, for example, wedding photographic images are to be pasted, the lapse of-time can be expressed with ease. That is, the photographic images are not pasted merely in time series, but they can be laid out so as to express the stream of time.

In the second exemplary embodiment, the element selection device 502 corresponds to layout-element-selection-screen display device in exemplary embodiment 26, the path-information selection device 504 corresponds to path-information-selection-screen display device in exemplary embodiment 26, and the CPU 30 corresponds to the arithmetic device in exemplary embodiments 54, 55, 62, 71, 77 or 78.

Next, the third exemplary embodiment will be described.

Different from the first exemplary embodiment is that arrangement of temporal information items which are associated with element arrangement positions set along a path beforehand are calculated, that photographic images which are associated with the calculated arrangement temporal information items are retrieved from among the photographic images stored in the layout-element storage device, and that the retrieved photographic images are arranged at the element arrangement positions.

Figure 22:
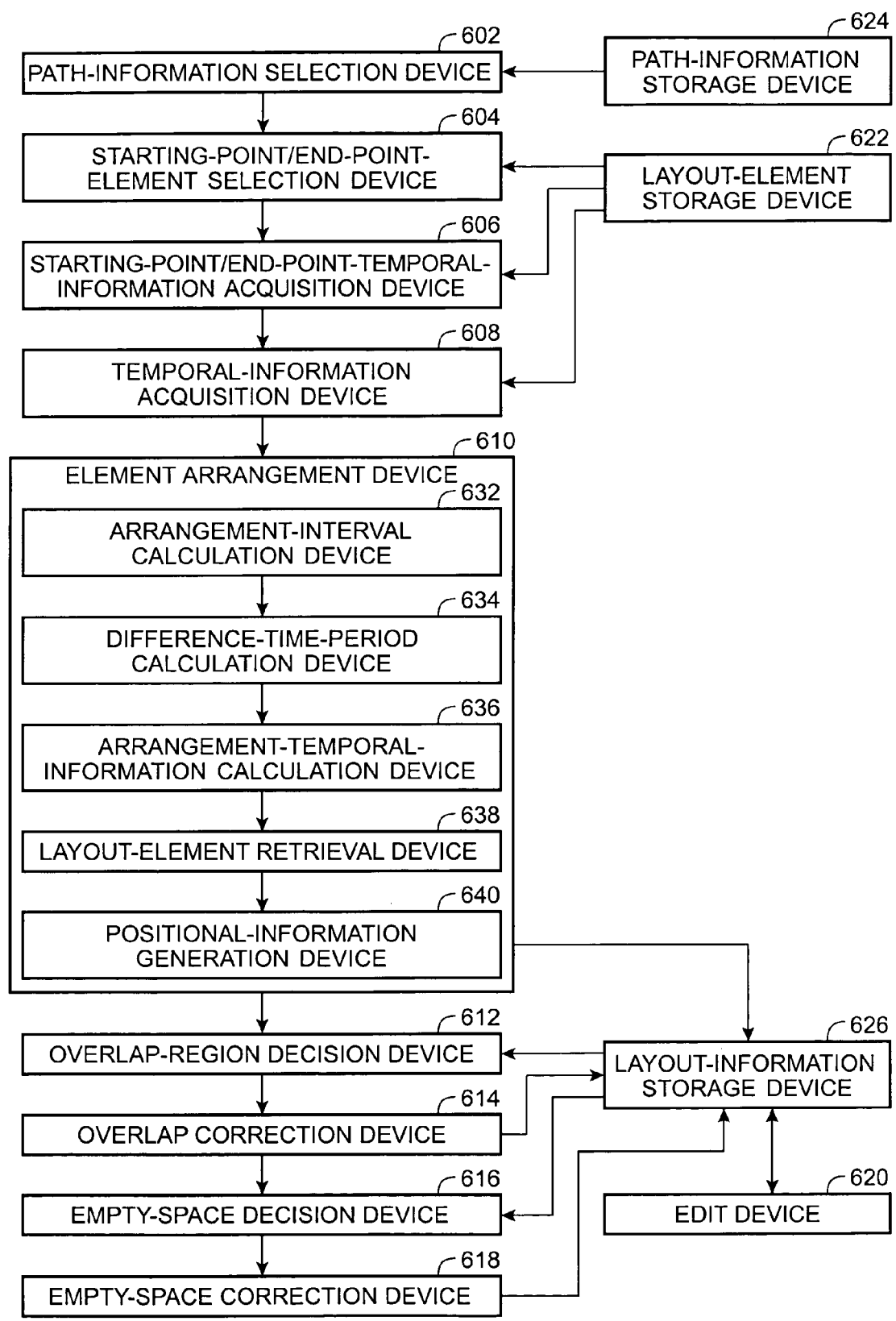
FIG. 22 is a schematic functional block diagram of an element layout apparatus 100 in a third exemplary embodiment.

FIG. 22 is an example of the functional block diagram of an element layout apparatus 100 in the third exemplary embodiment.

As shown in FIG. 22, the element layout apparatus 100 includes path-information selection device 602, starting-point/end-point-element selection device 604, starting-point/end-point-temporal-information acquisition device 606, temporal-information acquisition device 608, element arrangement device 610, overlap-region decision device 612, overlap correction device 614, empty-space decision device 616, empty-space correction device 618, edit device 620, layout-element storage device 622, path-information storage device 624 and layout-information storage device 626.

The path-information selection device 602 lets a user select through the input device 40, path information to arrange photographic images, from within the path-information storage device 624 storing therein a plurality of path information items for respective events (for example, an athletic meet, a wedding ceremony and a birthday). In a case, for example, where the user desires to paste on an album board the photographic images which were taken at the track event of the athletic meet, the path-information selection device 602 lets the user select the athletic meet from among the plurality of events. Further, the path-information selection device 602 lets the user select path information indicating a path simulative of a track, from among a plurality of path information items prepared on the basis of the event information of the athletic meet.

The starting-point/end-point-element selection device 604 lets the user select through the input device 40, a starting-point photographic image being the photographic image which is to be arranged at the starting point of the path information selected by the path-information selection device 602, and an end-point photographic image being the photographic image which is to be arranged at the end point, from within the layout-element storage device 622 storing a plurality of photographic images therein.

The starting-point/end-point-temporal-information acquisition device 606 acquires from the layout-element storage device 622, temporal information items which are respectively associated with the starting-point photographic image and the end-point photographic image selected by the starting-point/end-point-element selection device 604. Time information indicative of a time point at which each photographic image was taken, will be exemplified as the temporal information in the description below. Here, "starting-point time information" denotes the time information associated with the starting-point photographic image, and "end-point time information" is let denote the time information associated with the end-point photographic image.

The temporal-information acquisition device 608 acquires from the layout-element storage device 622, temporal information items which are associated with all the photographic images stored in the layout-element storage device 622.

The element arrangement device 610 brings a distance from the starting point to the end point along the path, into correspondence with a time period from the starting-point time information to the end-point time information, and then calculates arrangement temporal information which is associated with an element arrangement position set as the path information selected by the path-information selection device 602, from a distance from the starting point to the element arrangement position along the path. Subsequently, the element arrangement device 610 retrieves a photographic image associated with the calculated arrangement temporal information, or a photographic image associated with temporal information nearest to the calculated arrangement temporal information, from among the photographic images stored in the layout-element storage device 622. Further, the element arrangement device 610 arranges the retrieved photographic image at the set element arrangement position, and stores the positional information of the photographic image in the layout-information storage device 626.

The element arrangement device 610 further includes arrangement-interval calculation device 632, difference-time-period calculation device 634, arrangement-temporal-information calculation device 636, layout-element retrieval device 638 and positional-information generation device 640.

The arrangement-interval calculation device 632 calculates an arrangement interval as the distance between the starting point and the element arrangement position on the basis of the element arrangement position which is set along the path of the path information selected by the path-information selection device 602.

The difference-time-period calculation device 634 calculates a time period from the starting-point time information to arrangement time information associated with the element arrangement position on the basis of the time period from the starting-point time information to the end-point time information, the distance from the starting point to the end point, and the arrangement interval calculated by the arrangement-interval calculation device 632.

The arrangement-temporal-information calculation device 636 calculates arrangement time information on the basis of the starting-point time information, and the time period from the starting-point time information to the arrangement time information associated with the element arrangement position that has been calculated by the difference-time-period calculation device 634.

The layout-element retrieval device 638 retrieves the photographic image associated with the arrangement time information calculated by the arrangement-temporal-information calculation device 636, or the photographic image associated with temporal information nearest to the calculated arrangement time information, from among the photographic images which are stored in the layout-element storage device 622.

The positional-information generation device 640 generates the positional information of the retrieved photographic image so that the set element arrangement position may become the central position of the photographic image retrieved by the layout-element retrieval device 638, and it stores the generated positional information in the layout-information storage device 626.

The overlap-region decision device 612, overlap correction device 614, empty-space decision device 616, empty-space correction device 618 and edit device 620 shall be omitted from description because they have the same or similar functions as those of the overlap-region decision device 110, overlap correction device 112, empty-space decision device 114, empty-space correction device 116 and edit device 118 in the first exemplary embodiment, respectively.

Next, the operation of the third exemplary embodiment will be described.

First, the user selects path information to lay out images.

Figure 23:
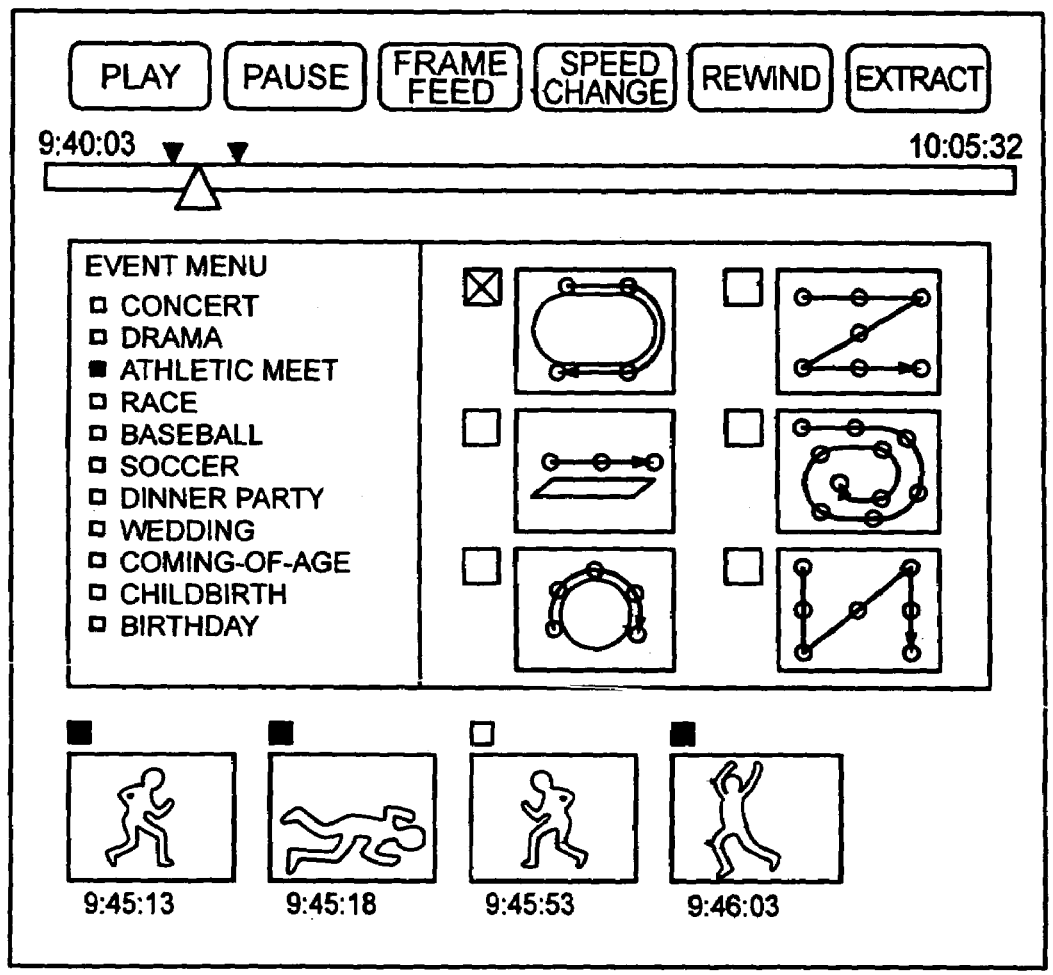
FIG. 23 is a schematic showing a screen to retrieve images which are associated with the element arrangement positions of selected path information, from among video-recorder images, and then arranging the retrieved images.

FIG. 23 is a schematic showing a screen to retrieve images associated with the element arrangement positions of the selected path information, from among video-recorder images, and then arranging the retrieved images.

As shown in FIG. 23, the user selects an event to lay out the images from within an event menu, by designating a check box. Further, he/she selects the path information to lay out the images, from among a plurality of path information items relevant to the event as are displayed by selecting the event.

Subsequently, the user selects a starting-point image and an end-point image which are to be respectively arranged at a starting point and an end point set on the selected path information. As described with reference to FIG. 18, the starting-point image and the end-point image are selected from among the video-recorder images. Images which have time information items designated by black triangles in FIG. 23 are the starting-point image and end-point image which have been selected.

Subsequently, arrangement time information items which are associated with element arrangement positions set on the selected path information are calculated from the video-recorder images between the selected starting-point and end-point images. Images which are associated with the calculated arrangement time information items are selected from among the video-recorder images between the selected starting-point and end-point images. As shown in FIG. 23, the extracted images are arrayed on the lower side and are displayed with the time information items affixed thereto. The extracted images are arranged at the element arrangement positions set on the selected path information. Incidentally, it is also possible to arrange only images selected by the user, among the extracted images.

Subsequently, the overlap correction process is performed. This overlap correction process is executed in each of a case where the instruction of execution has been given by the user, a case where the instruction of execution is set in a layout template containing the path information, a case where the instruction of correction has been given through the edit device 620 by the user, and so forth.

Besides, in executing the overlap correction process, which of the plurality of exemplary overlap-correction-process methods is to be utilized, or which methods are to be combined, is determined on the basis of setting information inputted by the user, setting information contained in the layout template, or the like. By way of example, first of all, the element arrangement position of the photographic image is corrected by the first overlap-correction-process method. On this occasion, when the overlap region is not cancelled even by moving the element arrangement position at most 10 mm, the size of the photographic image is subsequently reduced by the third exemplary overlap-correction-process method, whereby the overlap region is corrected so as to be cancelled. As an alternative example, the exemplary overlap-correction-process methods are endowed with priority levels (in the order of, for example, the third overlap-correction-process method, the fifth one, the fourth one, the second one and the first one) so as not to change the element arrangement position.

Lastly, the empty-space correction process is performed. This empty-space correction process is executed in each of a case where the instruction of execution has been given by the user, a case where the instruction of execution is set in the layout template containing the path information, a case where the instruction of correction has been given through the edit device 620 by the user, and so forth.

Besides, in executing the empty-space correction process, which of the plurality of exemplary empty-space-correction-process methods is to be utilized, or which methods are to be combined, is determined on the basis of setting information inputted by the user, setting information contained in the layout template, or the like.

In this way, according to the third exemplary embodiment, a layout which reflects the stream of time can be realized in such a way that the element layout apparatus 100 includes the path-information selection device 602, starting-point/end-point-element selection device 604, starting-point/end-point-temporal-information acquisition device 606, temporal-information acquisition device 608, element arrangement device 610, overlap-region decision device 612, overlap correction device 614, empty-space decision device 616, empty-space correction device 618, edit device 620, layout-element storage device 622, path-information storage device 624 and layout-information storage device 626, and that the element arrangement device 610 further includes the arrangement-interval calculation device 632, difference-time-period calculation device 634, arrangement-temporal-information calculation device 636, layout-element retrieval device 638 and positional-information generation device 640. Photographic images with movements as in case of, for example, the running match of an athletic meet can be laid out so as to express ambience with the lapse of time on an album board. Also, when the several photographic images of a personal history since the time of birth till the present time as in case of, for example, wedding photographic images are to be pasted, the lapse of time can be expressed with ease. That is, the photographic images are not pasted merely in time series, but they can be laid out so as to express the stream of time.

In the third exemplary embodiment, the path-information selection device 602 corresponds to path-information-selection-screen display device in exemplary embodiment 26, the starting-point/end-point-element selection device 604 corresponds to layout-element-selection-screen display device in exemplary embodiment 26, and the CPU 30 corresponds to arithmetic device in exemplary embodiments 58, 60, 62, 71, 77 or 78. Besides, the event information corresponds to index information in exemplary embodiments 8, 34 or 60, the starting-point photographic image corresponds to a starting-point element in exemplary embodiments 6, 9, 10, 21, 32, 35, 36, 47, 58, 61, 62 or 73, and the end-point photographic image corresponds to an end-point element in exemplary embodiments 6, 9, 10, 21, 22, 32, 35, 36, 47, 48, 58, 61, 62, 73 or 74.

Next, the fourth exemplary embodiment will be described.

Different from the third exemplary embodiment is the point that the temporal information items associated with the photographic images are not stored in the layout-element storage device 622. In the fourth exemplary embodiment, therefore, temporal information items which are to be associated with the photographic images stored in the layout-element storage device 22 are generated, and the layout of the photographic images is carried out by utilizing the generated temporal information items.

Figure 24:
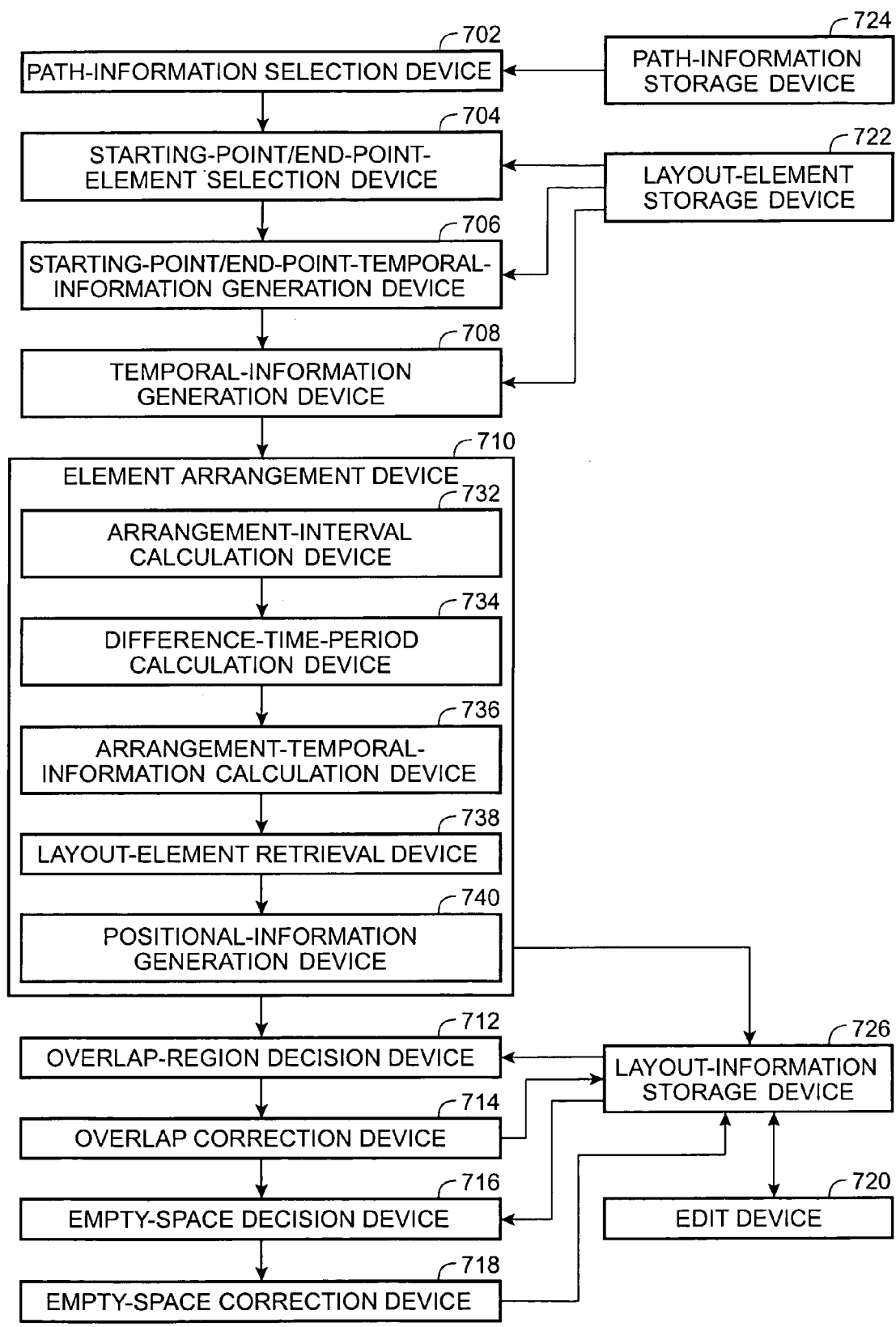
FIG. 24 is a schematic functional block diagram of an element layout apparatus 100 in a fourth exemplary embodiment.

FIG. 24 is an example of the functional block diagram of an element layout apparatus 100 in the fourth exemplary embodiment.

As shown in FIG. 24, the element layout apparatus 100 includes path-information selection device 702, starting-point/end-point-element selection device 704 starting-point/end-point-temporal-information generation device 706, temporal-information generation device 708, element arrangement device 710, overlap-region decision device 712, overlap correction device 714, empty-space decision device 716, empty-space correction device 718, edit device 720, layout-element storage device 722, path-information storage device 724 and layout-information storage device 726.

The path-information selection device 702, starting-point/end-point-element selection device 704, element arrangement device 710, overlap-region decision device 712, overlap correction device 714, empty-space decision device 716, empty-space correction device 718 and edit device 720 shall be omitted from description because they have the same functions as those of the path-information selection device 602, starting-point/end-point-element selection device 604, element arrangement device 610, overlap-region decision device 612, overlap correction device 614, empty-space decision device 616, empty-space correction device 618 and edit device 620 in the third exemplary embodiment, respectively.

The starting-point/end-point-temporal-information generation device 706 generates temporal information items which are to be associated with a starting-point starting-point image and an end-point starting-point image selected by the starting-point/end-point-element selection device 704. By way of example, the temporal information items to be associated with the photographic images are generated on the basis of time information items indicative of time points at which the photographic images were stored in the layout-element storage device 722, and the generated temporal information items are stored in association with the photographic images in the layout-element storage device 722.

The temporal-information generation device 708 generates temporal information items which are to be associated with all photographic images stored in the layout-element storage device 722.

In this way, according to the fourth exemplary embodiment, a layout which reflects the stream of time can be realized in such a way that the element layout apparatus 100 includes the path-information selection device 702, starting-point/end-point-element selection device 704, starting-point/end-point-temporal-information generation device 706, temporal-information generation device 708, element arrangement device 710, overlap-region decision device 712, overlap correction device 714, empty-space decision device 716, empty-space correction device 718, edit device 720, layout-element storage device 722, path-information storage device 724 and layout-information storage device 726, and that the element arrangement device 710 further includes arrangement-interval calculation device 732, difference-time-period calculation device 734, arrangement-temporal-information calculation device 736, layout-element retrieval device 738 and positional-information generation device 740. Photographic images with movements as in case of, for example, the running match of an athletic meet can be laid out so as to express ambience with the lapse of time on an album board. Also, when the several photographic images of a personal history since the time of birth till the present time as in case of, for example, wedding photographic images are to be pasted, the lapse of time can be expressed with ease. That is, the photographic images are not pasted merely in time series, but they can be laid out so as to express the stream of time.

In the fourth exemplary embodiment, the path-information selection device 702 corresponds to path-information-selection-screen display device in exemplary embodiment 26, the starting-point/end-point-element selection device 704 corresponds to layout-element-selection-screen display device in exemplary embodiment 26, and the CPU 30 corresponds to arithmetic device in exemplary embodiments 59, 60, 62, 71, 77 or 78.

Incidentally, although the photographic images are derived and laid out every page in the first exemplary embodiment, it is also possible to perform a layout extending over a plurality of pages.

Besides, although the photographic images to be laid out are selected in accordance with the first exemplary embodiment, it is also possible to lay out all of the stored photographic images.

Besides, although the path information is selected every page in the first exemplary embodiment, it is also possible to establish a path extending over a plurality of pages.

Besides, although the time information items indicative of the time points at which the photographic images were taken, are exemplified as the temporal information items in the description of the first exemplary embodiment, it is also possible to arrange selected photographic images along a path in accordance with counter information items, photographing sequence information items which indicate the turns of individual taken photographic images among all taken photographic images, or the like. By way of example, assuming the counter information of the start photographic image in the four selected photographic images to be "0010", that of the fall photographic image to be "0020", that of the outrunning photographic image to be "0090", and that of the goal photographic image to be "0110", then the start photographic image is arranged at the starting point on the path, the goal photographic image is arranged at the end point on the path the fall photographic image is arranged at a position of 10/100 of an interval from the starting point to the end point, and the outrunning photographic image is arranged at a position of 80/100 of the interval. Also, by way of example, in a case where all the taken photographic images are the six images shown in FIG. 17, and where the photographing turns are assigned to the photographic images successively from "0", the photographing turn of the start photographic image becomes "0", that of the fall photographic image becomes "1", that of the outrunning photographic image becomes "4", and that of the goal photographic image becomes "5". Accordingly, with the start photographic image arranged at the starting point on the path and with the goal photographic image arranged at the end point on the path, the fall photographic image is arranged at a position of 1/5 of an interval from the starting point to the end point, and the outrunning photographic image is arranged at a position of 4/5 of the interval.

Besides, although the first exemplary embodiment is constructed so as to correct the element arrangement position of the downstream photographic image 302 lying between the upstream photographic image 301 and the adjacent photographic image 331, the construction is not restrictive, but the invention can also be constructed so as to correct the element arrangement position of the adjacent photographic image 331.

Figure 25:
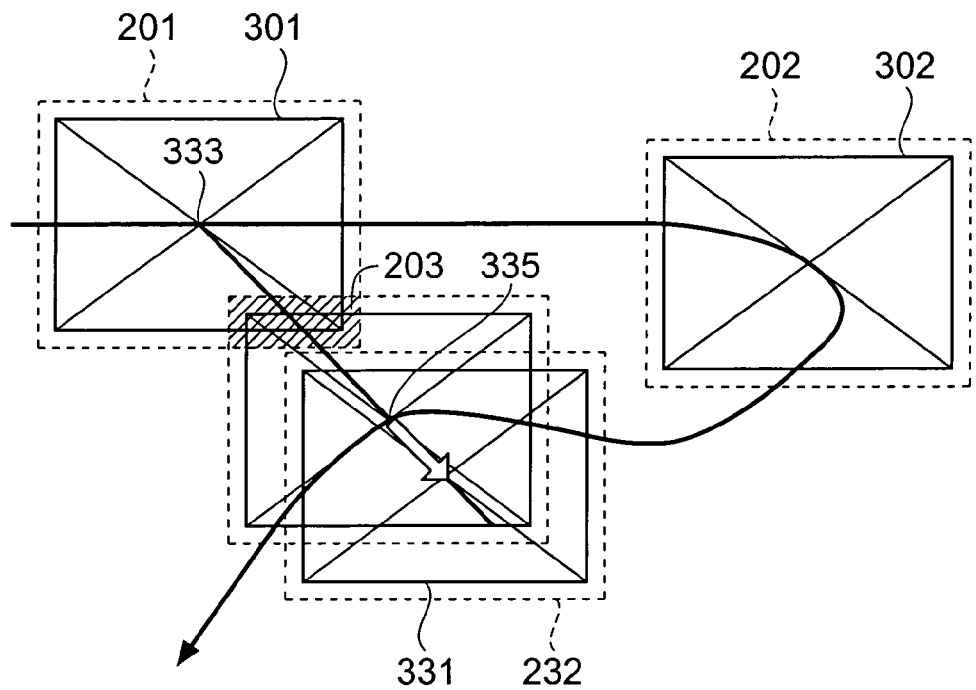
FIG. 25 is a schematic showing a case where the element arrangement position of an adjacent photographic image 331 is corrected.

FIG. 25 is a schematic showing the case where the element arrangement position of the adjacent photographic image 331 is corrected.

As shown in FIG. 25, when an overlap region 203 exists due to the overlap between the overlap-correction decision region 201 of the upstream photographic image 301 and that 232 of the adjacent photographic image 331, this adjacent photographic image 331 is moved until the overlap region 203 is cancelled. The direction of moving the adjacent photographic image 331 is the direction of a straight line which connects the central position 333 of the upstream photographic image 301 and that 335 of the adjacent photographic image 331.

Further, the correcting method in FIG. 25 is not restrictive, but the upstream photographic image 301 may well be moved when, as shown in FIG. 25, the overlap region 203, exists due to the overlap between the overlap-correction decision region 201 of the upstream photographic image 301 and that 232 of the adjacent photographic image 331. The direction of moving the upstream photographic image 301 is the direction of a straight line which connects the central position 333 of the upstream photographic image 301 and that 335 of the adjacent photographic image 331.

In these cases, corrections have been made in relation to the upstream photographic image 301 and the adjacent photographic image 331 which are adjacent to the downstream photographic image 302. However, the relation is not restrictive, but the correcting technique can be similarly applied to any case where a photographic image lying downstream of the upstream photographic image 301 overlaps with this upstream photographic image 301.

Besides, although the first through fourth exemplary embodiments are constructed so as to perform the layouts by using the path information items stored in the respective path-information storage devices 122, 522, 624 and 724 beforehand, the construction is not restrictive, but the invention can also be constructed so as to perform layouts by inputting path information items and using the inputted path information items.

Figure 26:
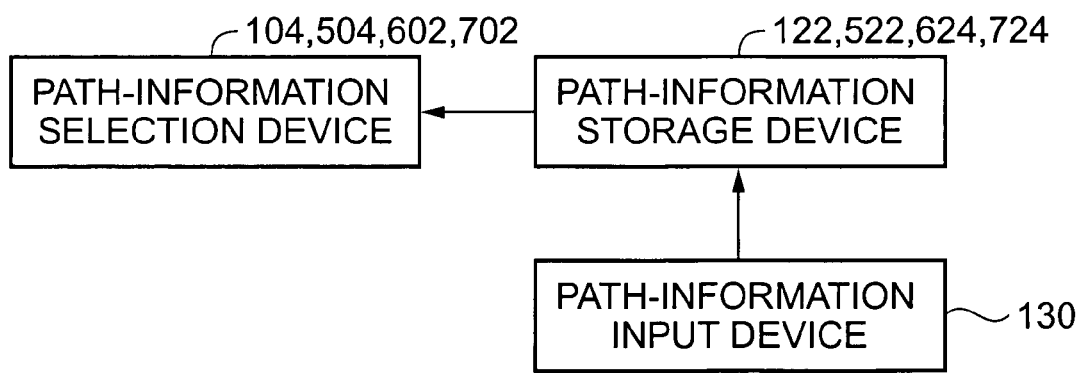
FIG. 26 is a schematic functional block diagram showing a configuration which inputs path information.

FIG. 26 is an example of a functional block diagram showing a configuration for inputting path information items.

The element layout apparatus 100 is configured including path-information input device 130 for inputting the path information items as shown in FIG. 26.

The path-information input device 130 inputs as the path information items, depiction loci depicted with a pointing device such as a tablet finished with a display, a mouse or a pointer (remote-controlled), or paths printed on sheets of paper as read with a scanner or the like, and it stores the inputted path information items in the path-information storage device 122, 522, 624 or 724. The depiction loci are stored as the coordinate value row of two-dimensional coordinates formed on the input device.

Thus, the user can create paths at will. By way of example, he/she can create paths conforming to courses as in races and field athletics. Moreover, he/she can create paths each extending over a plurality of pages.

Further, the configuration in FIG. 26 is not restrictive, but the path-information input device 130 may well be disposed instead of the path-information selection device 104, 504, 602 or 702 by way of example.

Besides, in the first exemplary embodiment, it has been described that, in the case of executing the process shown in the flow chart of FIG. 16, the control program stored in the ROM 32 beforehand is run. However, a program to execute the process may well be loaded from an information record medium recording the program therein, into the RAM 34 so as to be run.

Here, the "information record medium" shall cover all sorts of computer-readable information record media irrespective of electronic, magnetic, optical and the like reading methods and shall include a semiconductor record medium such as RAM or ROM, a magnetic storage type record medium such as FD or HD, an optical reading scheme record medium such as CD, CDV, LD or DVD, and a magnetic storage type/optical reading scheme record medium such as MO. Alternatively, the program may be downloaded via a network and then be run.

Besides, the first through fourth exemplary embodiments are only for the purpose of description and shall in no way restrict the scope of exemplary embodiments of the present invention. Accordingly, one skilled in the art can adopt exemplary aspects of performance in which the individual constituents or all the constituents of the exemplary embodiments are replaced with their equivalents, and also such exemplary aspects of performance shall be covered within the scope of the invention. Considered as more practicable exemplary aspects of the invention are, for example, the following exemplary aspects:

As the first exemplary aspect, the invention can be applied to an album creation apparatus which is installed in a DPE shop or the like. Photographs (layout elements) stored in the storage medium (such as SD card or memory stick) of a digital camera or the like are loaded, some of the photographs and a path are selected with a touch panel or the like, and a layout process is performed on the basis of the selected photographs and path.

As the second aspect, the invention can be applied as that server on the Internet which is installed in a DPE shop or the like. Photographs are transmitted from the PC of a user, a path is determined by selecting one of paths prepared on the server, or by selecting one of paths kept by the user and transmitting the selected path, and a layout process is performed on the basis of the photographs and the path.

What is claimed is:

1. An element layout apparatus to lay out a plurality of layout elements, comprising:
a layout-element storage device to store the layout elements therein;
a path-information storage device to store therein path information items indicative of paths to arrange the layout elements therealong;
a temporal-information generation device to generate temporal information items which indicate streams of time and which are to be associated with the layout elements; and
an element arrangement device to calculate difference time periods between the layout elements on the basis of the temporal information items generated by said temporal-information generation device, and to arrange the layout elements along the paths of the path information items at arrangement intervals between the layout elements that correspond to the calculated difference time periods, wherein
the element arrangement device bringing the difference time period between a starting-point element being the layout element whose time point specified by the temporal information item is earliest among the layout elements, and an end-point element being the layout element whose time point specified by the temporal information item is latest among the layout elements, into correspondence with the arrangement interval between the starting-point element and the end-point element along the path, to calculate the arrangement interval between the starting-point element and a subject element being the layout element to-be-laid-out, on the basis of the difference time period between the starting-point element and the subject element, and to arrange the subject element at the arrangement interval calculated along the path, wherein the element arrangement device including:
a difference-time-period calculation device to calculate the difference time period between the starting-point element and the subject element,
an arrangement-interval calculation device to calculate the arrangement interval between the starting-point element and the subject element on the basis of the difference time period between the starting-point element and the end-point element, the arrangement interval between the starting-point element and the end-point element along the path, and the difference time period calculated by the difference-time-period calculation device,
an element-arrangement-position calculation device to calculate as an element arrangement position of the subject element, a position whose distance from a starting point along the path, the starting point being that position on the path at which the starting-point element is arranged, becomes the arrangement interval calculated by the arrangement-interval calculation device, and
a positional-information generation device to generate positional information of the subject element so that the element arrangement position calculated by the element-arrangement-position calculation device may become a central position of the subject element.

2. An element layout apparatus to lay out a plurality of layout elements, comprising:
a layout-element storage device to store therein the layout elements and temporal information items indicative of streams of time, in association with each other;
a path-information storage device to store therein path information items indicative of paths to arrange the layout elements therealong;
a temporal-information acquisition device to acciuire the temporal information items associated with the layout elements, from said layout-element storage device; and
an element arrangement device to calculate difference time periods between the layout elements on the basis of the temporal information items acciuired by said temporal-information acciuisition device, and to arrange the layout elements along the paths of the path information items at arrangement intervals between the layout elements that correspond to the calculated difference time periods, wherein
the element arrangement device bringing the difference time period between a starting-point element being the layout element whose time point specified by the temporal information item is earliest among the layout elements, and an end-point element being the layout element whose time point specified by the temporal information item is latest among the layout elements, into correspondence with the arrangement interval between the starting-point element and the end-point element along the path, to calculate the arrangement interval between the starting-point element and a subject element being the layout element to-be-laid-out, on the basis of the difference time period between the starting-point element and the subject element, and to arrange the subject element at the arrangement interval calculated along the path, wherein
the element arrangement device including:
a difference-time-period calculation device to calculate the difference time period between the starting-point element and the subject element,
an arrangement-interval calculation device to calculate the arrangement interval between the starting-point element and the subject element on the basis of the difference time period between the starting-point element and the end-point element, the arrangement interval between the starting-point element and the end-point element along the path, and the difference time period calculated by the difference-time-period calculation device,
an element-arrangement-position calculation device to calculate as an element arrangement position of the subject element, a position whose distance from a starting point along the path, the starting point being that position on the path at which the starting-point element is arranged, becomes the arrangement interval calculated by the arrangement-interval calculation device, and
a positional-information generation device to generate positional information of the subject element so that the element arrangement position calculated by the element-arrangement-position calculation device may become a central position of the subject element.

3. The element layout apparatus according to claim 2, the path-information storage device storing therein index information items relevant to the layout elements, and the path information items in association with the index information items;
the path-information selection device selecting any of the plurality of path information items stored in the path-information storage device; and
the path-information selection device selecting the index information item relevant to the layout elements from among the plurality of index information items stored in the path-information storage device, and selecting the path information item from at least one path information item associated with the selected index information item.

4. The element layout apparatus according to claim 2, further comprising:
an overlap-region decision device to decide the existence of an overlap region in which overlap-correction decision regions of adjacent ones of the layout elements overlap each other, the overlap-correction decision regions being those regions of the layout elements which are set to decide the overlap between the layout elements, and a downstream element being the layout element whose time point specified by the temporal information item is later, and an upstream element being the layout element whose time point specified by the temporal information item is earlier, between the two adjacent layout elements except the starting-point element and the end-point element; and
an overlap correction device to correct at least one information item of the element arrangement position of the downstream element, a size of the downstream element, a skew angle of the downstream element, a shape of the downstream element, the element arrangement position of the upstream element, a size of the upstream element, a skew angle of the upstream element, and a shape of the upstream element so as to decrease the overlap region, when the overlap-region decision device has decided the existence of the overlap region.

5. The element layout apparatus according to claim 4, the overlap-correction decision region including an element region which is a region of the layout element and a predetermined marginal region which is provided around the element region.

6. The element layout apparatus according to claim 4, the overlap-correction decision region including an indispensable element region which is a partial region of the layout element as is necessary for the layout, and a predetermined marginal region which is provided around the indispensable element region.

7. The element layout apparatus according to any of claim 4, the overlap correction device correcting the element arrangement position of the layout element so that a central position of the layout element before the correction may exist within the element region of the layout element after the correction; and
the element arrangement position of the downstream element being corrected so that a position at which the downstream element is arranged when the downstream element is moved along the path until the overlap region is cancelled, may be set as the element arrangement position of the downstream element after the correction.

8. The element layout apparatus according to claim 4, the overlap correction device correcting the element arrangement position of the layout element so that a central position of the layout element before the correction, may exist within the element region of the layout element after the correction; and
the element arrangement position of the downstream element being corrected so that a position at which the downstream element is arranged when the downstream element is moved in at least one of a horizontal direction and a vertical direction until the overlap region is cancelled, may be set as the element arrangement position of the downstream element after the correction.

9. The element layout apparatus according to claim 4, the overlap correction device setting as a size of the downstream element after the correction, the size of the downstream element as is reduced with an aspect ratio of the downstream element maintained and without altering the element arrangement position of the downstream element, until the overlap region is cancelled.

10. The element layout apparatus according to claim 4, the overlap correction device correcting the element arrangement position of the downstream element so that a position at which the downstream element is arranged when the downstream element is moved in a direction being perpendicular to the path and lengthening the path, until the overlap region is cancelled, may be set as the element arrangement position of the downstream element after the correction.

11. The element layout apparatus according to claim 4, the overlap correction device setting as the skew angle of the layout element after the correction, the skew angle of the layout element that results when at least one of the downstream element and the upstream element is rotated around a central position of the corresponding layout element by altering neither of the element arrangement position of the downstream element and the element arrangement position of the upstream element, until the overlap region is cancelled.

12. The element layout apparatus according to claim 4, the overlap correction device correcting the element arrangement position of the layout element by expanding the path at substantially equal magnifications vertically and laterally, and setting the same relative position on the path after the correction as the element arrangement position of the layout element arranged on the path before the correction, as the element arrangement position of the layout element after the correction.

13. The element layout apparatus according to claim 2, further comprising:
an empty-space decision device to decide whether an empty space interval is greater than a predetermined correction decision interval, the empty space interval is a distance between the adjacent layout elements along the path, except element regions being regions of the layout elements, or is an arrangement interval between the adjacent layout elements, and a downstream element being the layout element whose time point specified by the temporal information item is later, and an upstream element being the layout element whose time point specified by the temporal information item is earlier, between the two adjacent layout elements; and
an empty-space correction device to correct at least one information item of the element arrangement position of the downstream element, a size of the downstream element, a skew angle of the downstream element, a shape of the downstream element, the element arrangement position of the upstream element, a size of the upstream element, a skew angle of the upstream element, and a shape of the upstream element so as to decrease the empty space interval, when the empty-space decision device has decided that the empty space interval is greater than the predetermined correction decision interval.

14. The element layout apparatus according to claim 13, a boundary region being a region which is constructed of the element region of the layout element and a predetermined marginal region provided around the element region, said empty-space correction device setting as the size of the layout element after the correction, the size of the layout element that results when the size of at least one layout element of the downstream element and the upstream element is expanded with an aspect ratio of the corresponding layout element maintained and without altering the element arrangement position thereof, until the decision region of the at least one layout element of the downstream element and the upstream element overlaps with the boundary region of the layout element adjacent to the corresponding layout element, or until the empty space interval becomes equal to, at most, the predetermined correction decision interval.

15. The element layout apparatus according to claim 13, the empty-space correction device correcting the element arrangement position of the layout element so that a central position of the layout element before the correction may exist within the element region of the layout element after the correction; and the element arrangement position of at least one layout element of the downstream element and the upstream element, except the starting-point element and the end-point element, being corrected so that a position at which the corresponding layout element is arranged when the corresponding layout element is moved along the path until the empty space interval becomes equal to, at most, the predetermined correction decision interval, may be set as the element arrangement position of the corresponding layout element after the correction.

16. The element layout apparatus according to claim 13, the empty-space correction device correcting the path from the upstream element to an adjacent element before the correction, to a path which connects the upstream element and the adjacent element by a straight line, the adjacent element being the layout element which is adjacent to the downstream element except the end-point element among the downstream elements and which is different from the upstream element, whereupon the element arrangement position of the downstream element is corrected so that a ratio between an arrangement interval of the upstream element and the downstream element and an arrangement interval of the downstream element and the adjacent element as viewed on the path after the correction, may become equal to a ratio between an arrangement interval of the upstream element and the downstream element and an arrangement interval of the downstream element and the adjacent element, as viewed on the path before the correction.

17. The element layout apparatus according to claim 13, the empty-space correction device correcting the element arrangement position of the layout element by reducing the path at substantially equal magnifications vertically and laterally, and setting the same relative position on the path after the correction as the element arrangement position of the layout element arranged on the path before the correction, as the element arrangement position of the layout element after the correction.

18. The element layout apparatus according to claim 13, the empty-space correction device arranging a predetermined layout element based on the path between the layout elements so that the empty space interval may become equal to, at most, the predetermined correction decision interval.

19. The element layout apparatus according to claim 2, further comprising:

an edit device to edit at least one information item of an element arrangement position of the layout element, a size of the layout element, a skew angle of the layout element, and a shape of the layout element, on the basis of information inputted through an input device.

20. An element layout method to lay out a plurality of layout elements, comprising:

allowing an arithmetic device to select the layout elements on the basis of inputs given by a user, from within a layout-element storage device to store therein the layout elements and temporal information items indicating a stream of time, in association with each other;

allowing the arithmetic device to select a path information item based on an input given by the user, from within a path-information storage device to store therein path information items indicative of paths to arrange the layout elements therealong;

allowing the arithmetic device to acquire the temporal information items associated with the layout elements selected at said element selection, from within the layout-element storage device; and allowing the arithmetic device to calculate a difference time period between the layout elements, based on the temporal information items acquired at the temporal-information acquisition, and to arrange the layout elements selected at the element selection step, along the path of the path information item selected at said path-information selection and at an arrangement interval between the layout elements as corresponds to the calculated difference time periods, wherein an element arrangement device bringing the difference time period between a starting-point element being the layout element whose time point specified by the temporal information item is earliest among the layout elements, and an end-point element being the layout element whose time point specified by the temporal information item is latest among the layout elements, into correspondence with the arrangement interval between the starting-point element and the end-point element along the path, to calculate the arrangement interval between the starting-point element and a subject element being the layout element to-be-laid-out, on the basis of the difference time period between the starting-point element and the subject element, and to arrange the subject element at the arrangement interval calculated along the path, wherein the element arrangement device including:

a difference-time-period calculation device to calculate the difference time period between the starting-point element and the subject element, an arrangement-interval calculation device to calculate the arrangement interval between the starting-point element and the subject element on the basis of the difference time period between the starting-point element and the end-point element, the arrangement interval between the starting-point element and the end-point element along the path, and the difference time period calculated by the difference-time-period calculation device, an element-arrangement-position calculation device to calculate as an element arrangement position of the subject element, a position whose distance from a starting point along the path, the starting point being that position on the path at which the starting-point element is arranged, becomes the arrangement interval calculated by the arrangement-interval calculation device, and a positional-information generation device to generate positional information of the subject element so that the element arrangement position calculated by the element-arrangement-position calculation device may become a central position of the subject element.

* * * * *